United States Patent
Bastiani et al.

(10) Patent No.: US 6,636,922 B1
(45) Date of Patent: Oct. 21, 2003

(54) METHODS AND APPARATUS FOR IMPLEMENTING A HOST SIDE ADVANCED SERIAL PROTOCOL

(75) Inventors: Vincent J. Bastiani, San Jose, CA (US); Tony Kwan, Milpitas, CA (US)

(73) Assignee: Adaptec, Inc., Milpitas, CA (US)

(*) Notice: Subject to any disclaimer, the term of this patent is extended or adjusted under 35 U.S.C. 154(b) by 0 days.

(21) Appl. No.: 09/526,293

(22) Filed: Mar. 15, 2000

Related U.S. Application Data

(60) Provisional application No. 60/124,813, filed on Mar. 17, 1999.

(51) Int. Cl.⁷ .................. G06F 13/14; G06F 13/38; G06F 13/42; G06F 15/16
(52) U.S. Cl. .................. 710/305; 710/71; 710/106; 709/250
(58) Field of Search .................. 710/71, 305, 306, 710/315, 105, 106; 709/250

(56) References Cited

U.S. PATENT DOCUMENTS

| | | | |
|---|---|---|---|
| 5,659,684 A | * 8/1997 | Giovannoni et al. | 370/465 |
| 5,841,989 A | * 11/1998 | James et al. | 709/239 |
| 5,854,790 A | * 12/1998 | Scott et al. | 370/236 |
| 5,948,085 A | * 9/1999 | Blatter | 307/66 |
| 6,105,016 A | * 8/2000 | Martin | 707/1 |
| 6,393,561 B1 | * 5/2002 | Hagiwara et al. | 713/100 |
| 6,397,287 B1 | * 5/2002 | Brown et al. | 709/250 |

OTHER PUBLICATIONS

IBM Technical Disclosure Bulletin, Feb. 1, 1987, US vol. No. 29, Issue No. 9, p. No. 3784–3785.*

* cited by examiner

*Primary Examiner*—Glenn A. Auve
*Assistant Examiner*—Trisha Vu
(74) *Attorney, Agent, or Firm*—Martine & Penilla, LLP

(57) ABSTRACT

A host controller for enabling communication between a host computer and a device over a serial link is provided. The host controller includes a bus interface circuit that is connected to a system bus of the host computer. The host controller further includes host controller registers to enable code configuration of the host controller for operation, initialize the device, and send commands to the device. A packet generator/decoder circuit is also provided for generating poll packets to be sent to the device and for sending and receiving packets to or from the device. The host controller also has a serializer/deserializer for converting parallel data received from the bus interface circuit and to be sent over the serial link to the device into serial data and converting serial data received from the serial link to parallel data to be sent to the bus interface circuit and to the host computer.

23 Claims, 32 Drawing Sheets

METHODS AND APPARATUS FOR IMPLEMENTING A HOST SIDE ADVANCED SERIAL PROTOCOL

CROSS REFERENCE TO RELATED APPLICATIONS

This application claims priority from U.S. Provisional Patent Application No. 60/124,813, filed Mar. 17, 1999, and entitled "CHEX SERIAL BUS PROTOCOL ADVANCED SERIAL BUS." This provisional application is herein incorporated by reference. This application is also related to: (1) U.S. patent application Ser. No. 09/526,028, filed on the same day as the instant application and entitled "METHODS AND APPARATUS FOR IMPLEMENTING A DEVICE SIDE ADVANCED SERIAL PROTOCOL," and (2) U.S. patent application Ser. No. 09/526,030, filed on the same day as the instant application and entitled "HOST AND DEVICE SERIAL COMMUNICATION PROTOCOLS AND COMMUNICATION PACKET FORMATS." These application are hereby incorporated by reference.

BACKGROUND OF THE INVENTION

1. Field of the Invention

This invention relates generally to communication protocols, and more particularly to communication protocols that connect computer systems to peripheral devices.

2. Description of the Related Art

A basic component of a host computer system is the peripheral device. Peripheral devices come in many forms, such as, hard drives, CD-ROMs, optical discs, and the like. To enable communication between the host computer system and its peripheral devices, data transfer protocols such as IDE and SCSI are used. As is well known, the SCSI protocol is designed for high bandwidth and performance demanding environments due to its superior data transfer rates. On the other hand, the IDE protocol is designed to be a lower cost alternative to the SCSI protocol. Thus, computer systems that are designed with a budget in mind tend to implement IDE peripheral devices, but suffer in terms of performance.

FIG. 1 illustrates a typical host computer system 12 that implements peripheral devices 14 and 18. As shown, peripheral device 14 is an internal peripheral device, which can be either IDE or SCSI. Peripheral device 18, on the other hand, is an external device. Because IDE devices implement parallel data transfer buses, IDE peripheral devices are generally manufactured in the form of internal devices. Consequently, in order to connect an external peripheral device, such as device 18 to the host computer system 12, a host adapter needs to be installed into the host computer system 12. To implement external devices, a SCSI host adapter can be connected to the host computer system 12 by way of a PCI bus. The SCSI host adapter can then allow communication over a SCSI bus 16 to the peripheral device 18, which also needs to be a SCSI device. Although, the implementation of SCSI devices can add cost to the system, thus discouraging cost sensitive consumers from implementing external peripheral devices.

In order to maintain cost at a minimum, most computer motherboards come integrated with two IDE connectors. As is well known, each IDE connector can then support a short and bulky IDE parallel cable that itself has two IDE connectors. Each of the two IDE connectors can then connect up to a particular internal IDE peripheral device. For each pair of IDE devices, one device is designated as a master device and the other is designated as a slave device. This designation enables a particular IDE hard drive that is connected to a master connection to be designated as a boot device. Thus, the master IDE device, which is in the form of a hard drive is typically the boot device that contains an operating system (OS) image. Following this implementation, such computer systems can add more internal peripheral devices.

As a result, the IDE protocol provides a low end solution that has limitations on performance such as speed, cable length, and extendibility to external devices. In view of the foregoing, there is a need for a more robust protocol that can deliver improved communication performance, can be extended to external devices, provides for longer and less bulky cable lengths and is a cost sensitive solution that enables the manufacturer of such devices at cost structures that are about equivalent to today's low end IDE solutions.

SUMMARY OF THE INVENTION

Broadly speaking, the present invention fills these needs by providing an advanced serial protocol (ASP) that defines a more robust data transmission environment for communication between host computers and peripheral devices. It should be appreciated that the present invention can be implemented in numerous ways, including as a process, an apparatus, a system, a device, a method, or a computer readable medium. Several inventive embodiments of the present invention are described below.

In one embodiment, a host controller for enabling communication between a host computer and a device over a serial link is disclosed. The host controller includes a bus interface circuit that is connected to a system bus of the host computer. The host controller further includes host controller registers to enable code configuration of the host controller for operation, initialize the device, and send commands to the device. A packet generator/decoder circuit is also provided for generating poll packets to be sent to the device and for sending and receiving packets to or from the device. The host controller also has a serializer/deserializer for converting parallel data received from the bus interface circuit and to be sent over the serial link to the device into serial data and converting serial data received from the serial link to parallel data to be sent to the bus interface circuit and to the host computer.

In another embodiment, a host controller chip integrated into a host adapter is disclosed. The host controller chip is configured to enable communication between a host computer that has the host adapter connected thereto and a peripheral device. A serial cable is configured to interconnect the host adapter to the peripheral device, and the serial cable includes: (a) a first differential pair for data; (b) a second differential pair for strobe; and (c) a pair for ground. The host controller chip includes a PCI bus interface circuit for connecting the host adapter to the host computer, and host controller registers integrated into the host controller chip to enable configuration of the host adapter for operation, initialize the peripheral device, and enable command transmission to the peripheral device over the serial cable. The host controller chip further includes a packet generator/decoder circuit for generating poll packets to be sent to the peripheral device and for sending and receiving packets to and from the peripheral device. A serializer/deserializer circuit is also integrated into the host controller chip for converting parallel data received from the PCI bus interface circuit and to be sent over the serial cable to the peripheral device into serial data and converting serial data received from the serial cable into parallel data to be sent to the PCI bus interface circuit and to the host computer.

In yet a further embodiment, a system for executing data transfers between a host computer and a peripheral device over a serial link is disclosed. The system includes a CPU for setting up a command descriptor block (CDB) with an ATA/ATAPI command and a scatter/gather list in a system memory. A pointer register that is resident in a host controller chip is also provided, and the CPU is configured to write an address of the CDB into the pointer register. A DMA controller is provided for instructing a transfer of the CDB to RAM memory of the host controller chip, and the host controller chip is configured to send the CDB to a peripheral device over a serial physical cable. The host controller chip further being configured to send IN packets to poll the peripheral device for data packets. The device is configured to respond to the poll by sending data packets to the RAM of the host controller chip. A data buffer is also provided and is configured to receive the data packets at the direction of the DMA controller, and the data buffer being pointed to the scatter/gather list in the system memory. The host controller chip is configured to set up an interrupt status to interrupt the CPU indicative of the receipt of the data packets from the peripheral device.

The advantages of the present invention are numerous. Most notably, the ASP bus is specified to be an industry standard extension to the PC architecture which will be a replacement or alternative for the IDE bus. ASP will provide higher speeds and more fault tolerant operations while not requiring a complete change to the current IDE command structure. The ASP provides exceptional ease of use for PC peripheral expansion and is a low-cost solution that supports fast transfer rates. ASP is capable of being integrated in commodity device technology, and provides a standard interface capable of quick diffusion into existing products. ASP is designed to be an extension of the IDE protocol and ATA/ATAPI command set for the attachment of block oriented devices.

ASP is also extendable in terms of the speed that can be achieved. Today, IDE can only operate to 16 MBps (33 MBps is defined but has not yet been used). Some embodiments of the ASP will enable link communication up to about 960 MBps without adversely affecting the protocol. Also, ASP will provide some performance features such as overlapped commands to different devices, DMA transfers only and dynamic allocation of bandwidth to faster devices when needed. Also ASP provides more robust reliability with the inclusion of CRC checking on the data and true plug and play capability.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for an advanced serial protocol (ASP) is disclosed to provide a more robust data transmission environment for communication between host computers and peripheral devices. Data transmission rates can also be increased without increasing the typical cost structure of IDE, thus facilitating the ASP implementation into all host computers. As an example, the ASP technology enables for faster communication speeds than conventional IDE technologies, enables the use of longer cable lengths than IDE, enables peripheral devices be connected external to a host computer unlike IDE, and is extendible to faster speeds. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

ASP is a star network that supports data exchange between a host computer and storage devices such as disks, tapes and CD's. The attached peripherals share ASP bandwidth through a host scheduled polling based protocol. An ASP system is described by three definitional areas. The first is an ASP Interconnect, the second is ASP Devices, and the third is an ASP Host interface. The ASP interconnect is the manner in which ASP devices are connected to and communicate with the host. This includes: (a) bus topology or the connection between the host and a device; (b) conversion of ATA or ATAPI commands into packets passed over an ASP bus; (c) data flow of the commands and data over the ASP physical layer; and (d) scheduling of commands and data over the shared interconnects.

Figure 1:
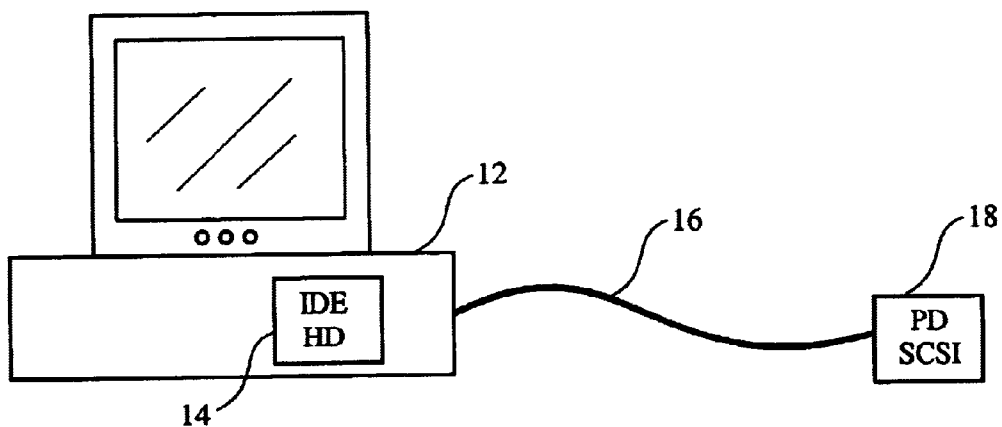
FIG. 1 illustrates a typical host computer system that implements internal and external peripheral devices.
Figure 2:
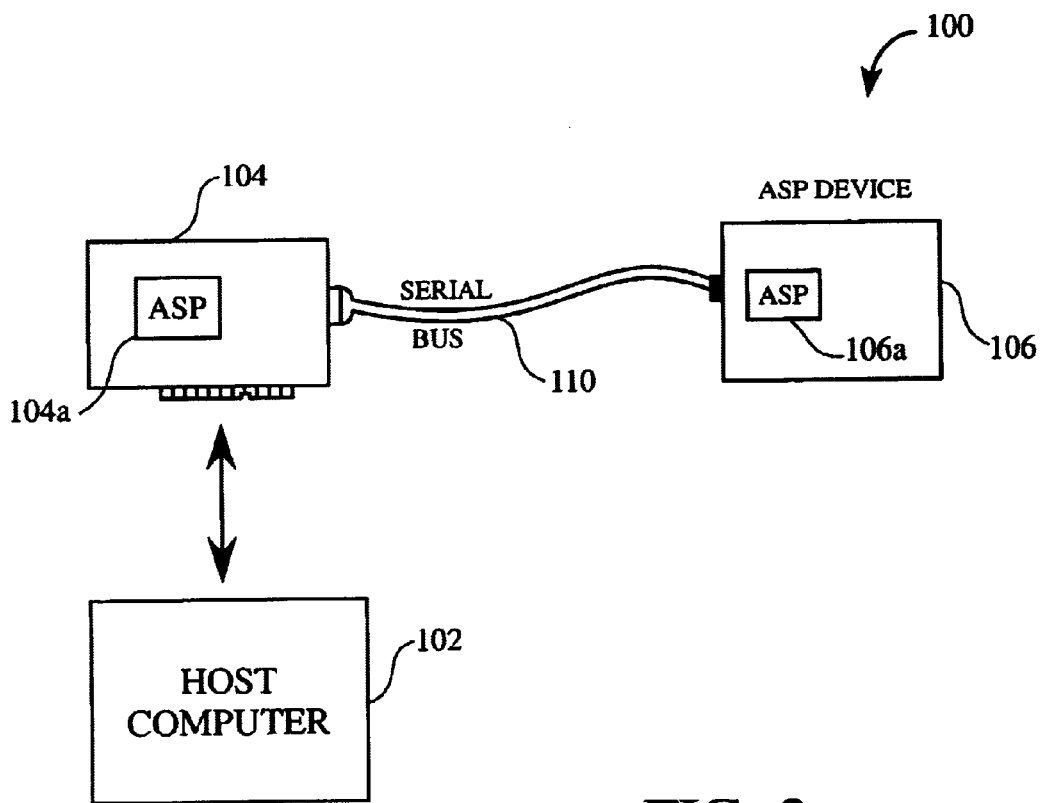
FIG. 2 shows a diagram that includes a host computer, a host adapter and an advanced serial protocol (ASP) device, in accordance with one embodiment of the present invention.

FIG. 2 shows a diagram 100 that includes a host computer 102, a host adapter 104 and an advanced serial protocol (ASP) device 106, in accordance with one embodiment of the present invention. In this example, the host adapter 104 is configured to include ASP circuitry 104a for processing ASP packet data and communicating between the host computer 102 and the ASP device 106. The host adapter 104 is preferably configured with a PCI interface for connection directly into a motherboard of the host computer system 102. In one embodiment, the host adapter 104 connects through a serial bus 110 to the ASP device 106 internally to the host computer 102. In another embodiment, the ASP device 106 is configured as an external device. In either case, the serial bus 110 is a simple cable with a minimum number of wires to establish connection to the ASP device.

The cable of the serial bus 110 is also configured to enable connections up to 1.5 meters or greater, thus providing a more flexible arrangement environment for the ASP devices 106 whether they be internal or external. In this example, the ASP device 106 is also shown including an ASP chip 106a for executing the ASP protocol. As will be described below, the ASP chip 106a can be in the form of a standalone chip or the ASP circuitry can be integrated into another chip.

Figure 3:
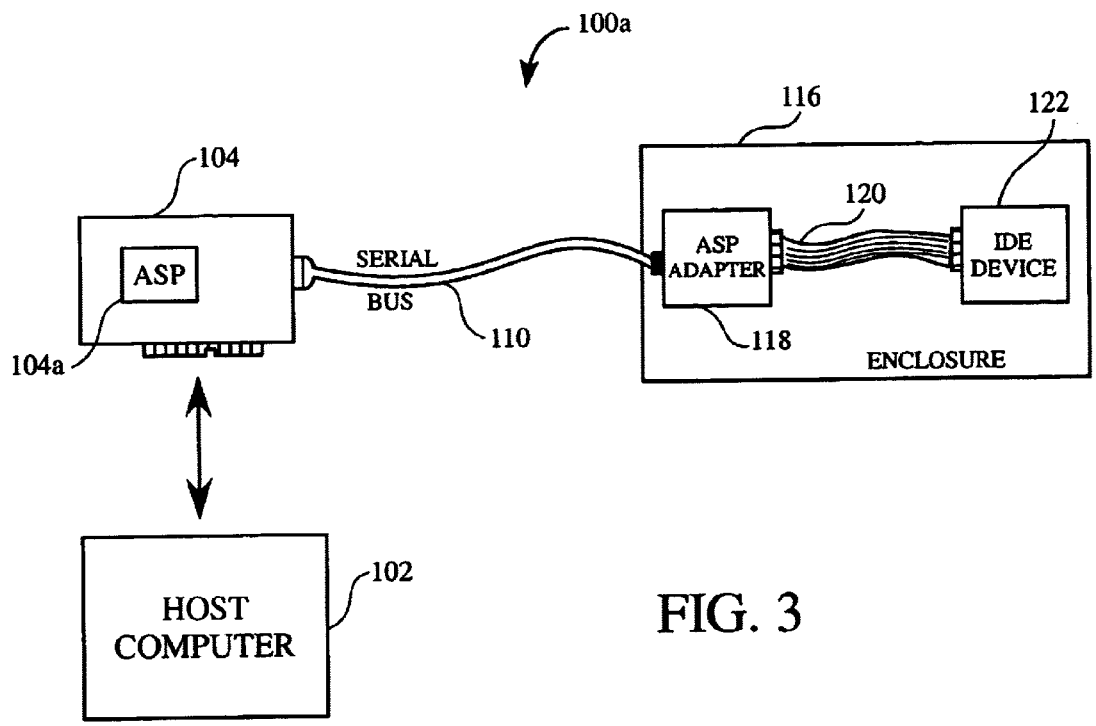
FIG. 3 illustrates another configuration in which the ASP device is enabled by way of an ASP adapter, in accordance with another embodiment of the present invention.

FIG. 3 illustrates another configuration 100a in which the ASP device is enabled by way of an ASP adapter 118, in accordance with another embodiment of the present invention. In this implementation, it is possible to use existing IDE devices 122 that connect by way of a standard IDE parallel cable 120 to the ASP adapter 118. In an example, the IDE device 122 can be enclosed in an enclosure 116. The enclosure 116 may be needed to support the IDE device 122 which, in this example, may have been an off the shelf internal IDE device (e.g., an IDE hard drive, an IDE optical disc, etc.). This example is provided herein to illustrate the flexibility of the ASP to integrate with existing IDE devices.

Figure 4C:
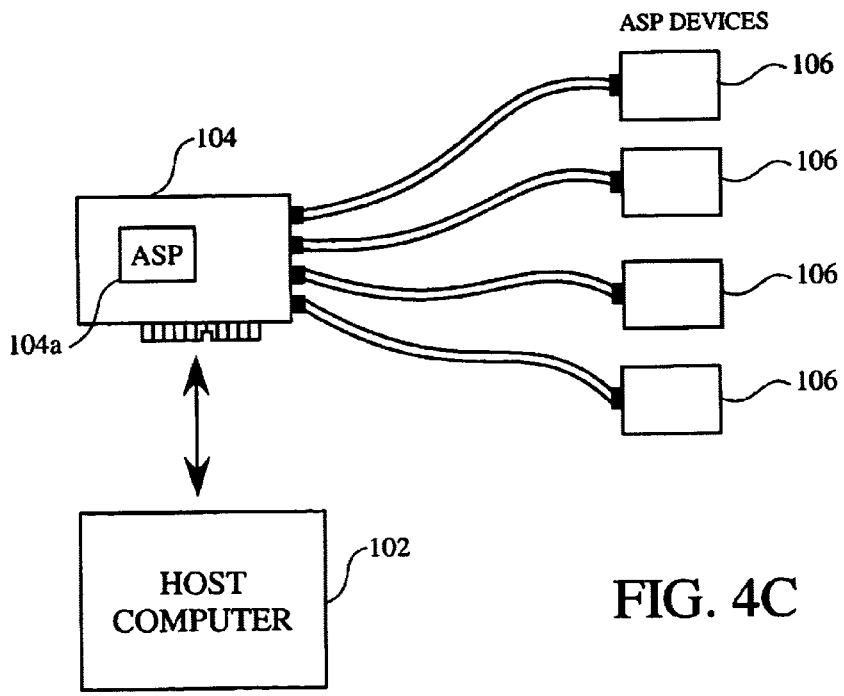
FIG. 4C illustrates an example in which the host adapter enables communication to 4 separate ASP devices, in accordance with one embodiment of the present invention.
Figure 4A:
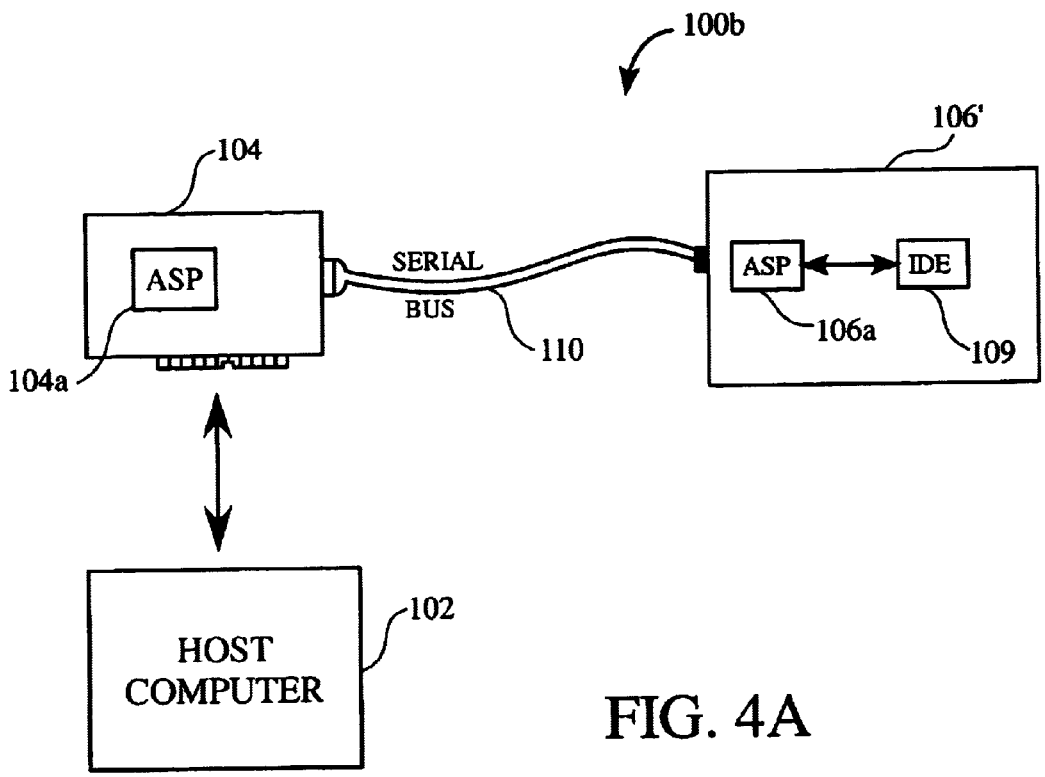
FIG. 4A illustrates yet another configuration in which an ASP device is made using standard IDE circuitry and an ASP chip to enable communication over the serial bus, in accordance with one embodiment of the present invention.

FIG. 4A illustrates yet another configuration 100b in which an ASP device 106' is made using standard IDE circuitry 109 and an ASP chip 106a to enable communication over the serial bus 110. For instance, current IDE manufacturers would be able to integrate the ASP into existing IDE devices by simply integrating the ASP chip 106a into their devices and completing the necessary interfacing. The interfacing and connectivity is described below in greater detail.

Figure 4B:
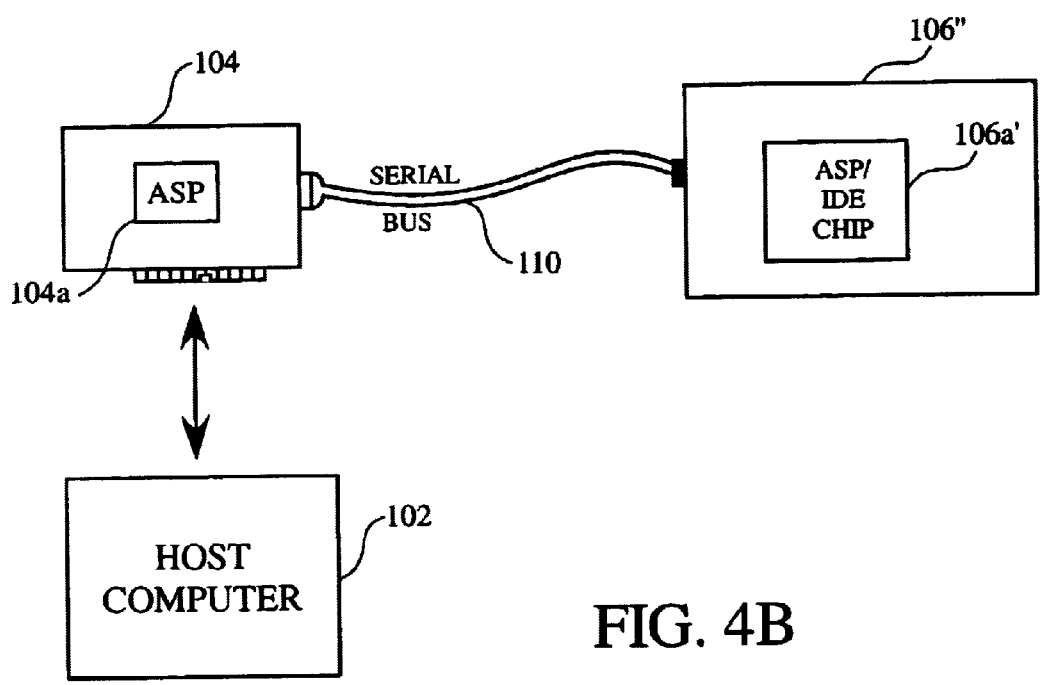
FIG. 4B illustrates an example in which an ASP device is actually manufactured by integrating ASP circuitry into existing IDE circuitry in the form of an ASP/IDE chip, in accordance with one embodiment of the present invention.

FIG. 4B illustrates an example in which an ASP device 106" is actually manufactured by integrating ASP circuitry into existing IDE circuitry in the form of an ASP/IDE chip 106a'. The functionally provided by ASP to IDE is faster communication over a serial bus, more robust communication exchange and higher reliability. ASP therefore converts standard IDE devices into higher end devices without the added cost of other communication protocols.

FIG. 4C illustrates an example in which the host adapter 104 enables communication to 4 separate ASP devices 106, in accordance with one embodiment of the present invention. ASP can, of course, be implemented for connection to more than 4 devices. ASP also enables each one of the ASP devices to be a boot device, which was not possible in IDE (i.e., only as master can be a boot device). Furthermore, because the host adapter 104 is connected to a PCI bus, additional host adapters 104 could be added to the host computer 102 to add additional ASP devices. Thus, ASP provides for a very flexible environment for device configuration and use.

Figure 5:
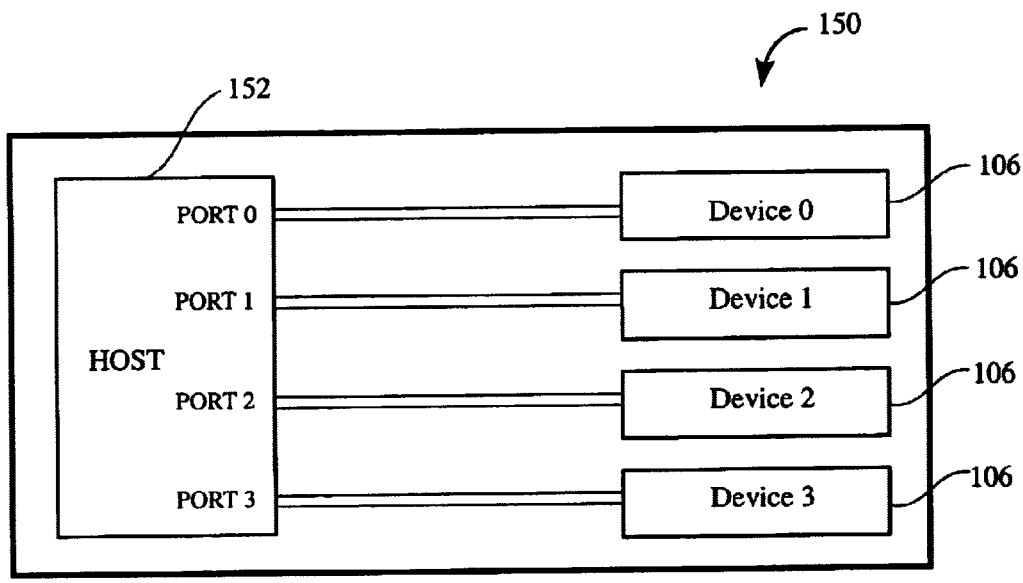
FIG. 5 is a block diagram illustrating how a bus of a host can connect up to 4 ASP devices, in accordance with one embodiment of the present invention.

FIG. 5 is a block diagram 150 illustrating how a bus of a host 152 can connect up to 4 ASP devices 106. As mentioned above, the ASP physical interconnect is a star configuration. Thus, the host controls all communication on the bus. Each bus segment is a point-to-point connection between the host 152 and an ASP device 106. Accordingly, the ASP is a single host to many device structure. The ASP interface to the computer system is referred to as a host controller. The host controller is a combination of hardware, software and firmware. An ASP system consists of a single host controller and a number of devices. In a preferred embodiment, the number of devices is 4. Of course, this number can change depending on the desired functionality and system demands.

In a preferred embodiment, ASP devices 106 are block oriented devices such as hard disks, floppy disks, tape drives, CD-ROM's or CD recordable devices or other optical discs. ASP devices 106 can also be devices that can be defined in a manner consistent with ATA or ATAPI type interfaces. Preferably, ASP devices 106 present a standard interface to the host interface in terms of: (a) comprehension of the ASP protocol; and (b) response to standard ASP operations such as configuration and reset.

ASP uses data strobe links. The data strobe links are analogous to those defined by IEEE 1394 Standard (FireWire™), and the IEEE 1394 Standard is hereby incorporated by reference. The signaling uses 4 wires for each direction of transmission since it uses differential signaling on the link, and the links are point-to-point and operate in a half duplex mode. The two signals are DATA and STROBE. The line speed is about 320 Mbit/sec in one embodiment of the protocol, but can be extended. The differential receiver sensitivity is about 100 mv. The cable used is a 3 pair twisted pair flat for internal connection at 120 ohms impedance.

Data strobe encoding is a way of encoding the clock and data signals such that the receiver has a full bit time to decode the data. The encode and decode requires only one gate and two D-FF for each of the encode and decode circuits. The encoding is auto-bauding in that no PLL is required at the receiver, and the only critical parameter is skew tolerance between the two signals which is minimal due to the short distances at which the interface will be operating. SYNC bytes precede each packet to allow the receiver to achieve byte synchronization. The ASP protocol uses a byte count to determine the end of the packet and as such there are no special signaling levels involved.

In regard to mechanical issues, the motherboard preferably uses 4 sets of connectors so that there can be four independent connections, but only one is active at a time. The cable has 6 conductors of which 4 are used as 2 differential pairs for the Data and Strobe signals and the other 2 conductors are used as grounds. The connectors are 6 pin devices which are defined in the SSA PHY specification as the device connector, and is also used as the internal connector for IEEE 1394. The SSA PHY (Serial Storage Architecture—Physical, SSA-PH1) specification, ANSI Standard X3T10.1/1145D, is hereby incorporated by reference.

Bus Protocol

In preferred embodiments, the host is always the initiator and the devices are responders. The only communication that takes place is between the host and a device. There is no communication between devices. The host controls all bus transactions by polling each device. These polls are dynamically changed based on the commands outstanding at the time. Most transactions consist of up to 3 packets. The first is a poll of the device followed by a data packet and then an acknowledgment. Each packet defines whether the transaction is to the link status or control, device status or control or device data. These 3 types of transactions are defined in greater detail below. Additionally, all devices are assumed to be asynchronous devices with requirements on amount of bandwidth needed, but not isochronous devices needing precise timing of specific amounts of data.

Advantageously, the polling done by the host 154 allows flow control and prevents buffers from being underrun or overrun by using a NAK handshake to throttle the data. Buffers are also prevented from being overrun by keeping the packet size small (128 bytes) and using repeat counts on packets sent to achieve the required bandwidth to a device. This allows the host 156 and ASP devices 106 to have very inexpensive implementations with very small buffers. However, the protocol does not limit packets to only this single size and others are allowed up to a level of 2048 bytes or more. In general, commands sent are packetized versions of standard ATA or ATAPI commands and as such ASP devices 106 and host software at the system and application level can be kept intact.

There are several attributes of the ASP that contribute to its robustness. One is that ASP ensures signal integrity using point-to-point differential drivers and receivers. Another is the use of control fields protected by redundant fields and data field protected by CRC. Yet another is the use of self-recovery in protocol using timeouts for lost or broken packets. Still another is the use of flow control by the host using intelligent polling which can be dynamically changed. Finally, the ASP uses auto configuration of the system and the ability to reconfigure when change occurs.

In regard to error detection, the error rate of the link is expected to be low due to the DS link encoding, short distances and differential transmission. To guard against errors, each field in the packet header is protected by transmitting its value and the complement of its value. The data field, if contained in a packet, is protected by a CRC which is transmitted at the end of the packet. The CRC gives 100% coverage on single and double bit errors. In addition, the ASP protocol optionally allows for error handling in hardware or software. Hardware handling includes reporting and retry of failed transfers. Timers are used to recover and retry errors that have been detected. The protocol is designed such that only a single time-out needs to be used and since the packet size is limited, this timer can be kept quite short.

System Configuration

In regard to system configuration, the ASP supports devices being attached at any time even though most devices would be internal. As mentioned above, the protocol support external devices and thus external devices could be temporally added and deleted and be detected by the host software and activated. This is very useful in portable environments where a CD-ROM or other device would be temporally connected. Accordingly, as ASP devices 106 are removed, the host interface detects that they are non-responsive and removes them from the polling list. In one embodiment, the ASP implements enumeration to identify attached ASP devices 106. While this is normally done at startup, the ASP protocol can detect that a device has been removed or added.

ASP devices 106 are logically divided into an ASP device link portion, and a device portion. The host is logically partitioned into the ASP host interface portion, the aggregate system software portion (ASP system software and host system software), and the device software portion. Each of these portions is defined such that a particular ASP task is the responsibility of only one portion. The ASP host 152 and ASP device 106 portions correspond as shown in Table 1.

TABLE 1

Correlation Between Host and Device Layers

| ASP Host Portion | ASP Device Portion |
| --- | --- |
| Device Software | Function |
| System Software | Device |
| ASP Interface | ASP Interface |

All devices are assumed to be asynchronous devices and consist of control and status registers and data registers as the way for communicating with the device itself. In addition, each device has a control and status register that controls and manages the link itself. The ability of the host to communicate with the device registers or the link registers of a device is controlled by the data type field of the packet. The ASP protocol allows up to 16 different device type registers, but most devices are expected to use only three (Link Status and Control, Device Status and Control and Data). The data flow model is described in greater detail below.

ASP bandwidth is controlled by the host hardware and software. Since the packet size is purposely kept small to allow for an inexpensive interface, the bandwidth is controlled by the Repeat Count, which is the number of times a device is accessed for data repetitively when it has data to either source or sink. Devices 106 that require more bandwidth and can deliver the data or sink it faster are given higher repeat counts. Bandwidth can be dynamically changed by changing the repeat counts for a given configuration.

The ASP protocol is formulated around asynchronous bulk transfer devices such as disks (HD, Optical or floppy), tape drives and other bulk transfer devices. The command transfer defined is encapsulated ATA or ATAPI, but others could be defined as desired. ASP devices 106 are also configured to provide link level control and status registers that define the device at initialization time.

The ASP host interacts with the ASP devices 106 though the host controller. The host controller and software are responsible for the following: (a) initializing the devices at power on and when a change is made to the configuration; (b) managing control flow between the host and ASP devices 106; (c) managing data flow between the host and ASP devices 106; and (d) collecting status and activity statistics.

The ASP architecture can also be extended in speed. The speed of the link can be increased as technology permits since there are no speed dependent issues with the protocol that would prevent its functionality at higher speeds. Also, speeds can be mixed assuming the host device can support multiple speeds. A host chip that supports multiple speeds will be able to operate each device at the maximum speed that that device can function. Since the protocol uses no special signaling levels, the physical interface can be changed as well. Additionally, the ASP protocol could be used over optical fibre as well as using different encoding techniques for higher bandwidth.

Figure 6:
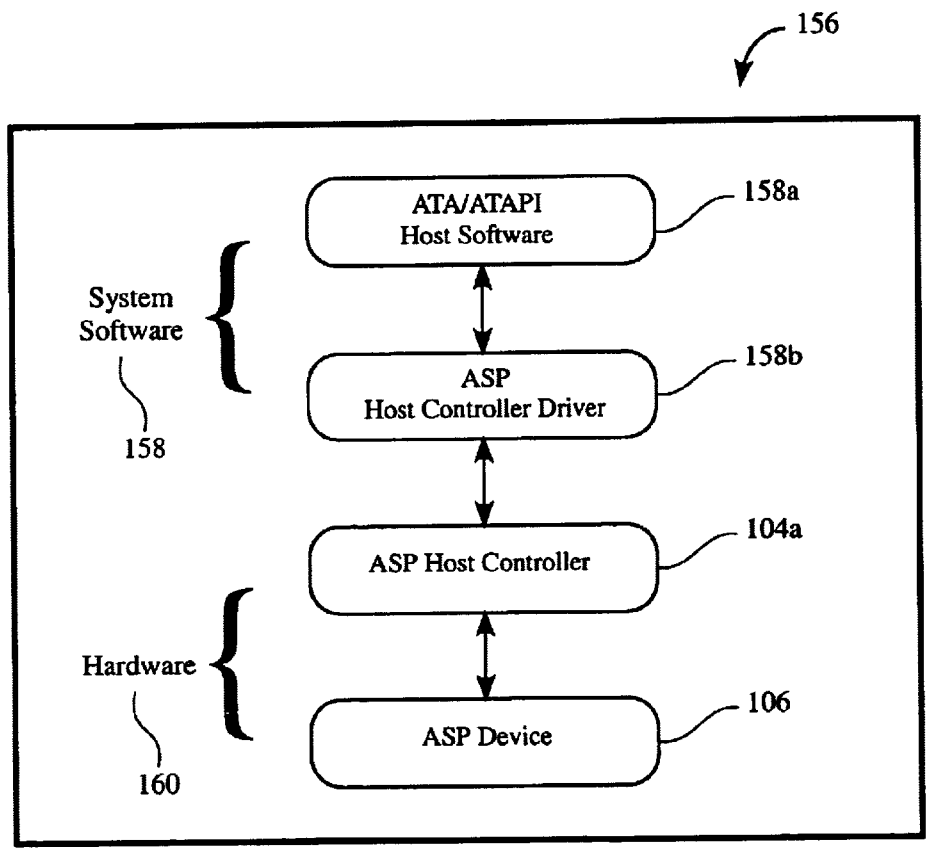
FIG. 6 shows a block diagram defining system software portions and hardware portions of the ASP, in accordance with one embodiment of the present invention.

In general, the main parts to the ASP topology include host and devices, which are the primary components of a ASP system, and physical topology, which is how ASP elements are connected. As shown in FIG. 6, a host and devices side diagram 156 is provided. The diagram illustrates system software 158 includes ATA/ATAPI host software 158a, and an ASP host controller driver 158b. Also shown is the hardware 160, which includes an ASP host controller 104a and an ASP device 106.

Figure 7:
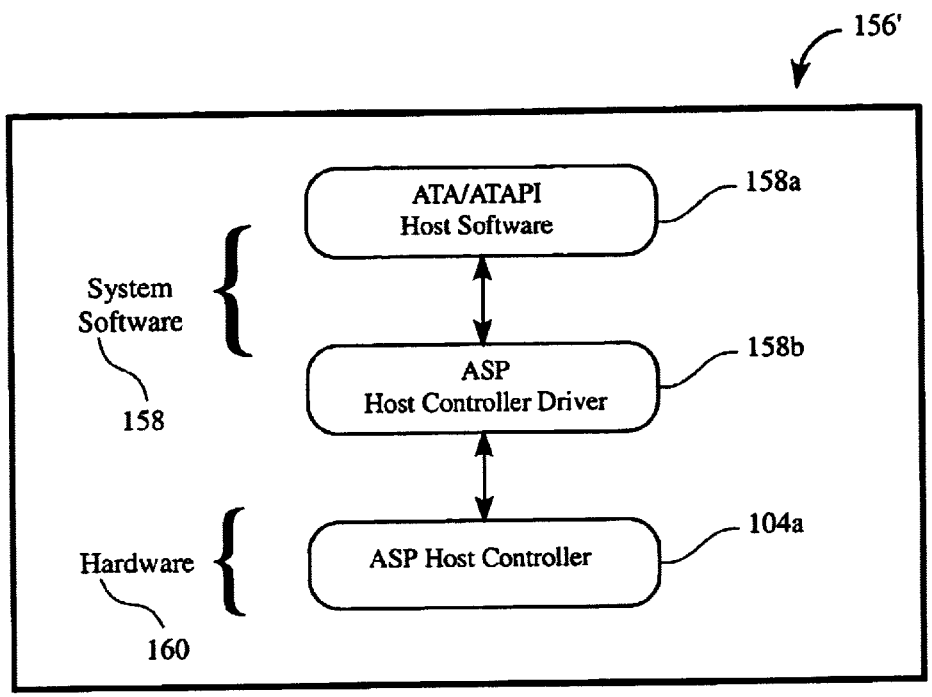
FIG. 7 shows another block diagram defining system software portions and hardware portions of the ASP, in accordance with one embodiment of the present invention.

FIG. 7 shows a host side diagram 156' also defining the system software 158 and the hardware 160. The system software 156' includes, in this example, ATA/ATAPI host software 158a and the ASP host controller driver 158b. The hardware 160 includes an ASP host controller 104a. The ASP host controller 104a occupies a unique position as the coordinating entity for the ASP. In addition to its special physical position, the host has specific responsibilities with regard to the ASP and its attached devices. The host controls all access to the ASP. An ASP device only gains access to the bus by being granted access by the ASP host controller 104a.

Figure 8:
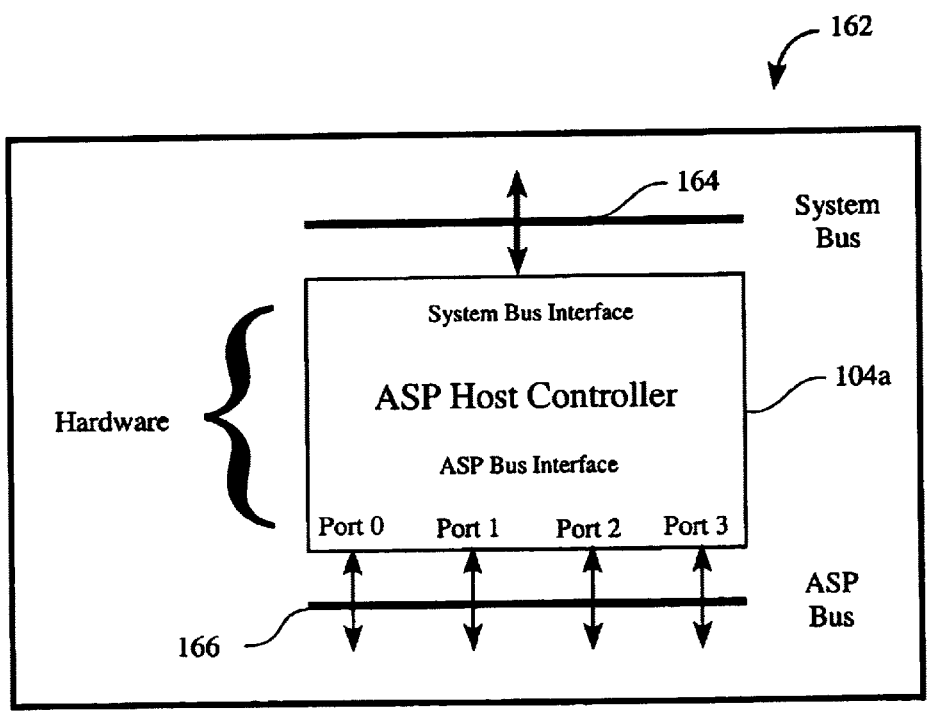
FIG. 8 illustrates in greater detail the ASP host controller, in accordance with one embodiment of the present invention.

FIG. 8 shows a more detailed diagram of the ASP Host Controller 104a, which consists of a system bus interface and an ASP bus interface. These two interfaces provide data flow between the host and the ASP devices 106. In one preferred embodiment, the ASP Host Controller 104a can support one outstanding command per device. The system bus interface allows the system software by way of a system bus 164 to communicate with the ASP devices. It provides a mechanism to transfer data to and from the host memory, and a mechanism to send notifications to the system software. In one embodiment, it uses a DMA controller to transfer data to and from the host memory, and uses an interrupt to send a notification to the system software at successful command completion or abort due to errors. In one preferred embodiment, the Host Controller also supports scatter/gather data transfers. The ASP Host Controller 104a supports a mechanism to accept ATA/ATAPI commands. The system bus interface may contain some configurable parameters. Some of these configurable parameters include: (a) capabilities of the host controller; (b) configurable link speeds, packet sizes, and repeat counts per device; (c) globally and individually maskable interrupts, and interrupt status; (d) device attachment information; and (e) mechanisms to start a command execution and data transfer.

In one embodiment, the ASP bus interface provides four ASP ports by way of an ASP bus 166, allowing up to four ASP devices to be connected to the host. It is capable of generating and receiving serial data packets using the ASP protocol. The host controller is responsible for receiving commands from the host and sending them to the device on the addressed port, transferring data between system memory and the ASP devices, and receiving status from the ASP devices and sending them to the host. In one embodiment, a round-robin polling algorithm is used to transfer data to and from the ASP devices to guarantee fairness. It is also responsible for detecting the attachment and removal of ASP devices, and sending notifications to the host to request configuration services. Bus transactions are retried, up to a predefined limit, to recover from occasional delivery failure due to errors on the bus.

An ASP Host Controller Driver (HCD) is the layer of system software that communicates with the ASP Host Controller hardware. The HCD provides an abstraction of the host controller and an abstraction of the host controller's view of data transfer across the ASP bus. The Host Controller Driver is responsible for initializing the ASP Host Controller 104a, identifying and configuring the attached ASP devices 106. To configure the ASP devices 104a, the HCD issues a request to each device to obtain the Link Control Data, sets up the proper parameters, and sends it back to the device to configure it for proper operation.

Furthermore, the Host Controller Driver (HCD) receives ATA/ATAPI commands from the ATA/ATAPI host software, encapsulates the ATA/ATAPI command in a data structure with a scatter/gather list of data buffers, and sends to the host controller, and at command completion receives status from the ASP devices and returns them to the upper-layer ATA/ATAPI host software. The HCD uses an improved way of addressing the devices 106, removing the limitation of addressing only up to two devices. For instance, bit 4 of the value at offset 6 of the ATA command structure, which was used to address one of the two devices, is no longer used.

In accordance with the present invention, ASP can issue one outstanding command per device to the ASP Host Controller 104a. Thus, all devices can overlap their command executions. The HCD also provides the memory addresses and transfer counts to the ASP Host Controller 106, and the data transfer is performed by the DMA controller. Also, the value at offset 0, which was used for PIO data transfers, is no longer used. The use of DMA commands and the use of LBA addressing instead of CHS addressing are now used. The following data elements contain the relevant information for a request: (a)an ATA command and optionally an ATAPI command, and an ATA status; (b) data transfer information indicating the addressed device, whether data transfer is involved, and the direction of the data transfer; and (c) physical memory addresses and transfer counts of a list of scatter/gather data buffers.

The Host Controller Driver (HCD) is also responsible for receiving notifications from the ASP Host Controller 106 when a device is inserted or removed. Upon receipt of a device insertion notification, the HCD requests the Link Control Data from the device, sets up the proper parameters, and sends it back to the device to configure it for proper operation. Upon receipt of a device removal notification, the HCD stops sending subsequent commands to the addressed device.

The ATA/ATAPI Host Software receives I/O request packets from the operating system's file system. It then translates the request into an ATA (and ATAPI) command, and sends this command to the Host Controller Driver 106. Standard ATA/ATAPI commands as well as vendor specific commands can be supported.

Figure 9:
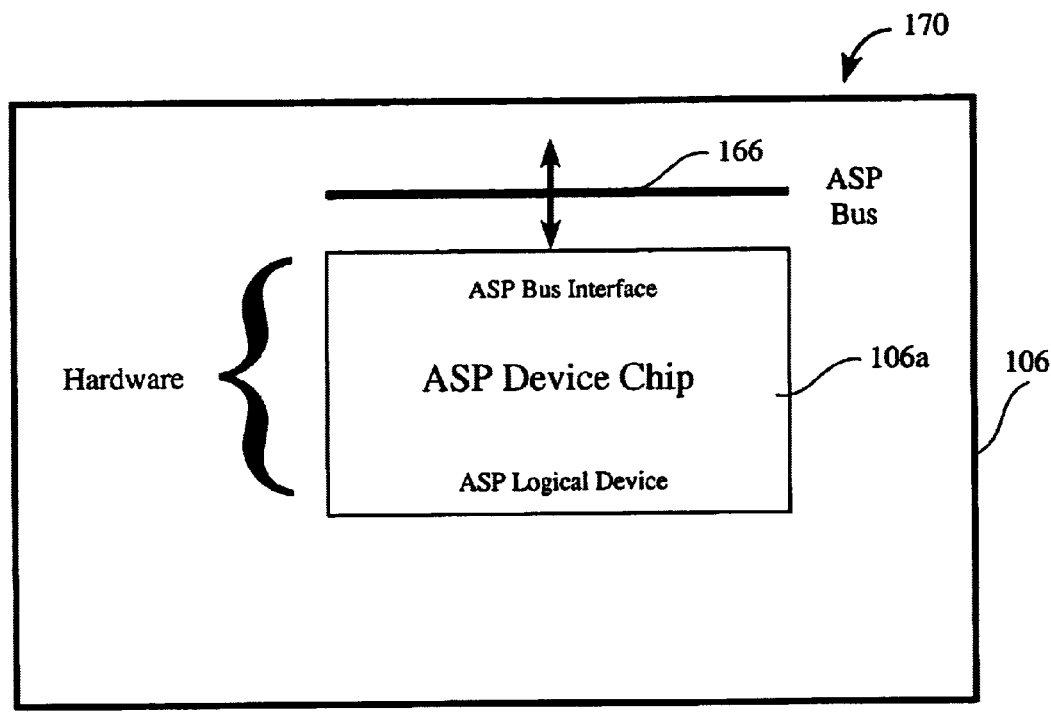
FIG. 9 provides a more detailed diagram of an ASP device chip, in accordance with one embodiment of the present invention.

An ASP physical device's logical composition as shown in FIG. 9. As shown, the ASP device 106 includes an ASP bus interface to connect up to the ASP bus 166 and an ASP logical device. The ASP bus interface provides an ASP port that can be connected to one of the host ASP ports. It is capable of receiving and responding to the various serial packet types using the ASP protocol. It is also capable of interpreting the data types to correctly use the data contained in the data packet. Table 2 below shows some of the most common request packets.

TABLE 2

Common Request Packets

| Packet Type | Data (Reset) Type | Description |
| --- | --- | --- |
| INSTART | LINK DATA | Host requests Link Data from device. |
| INSTART | DEVICE DATA | Host requests Device Data from device. |
| INSTART | CONTROL | Host requests Status from device. |
| OUTDATA | LINK DATA | Host writes Link Data to device. |
| OUTDATA | DEVICE DATA | Host writes Device Data to device. |
| OUTDATE | CONTROL | Host sends Command to device. |
| RESET | LINK | Host resets Link of device. |
| RESET | DEVICE | Host resets Device. |
| RESET | LINK & DEVICE | Host resets Link and Device. |
| RESET | SEQUENCE BIT | Host resets Sequence Bit. |
| HEARTBEAT | NONE | Host checks for device insertion/removal. |

All ASP devices 106 present the same basic ASP bus interface to the host. This allows the host to manage the ASP-relevant aspects of different ASP devices in the same manner. Each device is addressed by the host port address to which it is attached. Each device is uniquely identifiable by the contents of the Identify Device (an ATA command) data. To assist the host in identifying and configuring ASP devices 106, each device carries and reports configuration related information. Some of the information reported is common among all logical devices. Other information is specific to the functionality provided by the device. The detailed format of this information varies depending on device.

Figure 10:
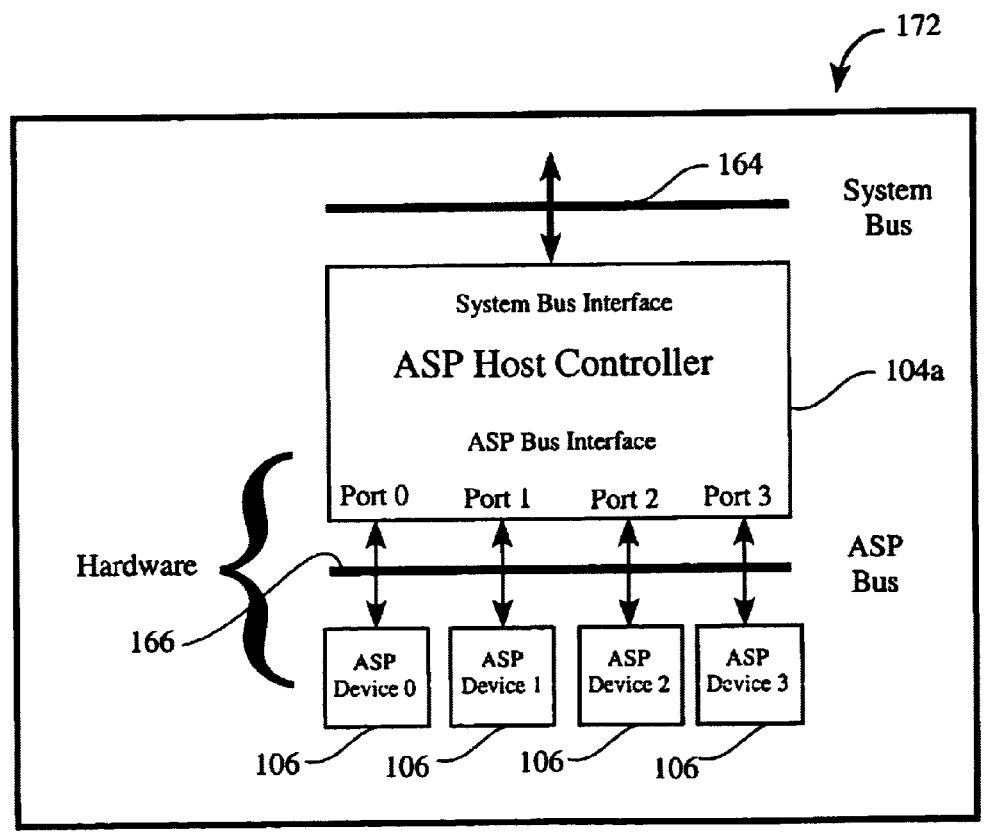
FIG. 10 illustrates a more detailed diagram of the ASP host controller connecting to multiple ASP devices, in accordance with one embodiment of the present invention.

Devices on the ASP bus are physically connected to the host via a star topology, as illustrated in diagram 172 of FIG. 10. ASP attachment points that are provided by a host controller are called ports. A host controller typically provides up to four ports. Each device attached to the host controller is addressed by the port to which it is connected. Each port is assigned an address, 0 to 3, according the physical position of the port. Thus, the device itself does not have to have an address. Its address is determined by the address of the port to which it is attached. Thus, each ASP device 106 connects to the ASP bus 166 and to the respective ports of the ASP Bus Interface. The ASP host controller 104a then communicates with the system bus 164 by way of the system bus interface, as discussed above.

ASP provides a communication service between software on the host and its ASP device. ASP devices can have different communication flow requirements for different host to device interactions. ASP provides better overall bus utilization by allowing the separation of the different communication flows to an ASP device. Each communication flow makes use of some bus access to accomplish communication between host and device. Each communication flow is controlled by the host controller.

Figure 11A:
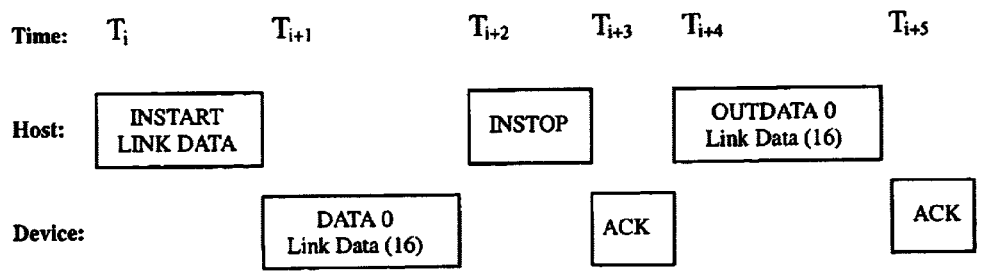
FIGS. 11A–11C illustrate timing diagrams of communication between an ASP enabled host and an ASP device, in accordance with one embodiment of the present invention.
Figure 11B:
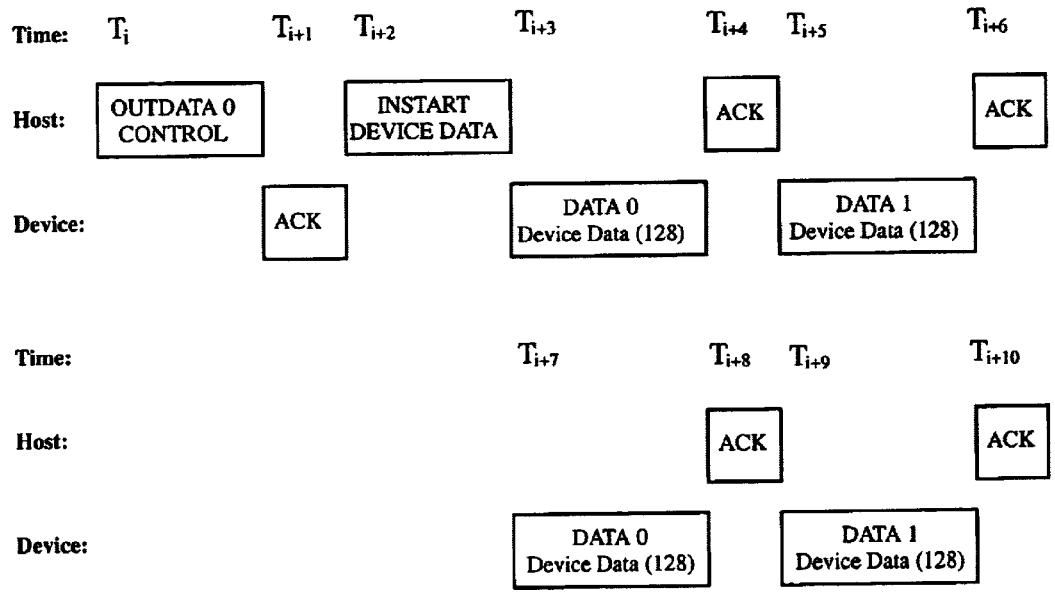
Figure 11B:
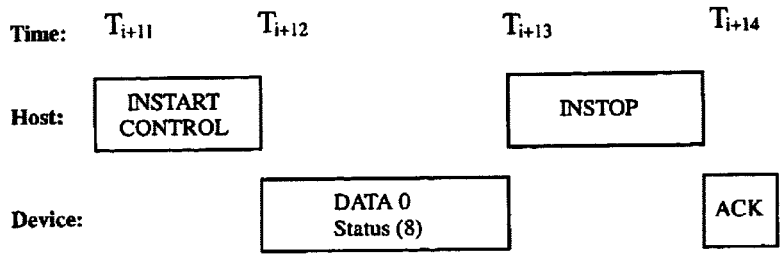
Figure 11C:
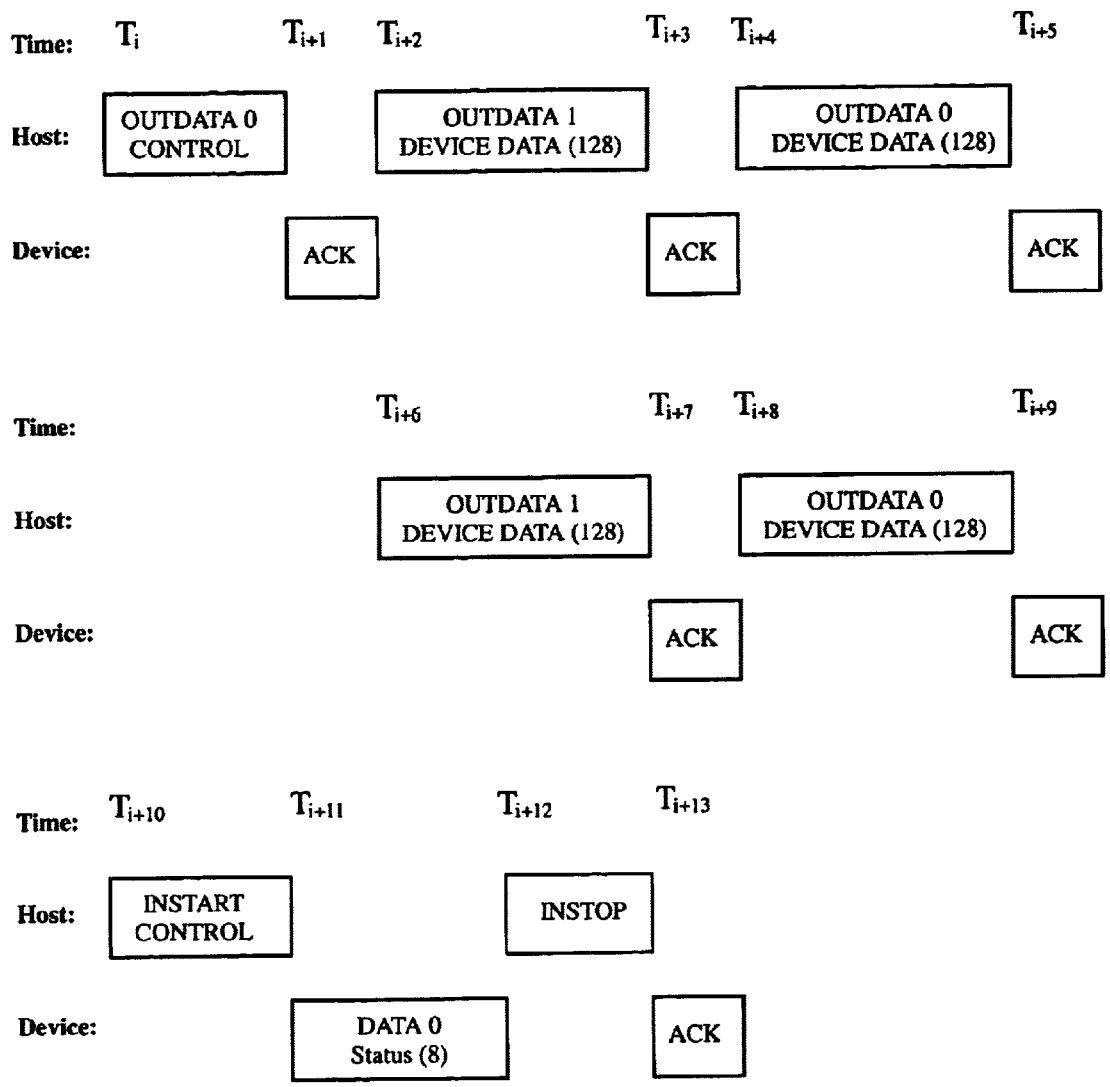

The following are some common ASP transactions in a communication flow. During initialization, the host controller configures an ASP device as shown in FIG. 11A. FIG. 11B shows the communication flow for a one-sector disk read command, and FIG. 11C shows the communication flow for a one-sector disk write command.

In one embodiment, system software requests that data be moved across the ASP bus between a buffer on the host and an ASP device 106. The host controller (or ASP device depending on transfer direction) packetizes the data to move it over the ASP bus. The host controller also coordinates when bus access is used to move the packet of data over the ASP bus.

ASP transports data between a memory buffer associated with system software on the host and an ASP device. Data transported is carried in an ASP defined structure, but ASP allows device specific structured data to be transported within the ASP defined data payload. ASP also defines that data moved over the bus is packetized, but ultimately the formatting and interpretation of the data transported in the data payload of a bus transaction is the responsibility of the system software and the device. However, ASP provides different data types that are optimized to more closely match the service requirements of the system software and the device. Three data types have been defined. LINK DATA type refers to the link configuration information of the device. CONTROL type refers to a command or status. DEVICE DATA refers to the data on the media of the device.

Data transactions use data sequence bits that are toggled only upon successful transaction completion to preserve synchronization between transmitter and receiver when transactions are retried due to errors. Data transactions are initialized to DATA0 and OUTDATA0 at power on. The host will also start the first data transaction with OUTDATA0. The Host Controller must keep track of the transmit and receive data sequence bits for each device. The data sequence bits can reset to DATA0 and OUTDATA0 by the Host Controller, and at the same time the Host Controller must also reset its data sequence bits to DATA0 and OUTDATA0.

In one embodiment, ASP defines the allowable maximum data packet sizes to be 128, 256, 512, 1024, or 2048 bytes. This maximum applies to the data payloads of the data packets; i.e.; the size specified is for the data field of the packet, not including other protocol required information. The maximum packet to be used can be determined by the system software by examining the maximum packet size supported by the ASP device and the Host Controller. ASP does not require that data payloads be transmitted exactly the maximum size; i.e., if a data payload is less than the maximum, it does not, in one embodiment, need to be padded to the maximum size. The actual amount of data in the payload is specified in the Byte Count field. Bandwidth efficiency is higher if a large packet size is used. However, a large packet size requires a large buffer.

ASP bus transaction times are calculated based on the data packet size and the protocol overhead. The efficiencies in percentages and in throughput (at 320 MBps) are also calculated. Read and write transactions sizes and times are shown in table 3 below.

TABLE 3

Transaction Element Sizes (Bytes)

| Element | INSTART | DATA | INSTOP | ACK | OUTDATA | RESET | HEARTBEAT |
|---|---|---|---|---|---|---|---|
| Turn-Around | 2 | 2 | 2 | 2 | 2 | 2 | 2 |
| SYNC | 2 | 2 | 2 | 2 | 2 | 2 | 2 |
| Packet Type | 1 | 1 | 1 | 1 | 1 | 1 | 1 |
| Data Type | 1 | | | | 1 | 1 | |
| Byte Count | | 3 | | | 3 | | |
| CRC | | 4 | | | 4 | | |
| Total | 6 | 12 + Payload | 5 | 5 | 13 + Payload | 6 | 5 |

For single read transactions, a DATA packet is preceded by an INSTART, and is terminated with an INSTOP and an ACK, and the subsequent DATA packet will repeat the same sequence.

TABLE 4

Single Read Transaction Sizes (Bytes)

| Payload | INSTART | DATA | INSTOP | ACK | Total Length | Useful Data | Efficiency, % |
|---|---|---|---|---|---|---|---|
| 128 | 6 | 140 | 5 | 5 | 156 | 128 | 82.05 |
| 256 | 6 | 268 | 5 | 5 | 284 | 256 | 90.14 |
| 512 | 6 | 524 | 5 | 5 | 540 | 512 | 94.81 |
| 1024 | 6 | 1036 | 5 | 5 | 1052 | 1024 | 97.34 |
| 2048 | 6 | 2060 | 5 | 5 | 2076 | 2048 | 98.65 |

TABLE 5

Single Read Transaction Times (usec)

| Payload | INSTART | DATA | INSTOP | ACK | Total Length | Useful Data | Efficiency, MB/s |
|---|---|---|---|---|---|---|---|
| 128 | 0.15 | 3.5 | 0.125 | 0.125 | 3.9 | 3.2 | 32.82 |
| 256 | 0.15 | 6.7 | 0.125 | 0.125 | 7.1 | 6.4 | 36.06 |
| 512 | 0.15 | 13.1 | 0.125 | 0.125 | 13.5 | 12.8 | 37.93 |
| 1024 | 0.15 | 25.9 | 0.125 | 0.125 | 26.3 | 25.6 | 38.94 |
| 2048 | 0.15 | 51.5 | 0.125 | 0.125 | 51.9 | 51.2 | 39.46 |

For multiple read transactions, the first DATA packet in a group is preceded by an INSTART, and is terminated with an ACK, and the subsequent transfers will contain only DATA and ACK packets. The ACK packet acts like an implied INSTART packet.

TABLE 6

Multiple Read Transaction Sizes (Bytes)

| Payload | INSTART | DATA | ACK | Total Length | Useful Data | Efficiency, % |
|---|---|---|---|---|---|---|
| 128 | 6 | 140 | 5 | 151 | 128 | 84.77 |
| 256 | 6 | 268 | 5 | 279 | 256 | 91.76 |
| 512 | 6 | 524 | 5 | 535 | 512 | 95.70 |
| 1024 | 6 | 1036 | 5 | 1047 | 1024 | 97.80 |
| 2048 | 6 | 2060 | 5 | 2071 | 2048 | 98.89 |

TABLE 7

Multiple Read Transaction Sizes (usec)

| Payload | INSTART | DATA | ACK | Total Length | Useful Data | Efficiency, MB/s |
|---|---|---|---|---|---|---|
| 128 | 0.15 | 3.5 | 0.125 | 3.775 | 3.2 | 33.91 |
| 256 | 0.15 | 6.7 | 0.125 | 6.975 | 6.4 | 36.70 |
| 512 | 0.15 | 13.1 | 0.125 | 13.375 | 12.8 | 38.28 |
| 1024 | 0.15 | 25.9 | 0.125 | 26.175 | 25.6 | 39.12 |
| 2048 | 0.15 | 51.5 | 0.125 | 51.775 | 51.2 | 39.56 |

TABLE 8

Write Transaction Sizes (Bytes)

| Payload | OUTDATA | ACK | Total Length | Useful Data | Efficiency, % |
|---|---|---|---|---|---|
| 128 | 141 | 5 | 146 | 128 | 87.67 |
| 256 | 269 | 5 | 274 | 256 | 93.43 |
| 512 | 525 | 5 | 530 | 512 | 96.60 |
| 1024 | 1037 | 5 | 1042 | 1024 | 98.27 |
| 2048 | 2061 | 5 | 2066 | 2048 | 99.13 |

TABLE 9

Write Transaction Sizes (usec)

| Payload | OUTDATA | ACK | Total Length | Useful Data | Efficiency, MB/s |
|---|---|---|---|---|---|
| 128 | 3.525 | 0.125 | 3.65 | 3.2 | 35.07 |
| 256 | 6.725 | 0.125 | 6.85 | 6.4 | 37.37 |
| 512 | 13.125 | 0.125 | 13.25 | 12.8 | 38.64 |
| 1024 | 25.925 | 0.125 | 26.05 | 25.6 | 39.31 |
| 2048 | 51.525 | 0.125 | 51.65 | 51.2 | 39.65 |

In regard to error handling, link retry by hardware to recover from errors on the bus is configured to help minimize host CPU intervention. An error in each field of a packet can be therefore be detected. The packet type, data (or reset) type, and byte count fields can be checked with their respective complement fields and valid codes. The data field can be checked with the CRC field, and its length can be checked with the byte count field. In addition, data packets are sequenced with a sequence bit to prevent lost data packets. After detecting an error, the receiver waits maximum packet size time, and starts to look for a SYNC of a retried packet. Successful and unsuccessful link retries can be reported to the host by the Host Controller.

The following discussion will now provide an overview of the mechanical specification for the cables and connectors used in ASP. For completeness, this discussion will define preferred exemplary dimensions, materials, electrical, and reliability requirements.

Architectural Overview

The physical topology of ASP consists of point-to-point links from the multiconnecter host to each device. The initial speed that each link will operate at is 320 Mbits/sec, but other higher speeds will be defined. Since the interface is intended to operate as internal connections, ASP will use an unshielded twisted pair cable. The cable will consist of 3 twisted pair with two pair being used for the Data and Strobe signal, and the other pair used for grounds.

Plugs and receptacles used for ASP are standard internal connectors that are defined in IEEE and X3T10.1 physical specifications for storage devices. This specification is hereby incorporated by reference. A four device SMT connector will be used on the host side which will provide connections for up to 4 ASP devices 106. The cable connector will utilize a 6 pin IDT cable connector as defined in the IEEE specification. The host connector will use a 6 pin connector.

Default tolerances are listed in Table 10, unless otherwise specified. The dimensions are in millimeters.

TABLE 10

Default Tolerances

| Over 1 to 5 | Over 5 to 30 | Over 30 to 100 | Over 100 to 300 | Over 300 to 1000 | Over 1000 to 3000 | Over 3000 to 5000 |
|---|---|---|---|---|---|---|
| ±0.3 | ±0.4 | ±0.6 | ±0.8 | ±1.6 | ±2.5 | ±10 |

The standard ASP cable will consist of three pair of 30 AWG pair twisted. The cable will not be, in one embodiment, shielded since it will be used inside the cabinet. In another embodiment, use of ASP outside the system box will require the use of a shielded twisted pair cable. Additionally, the cable may be a three twisted pair, 30 AWG, PVC, round cable.

The preferred cable voltage rating should be about 30 V (rms), and the conductor resistance, is defined in Table 11 (when tested in accordance with ASTM-D-4565).

TABLE 11

Conductor Resistance

| Gauge | DC Resistance (max.) |
|---|---|
| 28 | 0.232 Ω/m |

Furthermore, in one embodiment, the resistance unbalance between the two conductors shall not exceed about 5% when tested in accordance with ASTM-D-4566. aximum cable length shall be about 1.5 meters. The attenuation of the signal pair measured in accordance with ASTM-D-4566 shall not exceed the values in Table 12. The characteristic impedance of the signal pair shall be about 110 Ω±15%, when measured in accordance with ASTM-D-4566 over the frequency range of 1–300 MHz. And, propagation delay of the fully rated twisted signal pair must be equal to or less than about 30 ns over the length of cable used in the frequency range of 1–300 MHz. The maximum skew between the two signal pair must be less than about 50 ps/m at 300 MHz.

TABLE 12

Signal Attenuation

| Frequency (MHz) | Attenuation (maximum) dB/1.5 m |
|---|---|
| 300 | 4.5 |

All electrical measurements should be made with a sample cable removed from the reel or container. The cable must rest on a non-conductive surface. Table 13 illustrates an example cable color code scheme and Table 14 illustrates the cable contact numbering.

TABLE 13

Cable Color Code

| Wire | Color |
|---|---|
| +Data | Green |
| −Data | White |
| Ground | Red |
| Ground | Black |
| +Strobe | Blue |
| −Strobe | Yellow |

TABLE 14

Contact Numbering

| Contact Number | Signal Name | Comment |
|---|---|---|
| 1 | +Data | |
| 2 | −Data | |
| 3 | Ground | Cable ground |
| 4 | Ground | Cable ground |
| 5 | +Strobe | |
| 6 | −Strobe | |

Product is designed to meet electrical, mechanical, and environmental performance requirements specified in Table 15. Unless otherwise specified, all tests shall be performed at ambient environmental conditions.

TABLE 15

Test Requirements and Procedures Summary

| Test Description | Requirement | Procedure |
|---|---|---|
| Examination of product | Meets requirements of Section 6.3 | Visual, dimensional, and functional compliance |
| ELECTRICAL | | |
| Termination resistance | 30 mΩ maximum | EIA 364–23<br>Subject mated contacts assembled in housing to 20 mV maximum open circuit at 100 mA maximum. |
| Insulation resistance | 1000 MΩ minimum | EIA 364–21<br>Test between adjacent contacts of mated and unmated connector assemblies |
| Dielectric withstanding voltage | 750 Vac at sea level | EIA 364–20<br>Test between adjacent contacts of mated and unmated connector assemblies |
| Capacitance | 2 pF maximum | EIA 364–30<br>Test between adjacent circuits of unmated connectors at 1 kHz |
| MECHANICAL | | |
| Vibration, random | No discontinuities of 1 μs or longer duration. See Note. | EIA 364–28 Condition V Test letter A. Subject mated connectors to 5.35 G's rms. Fifteen minutes in each of three mutually perpendicular planes. |
| Physical shock | No discontinuities of 1 μs or longer duration. See Note. | EIA 364–27 Condition H. Subject mated connectors to 30 G's half-sine shock pulses of 11 ms duration. Three shocks in each direction applied along three mutually perpendicular planes, 18 total shocks. |
| Durability | See Note. | EIA 364–09<br>Mate and unmate connector assemblies for 1500 cycles at maximum rate of 200 cycles per hour |

TABLE 16

Test Requirements and Procedures Summary (Continued)

| Test Description | Requirement | Procedure |
|---|---|---|
| Mating force | 35 Newtons maximum | EIA 364-13. Measure force necessary to mate connector assemblies at maximum rate of 12.5 mm per minute. |
| Unmating force | 10 Newtons minimum | EIA 364-13. Measure force necessary to unmate connector assemblies at maximum rate of 12.5 mm per minute. |
| Cable Retention | Cable shall not dislodge from cable crimp. | Apply axial load of 25 Newtons to the cable. |
| ENVIRONMENTAL | | |
| Thermal shock | See Note. | EIA 364-32 Test Condition I. Subject mated connectors to five cycles between −55° C. and 85° C. |
| Humidity | See Note. | EIA-364-31 Method II Test Condition A. Subject mated connectors to 96 hours at 40° C. with 90 to 95% RH. |
| Temperature life | See Note. | EIA-364-17 Test Condition 3 Method A. Subject mated connectors to temperature life at 85° C. for 250 hours. |

If the cabling selected cannot meet the requirements, then use Table 17 to limit the cable length for fully rated channels.

TABLE 17

Propagation Delay vs. Cable Length

| Cable Propagation Delay Specification | Maximum Cable Length |
|---|---|
| <5.0 ns/m | 1.5 m |

The ASP uses a differential output driver to drive the ASP data and strobe signal onto the cable. The signaling levels are compatible with the IEEE 1596.3 and TIA/EIA-644 standard for LVDS. These standards are hereby incorporated by reference. Tables 18 through 21 below show the preferred driver and receiver specifications.

TABLE 18

Driver DC Specifications

| Symbol | Parameter | Conditions | Min | Max | Units |
|---|---|---|---|---|---|
| $V_{oh}$ | Output Voltage High, $V_{oa}$, or $V_{ob}$ | $R_{load}$ = 100 Ohm ± 1% | | 1475 | mV |
| $V_{ol}$ | Output Voltage Low, $V_{oa}$, or $V_{ob}$ | $R_{load}$ = 100 Ohm ± 1% | 925 | | mV |
| $|V_{od}|$ | Output differential voltage | $R_{load}$ = 100 Ohm ± 1% | 250 | 400 | mV |
| $V_{os}$ | Output offset voltage | $R_{load}$ = 100 Ohm ± 1% | 1125 | 1275 | mV |
| $R_o$ | Output impedance, single ended | $V_{cm}$ = 1.0 V and 1.4 V | 40 | 140 | ohm |
| Delta $R_o$ | $R_o$ mismatch between A & B | $V_{cm}$ = 1.0 V and 1.4 V | | 10 | % |
| $|$Delta $V_{od}|$ | Change in $|V_{od}|$ between '0' and '1' | $R_{load}$ = 100 Ohm ± 1% | | 25 | mV |
| Delta $V_{os}$ | Change in Vos between '0' and '1' | $R_{load}$ = 100 Ohm ± 1% | | 25 | mV |
| $I_{sa}$, $I_{sb}$ | Output Current | Driver shorted together | | 40 | mA |
| $I_{sab}$ | Output Current | Driver shorted together | | 120 | mA |
| $|I_{xa}|$, $|I_{xb}|$ | Power-off leadage | $V_{cc}$ = 0 V | | 10 | mA |

TABLE 19

Receiver DC Specifications

| Symbol | Parameter | Conditions | Min | Max | Units |
|---|---|---|---|---|---|
| $V_i$ | Imput Voltage range, $V_{ia}$, or $V_{sb}$ | $|V_{gpd}|$ < 925 mV | 0 | 2400 | mV |
| $V_{idth}$ | Input differential threshold | $|V_{gpd}|$ < 925 mV | −100 | +100 | mV |
| $V_{hyst}$ | Input differential hysteresis | $V_{idthb}$-$V_{idthl}$ | 25 | | mV |

TABLE 19-continued

Receiver DC Specifications

| Symbol | Parameter | Conditions | Min | Max | Units |
|---|---|---|---|---|---|
| $R_{in}$ | Receiver differential input impedance | | 90 | 110 | ohm |

TABLE 20

Driver AC Specifications

| Symbol | Parameter | Conditions | Min | Max | Units |
|---|---|---|---|---|---|
| Clock | Clock signal duty cycle | 250 Mhz | 45 | 55 | % |
| $t_{fal}$ | Vod fall, time 20% to 80% | $Z_{load}$ = 100 ohm ± 1% | 300 | 500 | ps |
| $t_{rise}$ | Vod fall, time 20% to 80% | $Z_{load}$ = 100 ohm ≤ 1% | 300 | 500 | ps |
| $t_{skew1}$ | $|tp_{hla}-tp_{lhb}|$ or $|tp_{hib}-tp_{tha}|$ differential skew | Any differential pair on the package | | 50 | ps |
| $t_{skew2}$ | $||tpdiff[m]-tpdiff[n]||$ channel to channel skew | Any 2 signals on package | | 100 | ps |

TABLE 21

Receiver AC Specifications

| Symbol | Parameter | Conditions | Min | Max | Units |
|---|---|---|---|---|---|
| $T_{skew}$ | Skew tolerable at receiver input to meet setup and hold time requirements | Any 2 package inputs | | 600 | ps |

Figure 12:
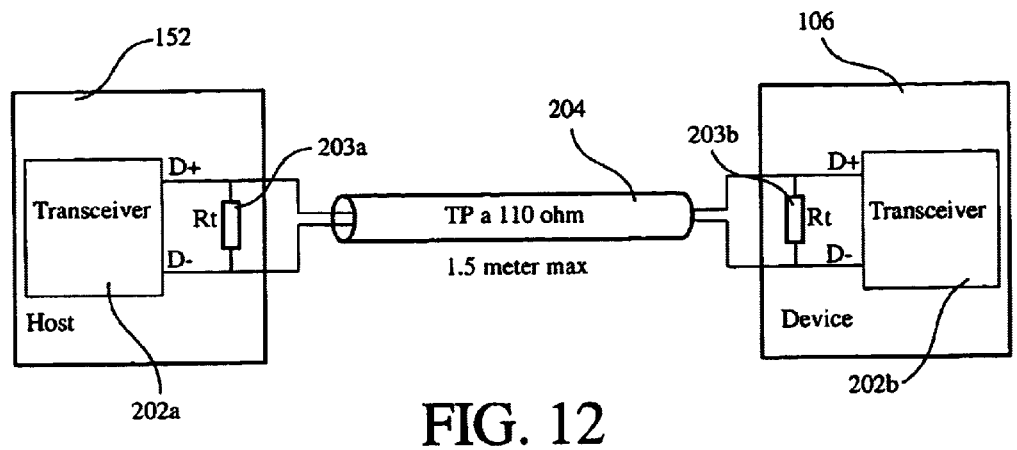
FIG. 12 provides an example of termination techniques at each end of a physical serial bus of the ASP, in accordance with one embodiment of the present invention.

In this embodiment, ASP links are terminated at both ends of the cable with 110 ohm impedance. The termination can either be built into the host and device chip or be a separate component. As shown in FIG. 12, the host 152 has a transceiver 202a and the device 106 has a transceiver 202b. Each end of the cable 204 is shown terminated by an impedance 203a and 203b. Data transmission within a packet is done with differential signals. A differential 1 on the bus is represented by D+ being at least 100 mV more positive than D− as seen at the receiver, and a differential 0 is represented by D− being at least 100 mV more positive than D+ as seen at the receiver.

Figure 13:
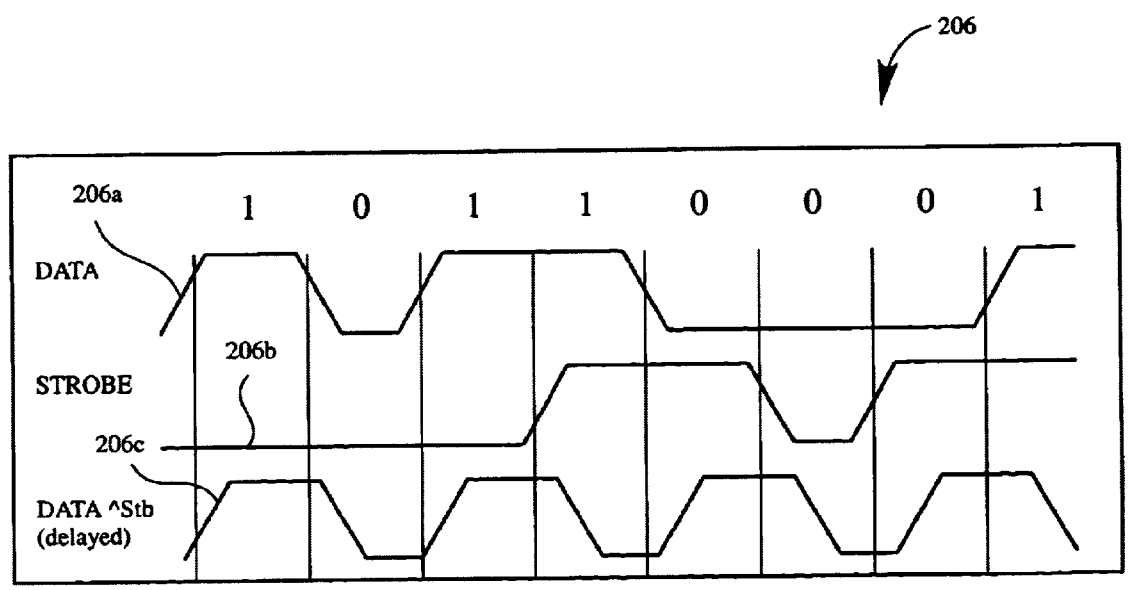
FIG. 13 illustrates a data encoding/decoding timing diagram, in accordance with one embodiment of the present invention.

Furthermore, in one embodiment, ASP employs DS encoding when transmitting packets. This is a technique that sends a data signal on one pair of wires and a strobe signal on another. The encode and decode is very simple and this technique assures there are clock transitions on at least one of the sets of wires at all times. This technique gives a full bit time to strobe data so it is better than sending a clock signal separate from the data. The other advantage of this type of encoding is that there is no need for a phase lock loop (PLL) on the receiver which decreases the complexity of the logic and the fact that the receiver "autobauds". FIG. 13 shows a diagram 206 of an example of the data and strobe signals for a particular data pattern and the recovered Data Strobe signal that clocks in the data. For instance, data 206a, strobe 206b and data stb (delayed) 206c are shown for ease of understanding.

Figure 14A:
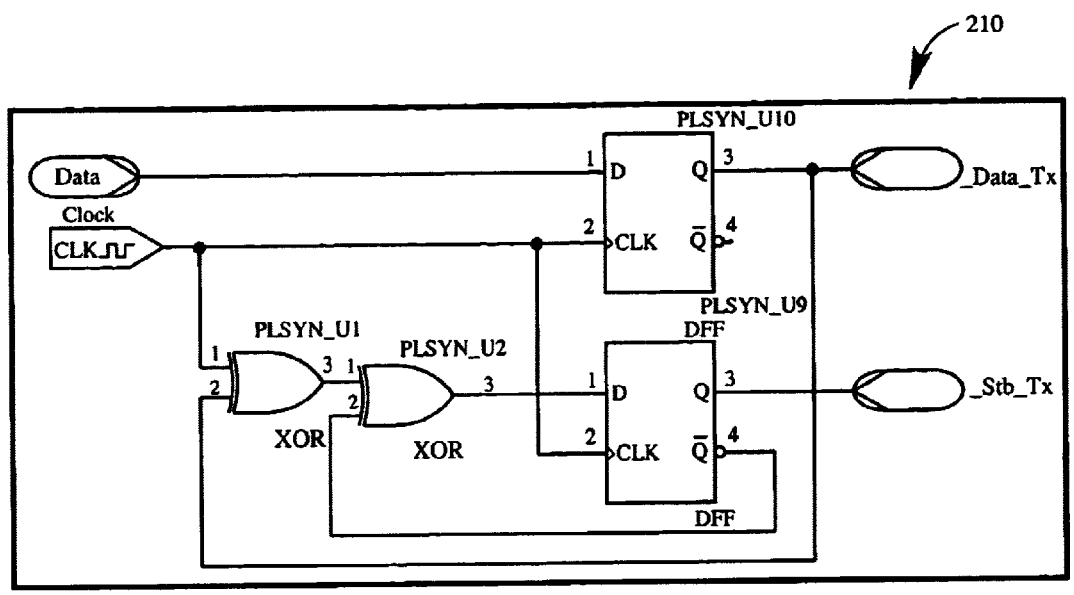
FIGS. 14A and 14B illustrate exemplary encoding and decoding circuitry, respectively, in accordance with one embodiment of the present invention.
Figure 14B:
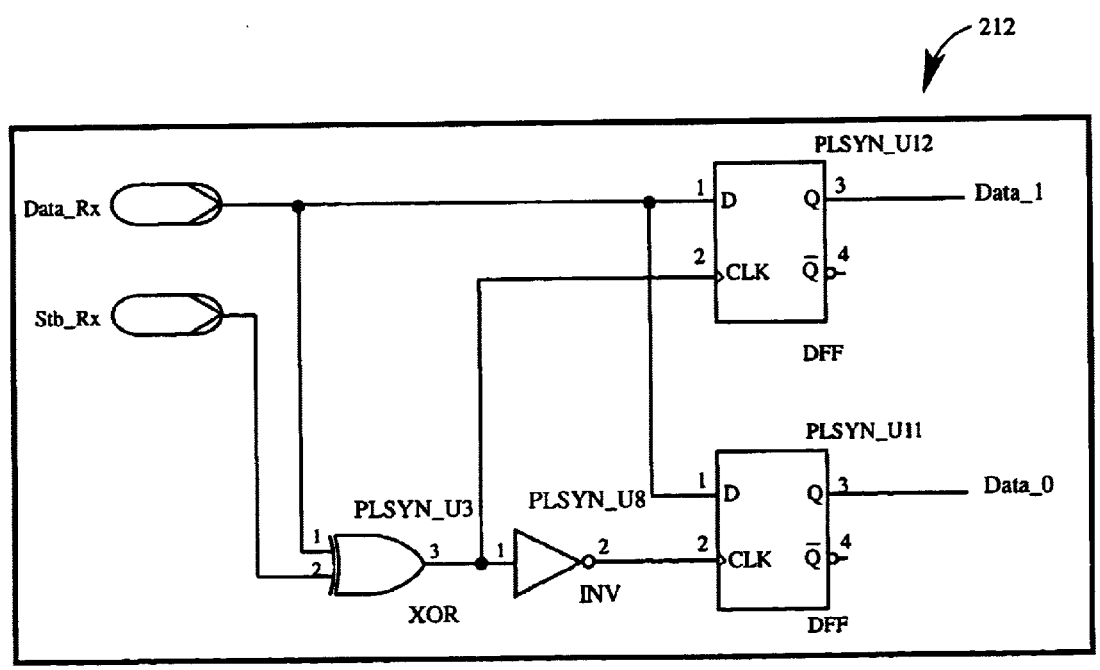

FIGS. 14A and 14B show the encode circuit 210 and decode circuit 212 used in ASP. Note that the clock is recovered from the data and strobe signal with no need of a PLL so no lock time is required on the turnaround of the cable.

Figure 15:
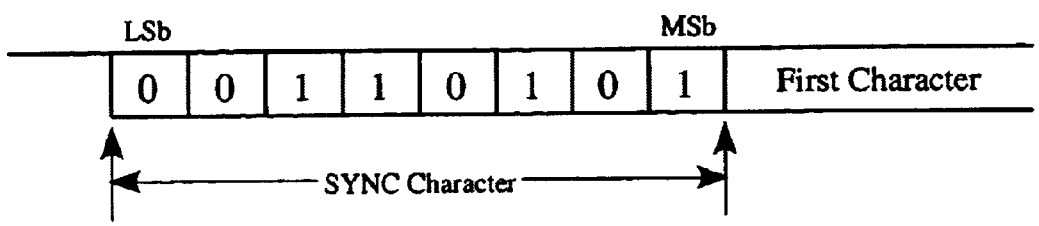
FIG. 15 illustrates a sync character, which are sent to ensure byte synchronization before a packet, in accordance with one embodiment of the present invention.

To ensure byte synchronization, Sync characters will precede each packet. The receiver will detect the sync pattern which will provide proper byte alignment and will accept the first non Sync character as the first byte of the packet. The Sync character is shown below in FIG. 15. No packet type (PT) uses this pattern.

Figure 16:
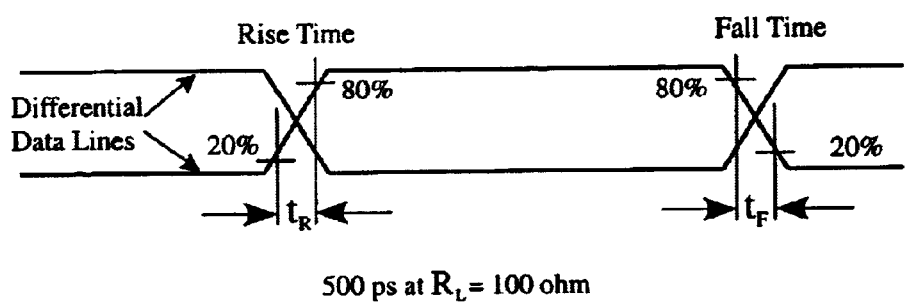
FIG. 16 illustrates data signal rise and fall time, in accordance with one embodiment of the present invention.

The full speed data rate is nominally 320 Mbps. Of course this can be higher if desired. The data rate tolerance for host or device hub is, in one embodiment, about ±0.25% (2500 ppm). This tolerance includes inaccuracies from all sources: initial frequency accuracy, crystal capacitive loading, supply voltage on the oscillator, temperature, and aging. The output rise time and fall time are measured between about 20% and about 80% of the signal as shown in FIG. 16. Edge transition time for the rising and falling edges of full speed data signals is 500 ps (maximum) measured with a load ($R_L$) of 100 ohm. Thus, the rise and fall times must be well matched. The rising and falling edges should be smoothly transitioning (monotonic) when driving their respective cables to avoid excessive EMI.

Figure 17:
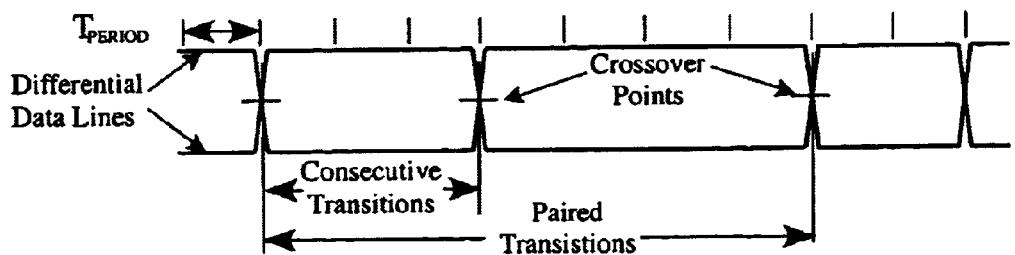
FIG. 17 is provided to illustrate data jitter handling, in accordance with one embodiment of the present invention.

The following now describes the timing characteristics of data produced and sent from a device (the data source). In this section, $T_{PERIOD}$ is defined as the actual period of the data rate which can have a range as defined above. The source of data can have some variation (jitter) in the timing of edges of the data transmitted. The time between any set of data transitions is N * $T_{PERIOD}$±jitter time, where 'N' is the number of bits between the transitions. The data jitter is measured with the same capacitive load used for maximum rise and fall times and is measured at the crossover points of the data lines as shown in FIG. 17.

For full speed transmissions, the jitter time for any consecutive differential data transitions must be within about ±300 ps and within about ±150 ps for any set of paired differential data transitions. These jitter numbers include timing variations due to differential buffer delay and rise/fall time mismatches, internal clock source jitter and to noise and other random effects. In regard to receiver jitter, the data receivers for all types of devices must be able to properly decode the differential data in the presence of jitter. The more of the bit cell that any data edge can occupy and still be decoded, the more reliable the data transfer will be.

DS encoding allows a full bit time for data recover, but the center of the bit must be located as accurate as possible due to skew delay between the Data and Strobe signals and the jitter of the driver and receiver. As shown in Table 22, the complete skew and jitter budget for the example case of 320 Mbps. The margin is computed from the following:

Margin=Bit cell time−(data jitter+Strobe jitter+Skew)

Margin=3.125 ns−(0.755+0.755+0.28)=+1.335 ns

TABLE 22

Jitter Budget

| | DATA JITTER | STROBE JITTER | SKEW |
|---|---|---|---|
| Transmitter Skew | | | 0.1 |
| Transmitter Jitter | .015 | 0.15 | |
| Cable Reflections | 0.035 | 0.035 | |
| Cable Intersymbol | 0.13 | 0.13 | |
| Cable Delay Mismatch | | | 0.13 |
| Channel Margin | 0 | 0 | |
| Jitter at Receive Pins | 0.315 | 0.315 | 0.23 |
| Receiver Offset | 0.14 | 0.14 | 0.05 |
| Receiver Intersymbol and power supply rejection | 0.1 | 0.1 | |
| Flip flop setup & hold | 0.2 | 0.2 | |
| Total | 0.755 | 0.755 | 0.28 |

Skew between the Data and Strobe cables is preferably minimized for proper operation of DS encoding. The maximum skew differential between the data and strobe signals should be no greater than a total of about 200 ps for the 1.5 meter cable example. Typical pair to pair skew for twisted pair is 50–60 ps per meter. The cable delay mismatch shown in the above must be small enough to keep the margin a positive value. Shorter cables should be used to keep the margin value positive for proper operation.

In one embodiment, the ASP protocol is half duplex and uses half duplex links to minimize costs. The turnaround delay is preferably about 20 ns at a minimum. A slave device sensing the end of the packet and wishing to send a response must wait 20 ns minimum before enabling the driver and starting the transmission. Similarly, the host after receiving a packet from the slave device and wishing to send a packet to the device must wait 20 ns minimum from the end of the received packet.

Protocol Layer

The following now describes a bottom-up view of the ASP protocol starting with field and packet definitions. This is followed by a description of packet transaction formats for different transaction types. Link layer flow control and transaction level fault recovery are then described. Accordingly, bits are sent out LSbit first, followed by next LSbit, through to MSbit last. In the following Figures, packets are displayed such that both individual bits and fields are represented (in a left to right reading order) as they would move across the line.

All packets begin with a synchronization (SYNC) field, which is a coded sequence that is used to identify the byte boundaries of the characters. The SYNC byte is defined to be $10101100_{lsb}$ (ACh). A minimum of two and maximum of four SYNC characters must be sent to assure byte synchronization. It is used by the receive circuitry to align incoming data bytes and is defined to be eight bits in length. The first non SYNC character is the packet type PT that defines the start of the packet.

Field formats for the poll, data, and handshake packets are described in the following section. All packets begin with four SYNC characters and the end is determined by the receiver based on packet types which have fixed predetermined length or by the byte count field for data packets. The receiver identifies the end of the packet by counting the number of characters received after the first non-SYNC character and starts searching for another packet (defined by a SYNC character being received) at that time.

Figure 18:
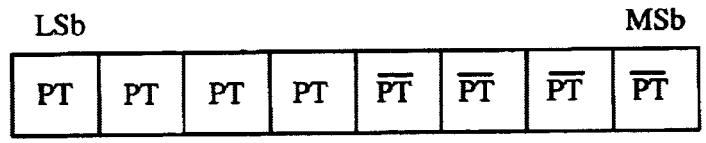
FIG. 18 shows a packet type (PT) which is configured to immediately follow the SYNC field of every ASP packet, and a PT consists of a four bit packet type field followed by a four-bit check field, in accordance with one embodiment of the present invention.

A packet type (PT) immediately follows the SYNC field of every ASP packet. A PT consists of a four bit packet type field followed by a four-bit check field as shown in FIG. 18. The PT indicates the type of packet and, by inference, the format of the packet and the type of error detection applied to the packet. The four-bit check field of the PT insures reliable decoding of the PT so that the remainder of the packet is interpreted correctly. The PT check field is generated by performing a ones complement of the packet type field.

The host and all devices must perform a complete decoding of all received PT fields. Any PT received with a failed check field or which decodes to a non-defined value is assumed to be corrupted and it, as well as the remainder of the packet, is ignored by the packet receiver. If a device receives an otherwise valid PT for a transaction type that it is not conditioned for, the device must not respond. PT types, coding, and descriptions are listed in Table 23.

TABLE 23

Packet Types (PT)

| PT [3:0] | Code | PT Name | Description |
|---|---|---|---|
| Transfer: | 0000 | INSTART | Poll device to send data. |
| Device to | 1000 | INSTOP | Poll device to stop sending data. |
| Host | 0100 | DATA0 | Device Data to Host (even). |
| | 1100 | DATA1 | Device Data to Host (odd). |
| Transfer: | 0110 | OUTDATA0 | Data packet PT even used on device to host data |
| Host to | 1110 | OUTDATA1 | Data packet PT odd used on device to host data |
| Device | 0010 | | RESERVED |
| | 1010 | | RESERVED |
| Handshake | 0011 | ACK | Receiver accepts error free data packet |
| | 1011 | NAK | Rx device can't accept data or Tx device can't send data |
| | 0111 | | RESERVED |
| | 1111 | ALERT | Device needs host intervention |
| Special | 1001 | HEARTBEAT | Host to device to inquire if device present. |
| | 1101 | RESET | Resets link or device to power up state. |
| | 0001 | | RESERVED |
| | 0101 | | RESERVED |

PT's are divided into four coding groups: Device to Host transfer, Host to Device transfer, handshake, or special, with the first two transmitted PT bits (P[1:0]) indicating which group. This accounts for the distribution of PT codes.

Since the addressing is done by physical positioning due to the STAR network there is no address field in the packet. A data type field is used to identify the type of data in the data field. Data type fields are only needed on some of the packets for which a data field exists. Data type fields like all other fields of the header are protected by sending the value and its complement. The data type field directs the current transfer to the different control and status registers of the device. Data type fields are used in the DATA0/1, INSTART, and RESET packets.

Data type fields identify either control or status for the link, control or status for the device function or data for the device. There can be up to 16 Data types. DataType's are shown in Table. Data type 0 will be dedicated to control and status of the link. This register set will be used to initialize the link and detect the capabilities of the device link, as well as to report statistics regarding errors on the link. The Link control and status register is shown in Table 24. Data type 1 will be used for control and status of the device, and Data type 2 will be used to transfer data to the device.

TABLE 24

Data Type Codes

| Data Type Name | Code | Used With |
| --- | --- | --- |
| Link Control | 0 | INSTART OUTDATA0/1 |
| Device Control | 1 | OUTDATA0/1 |
| Device Status | 1 | INSTART |
| Device Data | 2 | OUTDATA0/1 INSTART |

TABLE 25

Link Control Data Format

| Byte | Name | R/W | Meaning |
| --- | --- | --- | --- |
| Byte 0 | Bit 0 = 1: Link OK<br>Bit 0 = 0: Link Not OK | R only | Link Status is OK to the device interface<br>Link Status to the device is not OK<br>Set to one on reset, but not Reset Link |
| | Bit 1: Current Data SEQ Bit (RCV) | R/W = 0 | Last OUTDATA0/1 sequence bit received. See NOTE 1 below |
| | Bit 2: Current Data SEQ Bit (TRAN) | R/W = 0 | Last DATA0/1 sequence bit transmitted. See NOTE 1 below. |
| | Bit 3 = 0: Node not configured<br>Bit 3 = 1: Node Configured | R/W = 0 | Indicates whether node has been configured by the host. Once configured Bit 3 = 1. If node receives a Reset (but not Reset Link) PT, the node becomes NOT CONFIGURED. |
| | Bit 4: Device Fault | R Only | Device indicated some fault conditions exist. Cleared on read, set to zero on Reset. |
| | Bit 5: Header and CRC error counts supported | R Only | Indicates whether header error counts are supported. |
| | Bit 6: CRC Error Threshold | R/W = 0 | CRC Error overflow |
| | Bit 7: Header Error Threshold | R/W = 0 | Header Error overflow |
| Byte 1 | Packet Size/Link Speed Capability | R only | Read only register which indicates the maximum speed the link can operate at and the maximum packet size the link can operate at for this device |
| Byte 2 | Packet Size and Link Speed | R/W | Sets Packet Size and Link Speed of the device. Default Packet Size = 128 bytes Default Link Speed = 320 Mbps |
| Byte 3 | Link Retry Count & Repeat Count | R/W | Link Retry Count, Default = 3. Repeat Count. Default = 4. |
| Byte 4/5 | CRC Error Count (Mod 64K) | R/W = 0 | Accumulated CRC error count, sets error bit on overrun. |
| Byte 6/7 | Header Error Count (Mod 64K) | R/W = 0 | Accumulated header error count, sets error bit on overrun. |
| Byte 8–15 | Reserved | R/W = 0 | |

It should be noted that Current Data SEQ Bit (RCV) and Current Data SEQ Bit (TRAN) are set to zero if the link receives a RESET, RESET LINK. This is the only way the host can resync the bits if an out of order situation occurs. Being able to reset the sequence bits with the Reset Link command allows all link and device status to be maintained and recover from an out of order situation.

Figure 19:
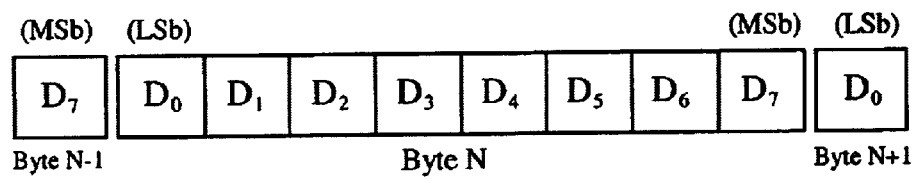
FIG. 19 shows the format of a data field for multiple bytes, in accordance with one embodiment of the present invention.

The data field may range from 0 to 2048 bytes and must be an integral number of bytes. FIG. 19 shows the format for multiple bytes. Data bits within each byte are shifted out LSB first.

Cyclic redundancy checks (CRC's) are used to protect the data field of all Data packets. CRC's are generated over the data field in the transmitter. Similarly, CRCs are decoded in the receiver. Data packet CRC's provide 100% coverage for all single and double bit errors. A failed CRC is considered to indicate that the data is corrupted and to ignore the packet. For CRC generation and checking, the shift registers in the generator and checker are seeded with an all ones pattern. For each data bit sent or received, the high order bit of the current remainder is XOR'ed with the data bit and then the remainder is shifted left one bit and the low order bit set to '0'. If the result of that XOR is '1', then the remainder is XOR'ed with the generator polynomial. When the last bit of the checked field is sent, the CRC in the generator is inverted and sent to the checker MSB first. When the last bit of the CRC is received by the checker and no errors have occurred, the remainder will be equal to the polynomial residual.

In one embodiment, the CRC field consists of a 4 byte field immediately following the data field on all packets that contain a data field. It is accumulated over only the data field of the packet. Packets that do not have a data field have no CRC field. The data CRC is a 32-bit polynomial applied over the data field of a data packet. The generating polynomial is:

$$G(X)=X^{32}+X^{26}+X^{23}+X^{22}+X^{16}+X^{12}+X^{111}+X^{10}+X^8+X^7+X^5+X^4+X^2+X+1$$

This section shows packet formats for poll, data, handshake and special packets. Fields within a packet are displayed in the order in which bits are shifted out onto the bus as shown in the figures.

Figure 20:
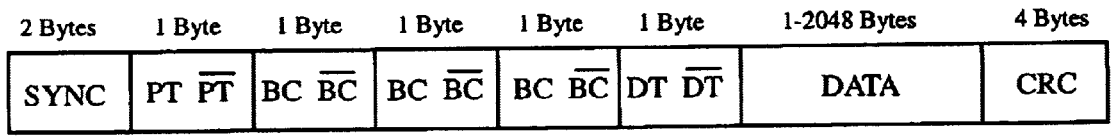
FIG. 20 shows the format of a packet including a sync field, a PT field, BC fields, DT fields, and data and CRC, where the PT, BC, DT fields are protected by sending the value and complement of the value and the data field is protected by the CRC, in accordance with one embodiment of the present invention.

To transfer data from the host to a device, two different packets are used. These are the OUTDATA0 and OUTDATA1. In the case of data sent from the host to a device, the host assumes the device can accept the data and there is no specific poll of the device, but the data packet is sent as the poll. If the device cannot receive the data at a particular time, it responds with a NAK indicating the host should try again later. The format for the OUTDATA0/1 command is shown in FIG. 20. The two different types are required to support data toggle synchronization.

The PT, BC, DT fields are protected by sending the value and complement of the value. The data field is protected by the CRC. If the receiver decodes a bad header field, the complete packet is ignored, and the receiver begins searching for a SYNC after the time-out period has expired. If the CRC is bad, the device again ignores the packet and begins searching for a SYNC immediately. The DT field tells the device whether the data is link control, device control or device data for the device. The host alternately sends OUTDATA0 and OUTDATA1, so the device can detect if there have been any lost or repeated packets.

Figure 21:
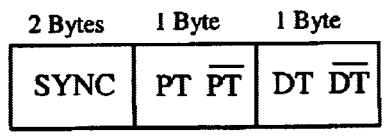
FIG. 21 illustrates INSTART which is sent by the host to request data from a device, in accordance with one embodiment of the present invention.
Figure 22:
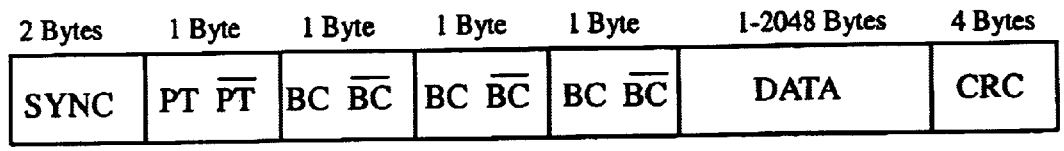
FIG. 22 illustrates the format of a DATA0 or DATA1 packet, in accordance with one embodiment of the present invention.

In the case of transferring data from a device to the host, an explicit poll of the slave device is required. Thus, to do transfers from the device to the host requires three types of packets (INSTART, INSTOP, DATA0/1). INSTART is sent by the host to request data from the device. The format is shown in FIG. 21. The DATATYPE field tells the device whether the host is requesting Link Status, Device Status, or Device data. The device responds with either a DATA0/1 packet containing the requested data or a NAK indicating that it cannot provide the data at this time and the host should try again later. If the device can provide the data, it responds with either a DATA0 or DATA1 packet which consists of the fields shown in FIG. 22.

The PT and BC fields are protected by sending the value and complement of the value. The data field is protected by the CRC. If the receiver decodes a bad header field, the complete packet is ignored, and the receiver begins searching for a SYNC after the time-out period has expired. If the CRC is bad, the host again ignores the packet and begins searching for a SYNC immediately.

Figure 23:
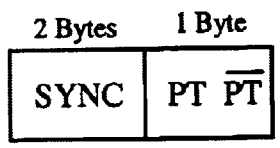
FIGS. 23–25 illustrate the format of INSTOP Packets, Handshake Packets, and Heartbeat Packets, in accordance with one embodiment of the present invention.

The device alternately sends DATA0 and DATA1, so the host can detect if there have been any lost or repeated packets. After each successful transfer of a data packet from the device to the host which is indicated by the receipt of an ACK, the device will send the next packet. When the device has no more data to send or wishes to end the transaction the device sends a NAK to the host. When the host wishes to end the transaction it sends the INSTOP packet which is an implied ACK and requests the device to stop sending data. The format of the INSTOP packet is shown in FIG. 23.

This packet consists of a single byte which is protected by sending the complement of the packet type. The device responds with an ACK which closes the transaction. The Data type field is not repeated.

Figure 24:
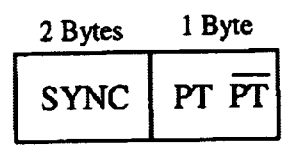

Handshake packets as shown in FIG. 24 consists only of a PT. Handshake packets are used to report the status of a data transaction and can return values indicating successful reception of data, flow control, and alert conditions. Only transaction types that support flow control can return handshakes. Handshakes are always returned in the handshake phase of a transaction and may be returned, instead of data, in the data phase.

There are three types of handshake packets:

ACK indicates that the data packet was received without CRC errors over the data field and that the data PT was received correctly and the host or device has accepted the data. An ACK handshake is applicable only in transactions which data has been transmitted or where a handshake is expected. ACK's are issued in response to the receiver correctly receiving a data packet with the correct sequence number. ACK's can be returned by the host for device to host transactions and by a device for host to device transactions. ACK's are also issued in response to a device receiving a Reset or Heartbeat packet indicating that the Reset or Heartbeat packet was successful.

NAK indicates that a device was unable to accept data from the host or that a device has no data to transmit to the host. NAK can only be returned by devices in the data phase of a device to host transactions or the poll phase of host to device transaction. Note that the host never issues a NAK since it is always assumed that the host can accept the data since it requested the data. Errors on data packets to the host are handled by time-outs. NAK is used for flow control purposes by a device to indicate that it is temporarily unable to transmit or receive data, but will eventually be able to do so without need of host intervention.

ALERT may be returned by a device in response to any type of packet sent by the host. ALERT indicates that a device is unable to transmit or receive data, or some type of status change has occurred at the device (such a media removal or insertion) and that the condition requires host intervention. Once a device sends an ALERT it must continue returning ALERT until the condition causing the alert has been, resolved through host intervention. Upon receiving an ALERT the host should try to determine the reason by access to the link control and device status and if that fails by a reset of the device. The host is not permitted to return an ALERT under any condition.

Figure 25:
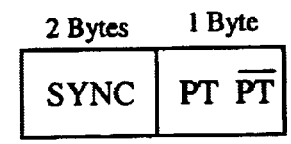

There are two types of special packets (RESET, and HEARTBEAT). The formats for the special packets are shown in FIG. 25. The Heartbeat packet is used to determine whether a port has had a device attached or removed. Under normal operation all ports are polled at low rate (about once per second) with a Heartbeat packet. If the device is attached and powered the device should return an ACK. If there is no device on the port the poll will time out indicating that there is no device on this port. Changes in status of whether there is a port attached or not is kept by the host controller and any change causes an interrupt to the host computer.

The HEARTBEAT packet can also be used to provide support for removable media devices. A device must respond to the HEARTBEAT packet with an ACK packet if the device is ready and there is no change in media status since the last status read. The device must respond with an ALERT packet to report that there has been a change in media status. When the host controller receives this ALERT packet, it must generate an AEN (Asynchronous Event Notification) interrupt to the host. The host software then sets up a data structure to request the status from the device. The host controller issues an INSTART packet with data type being status. The device returns the status in a DATA packet.

Figure 26:
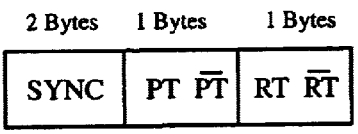
FIG. 26 illustrates the format of a reset device packet, in accordance with one embodiment of the present invention.

A Reset packet, as shown in FIG. 26, is sent by the host when it wants to reset the device to its power up state. The device upon receiving a valid Reset packet (PT and RT fields check) performs the appropriate type of reset as defined in the Reset Type field (defined below) and responds with an ACK. The Reset packet includes a Reset Type (RT) field to indicate what type of reset to perform. A Table 26 of Reset Type's is shown below.

TABLE 26

Reset Types

| Reset Type | Reset Function |
|---|---|
| 0 | Link |
| 1 | Sequence bit |
| 2 | Link and device hard reset |
| 3 | Link and device soft reset |
| 4–15 | Reserved |

For device hard and soft resets, the host software must set up a data structure in system memory to request device reset status, and the host controller chip must first generate a RESET packet to the specified device. Upon receipt of a RESET packet, the device must respond with an ACK packet. Then, the host controller polls for device reset status. The device may respond with NAK packets while it is still performing the reset operation.

Transmitting and receiving devices must return handshakes based upon an order of precedence detailed below. Not all handshakes are allowed, depending on the transaction type and whether the handshake is being issued by a device or the host.

Table 27 shows the possible responses a device may make in response to an INSTART packet transaction. If the device is unable to send data, due to a alert or a flow control condition, it issues an ALERT or NAK handshake, respectively. If the device is able to issue data, it does so. If the received packet is corrupted, the device returns no response.

TABLE 27

Device Responses to IN Transactions

| Packet Received Corrupted | Device Tx Fault Condition | Device Can Transmit Data | Action Taken |
|---|---|---|---|
| Yes | Don't care | Don't care | Return no response |
| No | Yes | Don't care | Issue ALERT handshake |
| No | No | No | Issue NAK handshake |
| No | No | Yes | Issue data packet |

Table 28 shows the host response to an DATA0/1 transaction. The host is able to return only one type of handshake, an ACK. If the host receives a corrupted data packet, it discards the data and issues no response. If the host cannot accept data from a device, (due to problems such as internal buffer overrun) this condition is considered to be an error and the host returns no response. If the host is able to accept data and the data packet is received error free, the host accepts the data and issues an ACK handshake.

TABLE 28

Host Responses to IN Transactions

| Data Packet Corrupted | Host Can Accept Data | Handshake Returned by Host |
|---|---|---|
| Yes | N/A | Discard data, return no response |
| No | No | Discard data, return no response |
| No | Yes | Accept data, issue ACK |

Handshake responses for an OUTDATA0/1 transaction are shown in Table 29. A device, upon receiving a data packet, may return any one of the three handshake types. If the data packet was corrupted, the device returns no handshake. If the data packet was received error free and the device has a problem, the device returns an ALERT handshake. If the transaction is maintaining sequence bit synchronization and a mismatch is detected, the device returns no response. If the device can accept the data and has received the data error free and with the correct sequence number, it returns an ACK handshake. If the device cannot accept the data packet due to flow control reasons, it returns a NAK.

TABLE 29

Device Responses to OUT Transactions in Order of Precedence

| Data Packet Corrupted | Receiver Fault | Sequence Bits Mismatch | Device Can Accept Data | Handshake Returned by Device |
|---|---|---|---|---|
| Yes | N/A | N/A | N/A | None |
| No | Yes | N/A | N/A | ALERT |
| No | No | Yes | N/A | None |
| No | No | No | Yes | ACK |
| No | No | No | No | NAK |

Tables 30–32 below summarize the device responses to special transactions. The only valid response to Special packets is either an ACK or nothing for all types of special packets. ACK in the case of Heartbeat indicates that the device is powered and able to receive link or device commands. In the case of Reset, ACK indicates that the device has performed the reset action (either reset the entire link and device or only the link or device as required).

TABLE 30

Device Responses to Reset Packet in Order of Precedence

| Packet Received Corrupted | Device Can Transmit Response | Action Taken |
|---|---|---|
| Yes | Don't care | Return no response |
| No | No | Return no response |
| No | Yes | Issue ACK packet |

TABLE 31

Device Responses to Reset Device Packet in Order of Precedence

| Packet Received Corrupted | Device Can Transmit Response | Action Taken |
|---|---|---|
| Yes | Don't care | Return no response |
| No | No | Return no response |
| No | Yes | Issue ACK packet |

TABLE 32

Device Responses to Heartbeat Packet in Order of Precedence

| Packet Received Corrupted | Device Can Transmit Response | Action Taken |
|---|---|---|
| Yes | Don't care | Return no response |
| No | No | Return no response |
| No | Yes | Issue ACK packet |

Packet transaction format varies depending on whether the host is sending data, or control to the device or the device is being requested to send status or data to the host.

Figure 27:
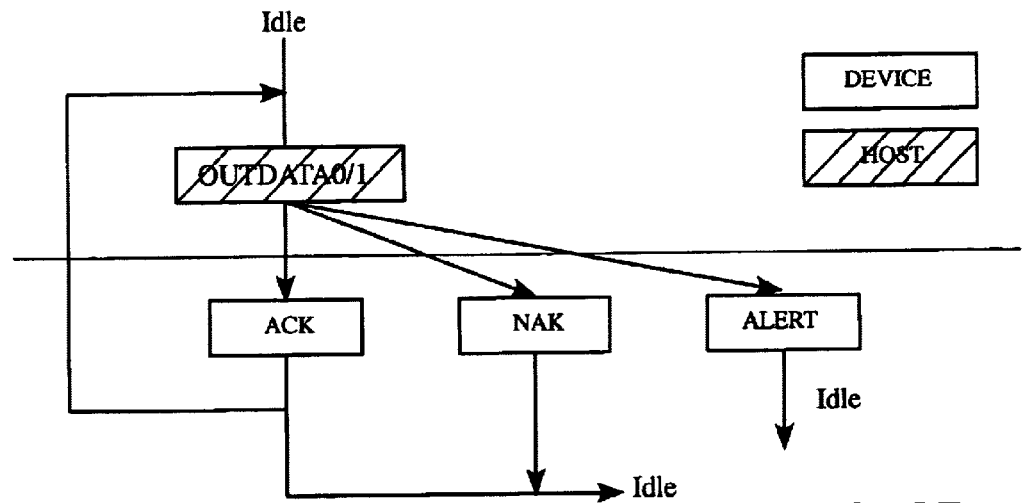
FIGS. 27 and 28 illustrate the movement of data or control from the host to the device, in accordance with one embodiment of the present invention.

Movement of data or control from the host to the device is done with the OUTDATA0/1 packet. When the host wishes to send something to the device it sends an OUTDATA0/1 packet with the proper data which the device then responds to. The device then returns one of three handshakes. ACK indicates that the data packet was received without errors and informs the host that it may send the next packet in the sequence. NAK indicates that the data was received without error but that the host should resend the data because the device was in a temporary condition preventing it from accepting the data at this time (e.g., buffer full). If the device has a fault, ALERT is returned to indicate that the host should not retry the transmission because there is an error condition on the device, but that the host should attempt some error recovery on the device. If the data packet was received with a CRC error, no handshake is returned. This type of transfer is a simple two phase transfer as shown in FIG. 27.

Figure 28:
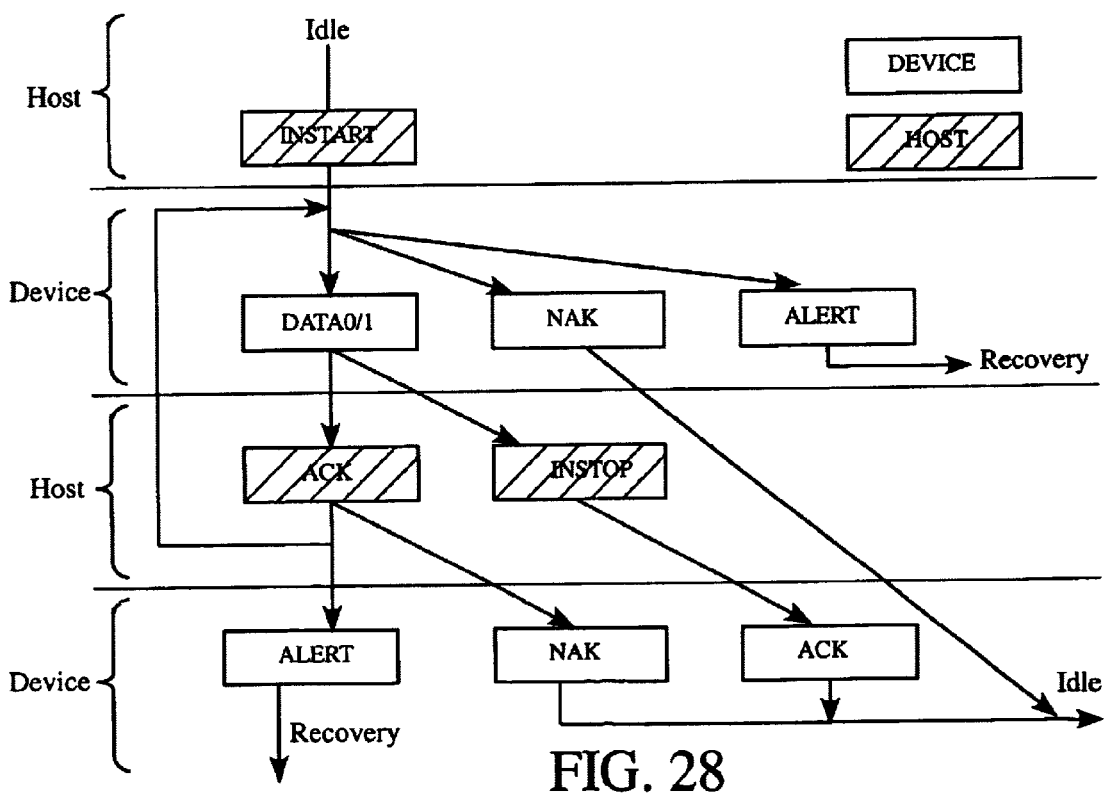

When the host wishes to obtain data or status from the device, it must issue a poll of the device using the INSTART packet as shown in FIG. 28. The device responds with the data or status and then repeats the cycle till it has no more data to send. The device responds by returning either a DATA packet or, should it be unable to return data, a NAK or ALERT handshake. A NAK indicates that the device is temporarily unable to return data, while an ALERT indicates that the device has a problem that requires host software intervention. If the host receives a valid data packet, it responds with an ACK handshake or an INSTOP to indicate the end of the sequence. If the host detects an error while receiving data (e.g. CRC error), it returns no handshake packet to the function. The sequence is shown below and requires 3 phases to complete.

In one embodiment, ASP provides a mechanism to guarantee data sequence synchronization between data transmitter and receiver across multiple transactions. This mechanism provides a way of guaranteeing that the handshake phase of a transaction was interpreted correctly by both the transmitter and receiver. Synchronization is achieved via use of the OUTDATA0 and OUTDATA1 (or DATA0 and DATA1 for device to host transfer) packets and separate data toggle sequence bits for the data transmitter and receiver. Receiver sequence bits toggle only when the receiver is able to accept data and receives an error free data packet of the proper sequence type. Transmitter sequence bits toggle only when the data transmitter receives a valid ACK handshake. The data transmitter and receiver sequence bits must be synchronized at the start of a transaction. Note that the host chip needs to maintain separate sequence bits for each port.

The data sequence bits are initialized on a power up reset, a Reset sent to the device or a Reset Link sent to the device. When any of these events occurs, the device sequence bits are set to zero (both Transmit and Receive). Once the host has synchronized the device sequence bits, the host can send link status request or link control data as well as device status data or command information.

Figure 29:
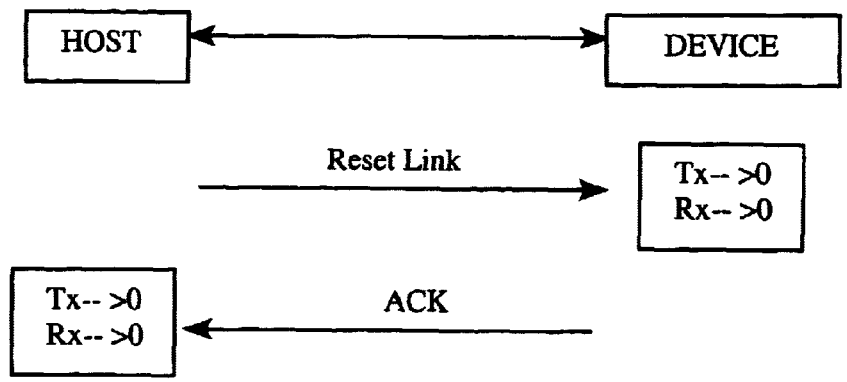
FIGS. 29–33 provide communication diagrams between the host and the device in accordance with the communication protocol of ASP, in accordance with one embodiment of the present invention.

FIG. 29 shows the host issuing an RESET LINK packet to a link. The numbers in the rectangles represent the transmitter and receiver sequence bits. The link must accept the new sequence values and ACK the transaction. When the link accepts the transaction, it must reset its sequence bit so that both the host's and device's sequence bits are equal to '0' at the end of the transaction.

Figure 30:
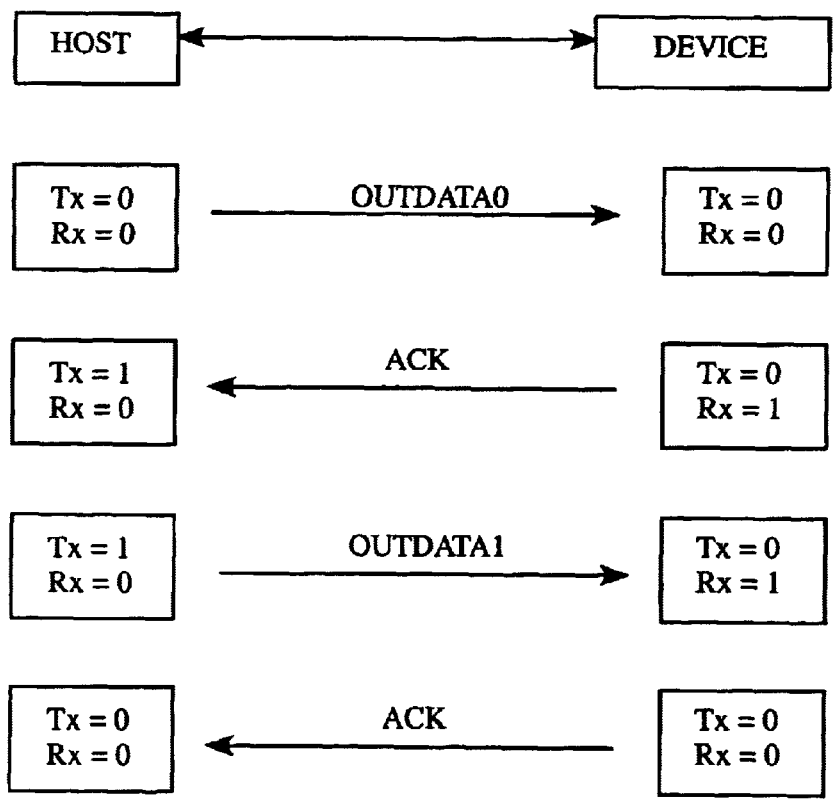

FIG. 30 shows the case where two successful transactions have occurred. For the data transmitter, this means that it toggles its sequence bit upon receipt of an ACK. The receiver toggles its sequence bit only if it receives a valid data packet and the packet's data PT matches the receiver's sequence bit. During each transaction, the receiver compares the transmitter sequence bit (encoded in the data PT) with its receiver sequence bit. If data cannot be accepted, then the receiver must issue a NAK. If data can be accepted and the receiver's sequence bit matches the PT sequence bit, then data is accepted. Sequence bits may only change if a data packet is transmitted.

Figure 31:
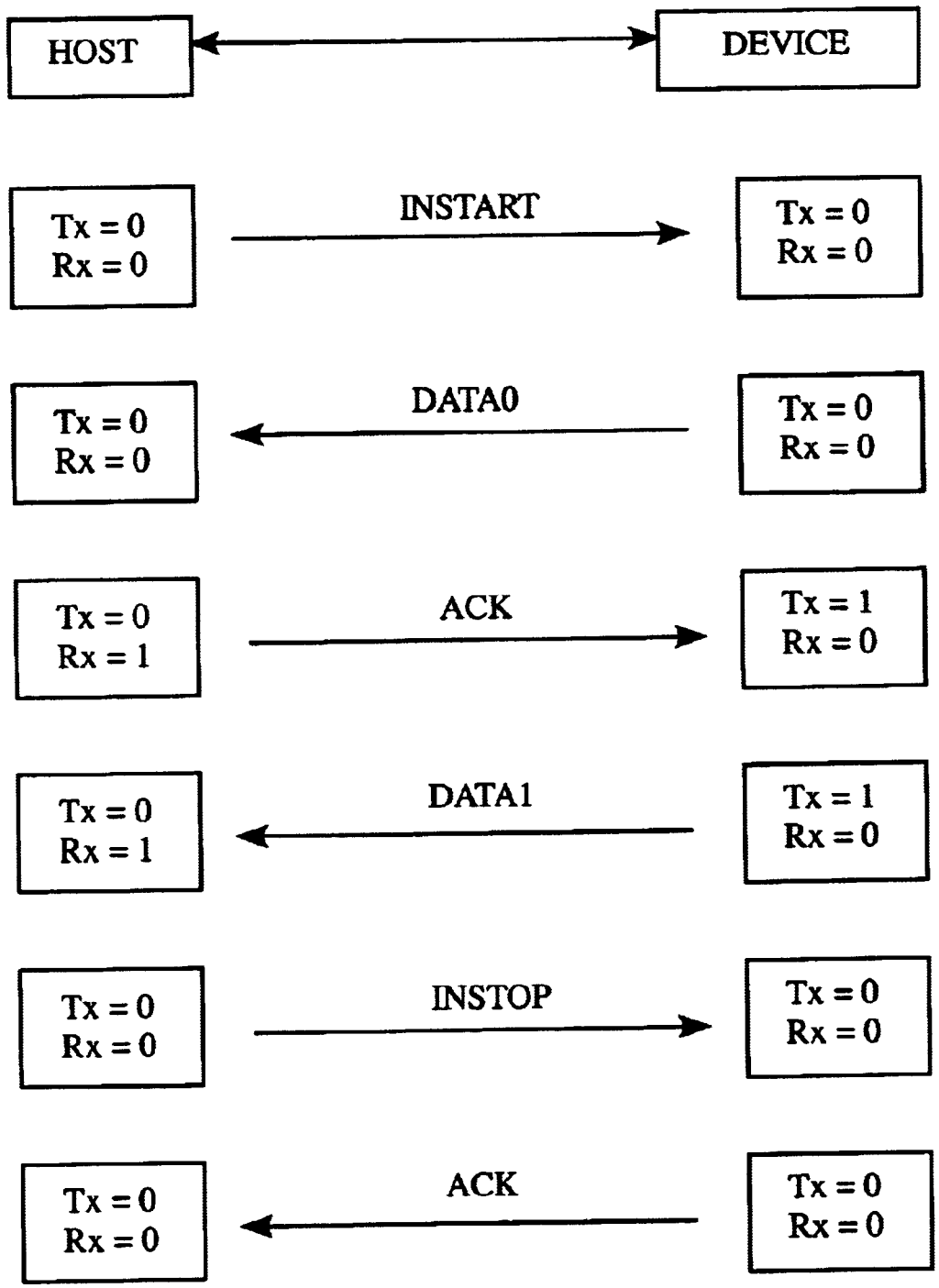

FIG. 31 shows a sequence from device to host. Note that the INSTART poll is not sequenced and device RCV count is not incremented on receipt of INSTART polls.

Figure 32:
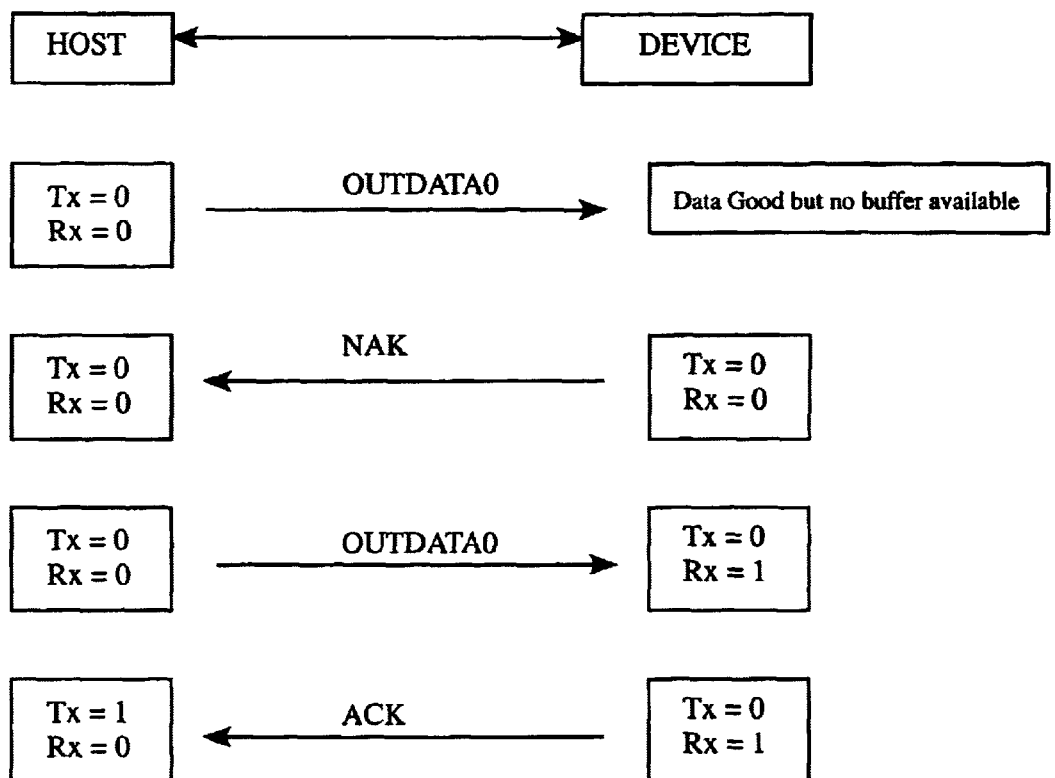

If data cannot be accepted or the received data packet is corrupted, the receiver will issue a NAK or ALERT handshake, or will time out, depending on the circumstances, and the receiver will not toggle its sequence bit. FIG. 32 shows the case where a transaction is NAK'ed and then retried. Any non-ACK handshake or time out will generate similar retry behavior. The transmitter, having not received an ACK handshake, will not toggle its sequence bit. As a result, a failed data packet transaction leaves the transmitter's and receiver's sequence bits synchronized. The transaction will then be retried and, if successful, will cause both transmitter and receiver sequence bits to toggle. A similar situation takes place during sequences from device to host.

Figure 33:
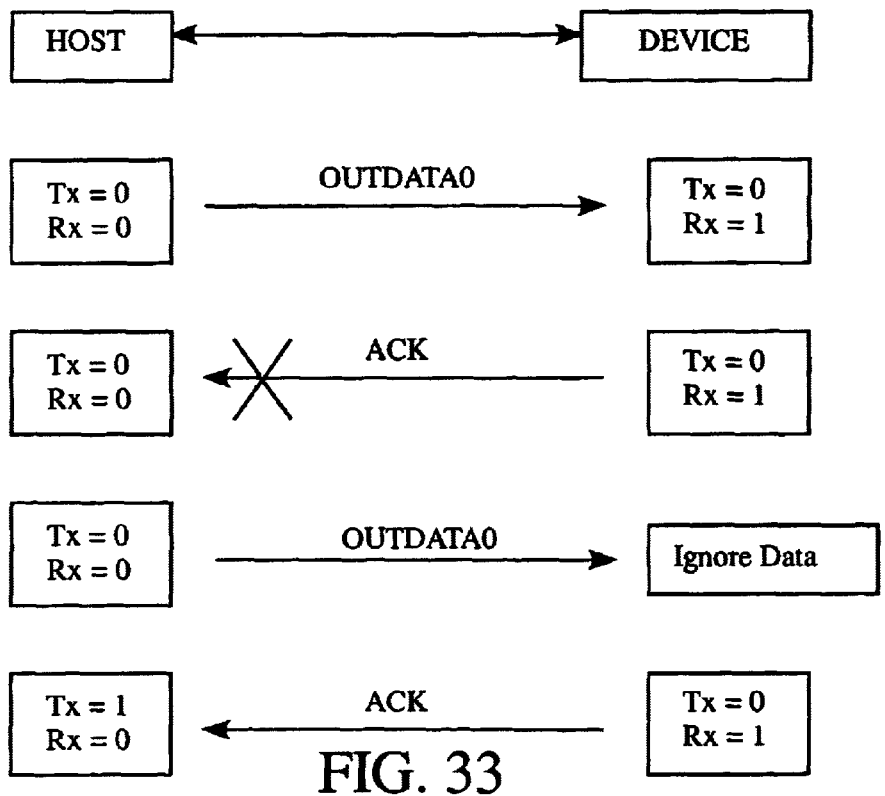

The transmitter is the last and only agent to know for sure whether a transaction has been successful, due to its receiving an ACK handshake. A lost or corrupted ACK handshake can lead to a temporary loss of synchronization between transmitter and receiver as shown in FIG. 33. Here the transmitter issues a valid data packet, which is successfully acquired by the receiver; however, the ACK handshake is corrupted.

At the end of the first transaction, there is a temporary loss of coherency between transmitter and receiver, as evidenced by the mismatch between their respective sequence bits. The receiver has received good data, but the transmitter does not know whether it has successfully sent data. On the next transaction, the transmitter will resend the previous data using the previous OUTDATA0 PT. The receiver's sequence bit and the data PT will not match, so the receiver knows that it has previously accepted this data. Consequently, it discards the incoming data packet and does not toggle its sequence bit. The receiver then issues an ACK, which causes the transmitter to regard the retried transaction as successful. Receipt of ACK causes the transmitter to toggle its sequence bit.

In one embodiment, the data transmitter must guarantee that any retried data packet be identical in length to that sent in the original transaction. If the data transmitter is unable, because of problems such as a buffer underrun condition, to transmit the identical amount of data as was in the original data packet, it must abort the transaction by sending a bad packet up to the retry limit of the link. This causes the link to report to the higher layer software of a failure of the transmission. The transmitter can force an error by not formatting the packet type field properly or by other known techniques.

ASP is designed to permit reliable end to end communication in the presence of errors on the physical signaling layer. This includes the ability to reliably detect the vast majority of possible errors and to have the link recover from many errors without resorting to higher level software.

ASP employs three error detection mechanisms. Header errors are detected since each header field (PT, DT, BC) have check bits associated with them. Errors in the data field are detected by the 32 bit CRC. Byte count violations (valid byte count field, but different number of bytes sent) will be detected by a bad CRC. A PT, DT or Byte Count error exists if the check bits are not complements of their respective bits. A CRC error exists if the computed checksum remainder at the end of a packet reception is not zero.

Table 33 lists error detection mechanisms, the types of packets to which they apply, and the appropriate packet receiver response.

TABLE 33

Packet Error Types

| Field | Error | Action |
| --- | --- | --- |
| Packet Type | Check Bits | Ignore packet |
| Data Type | Check Bits | Ignore packet |
| Byte Count | Check Bits | Ignore packet |
| Data | Data CRC | Discard data |

ASP packets lengths are fixed size depending on the type of PT except for the packets which contain data that have a byte count field to indicate the length. For non-data packets the receiver on seeing the packet type knows how many bytes will be sent and merely counts that number of bytes to know where the end of the packet is to occur. For example, if the PT indicates an INSTART packet, the length of the packet will be two bytes (PT and DT). After the receiver has verified a good INSTART packet, it can turn the line around and begin to send the response.

For PT's that are bad (header field does not check) the receiver times out with the maximum number of characters that could occur in any packet (e.g., a 128 or 2K byte data packet), and then starts the SYNC search, since the receiver never responds back when the header or CRC are bad. This applies both to the device and to the host when it has conditioned a device to send some data or status information. The transmitter waits one maximum packet time before resending the packet. Since the receiver is going to respond with some response, the transmitter of the packet turns its receiver on till the maximum time of one maximum length packet has expired. If no packet is received at this time, the transmitter enables its transmitter and resends the packet. It does this for a maximum of the Link Retry Value before aborting the transmission. In the case of a device, the device sets an error indication and waits to receive a packet from the host. In the case of the host, error conditions are set, and the host reports the error to an upper layer software level. The host can then continue to access other devices on other ports normally if the problem was only with this device or link.

ASP must be able to detect and recover from conditions which leave it waiting indefinitely for an end of packet or which leaves the bus in something other than the idle state at the end of a frame. There are two such fault conditions: loss of activity and babble. Loss of activity (LOA) could occur if packets are lost and the time-out period expires and the host does not initiate recovery. In ASP if a host to device packet is corrupted the device is required to time-out the maximum packet length and then enable the receivers and look for a sync character. In all cases the host will reissue the packet since it did not get a response. The host will resend the number of times indicated by the Link Retry Counter before aborting the transmission and reporting the error to the upper layer software. If a device to host packet is lost, the device times out one maximum packet time waiting for a response and then retransmits the packet again. It repeats this for the number of times indicated by the Link Retry Counter and then aborts the transfer by setting error bits in the link control data and enables its receiver to look for a packet from the host. The host having timed out for a time equal to the Link Retry Counter reports this condition to the upper software layer which will try to effect recovery of the link.

Babble is defined as a valid PT sent and the data continuing for longer than the maximum packet length or longer than the maximum packet length for this type of packet. In the case where the device continues to transmit beyond the time required for the packet sent, the host will attempt to send to the device, but this will fail due to the fact that the device is still sending. After repeated attempts by the host to send to the device the host will abort the transmission and report an error to upper layer software. Unless the device ends the transmission, communication with that device will not be possible. The host will try to reset the device with a RESET packet, but this may fail if the device never stops transmitting. In this case an error will be flagged to the user. But, due to the star configuration of ASP, communication with all other devices will not be effected.

ASP Device Framework

An ASP device may be divided into two layers. The bottom layer is a bus interface that transmits and receives packets. The upper layer is the ultimate consumer or provider of data. It may be thought of as a source or sink for data. The upper layer is the functionality provided by the serial bus device.

Figure 34:
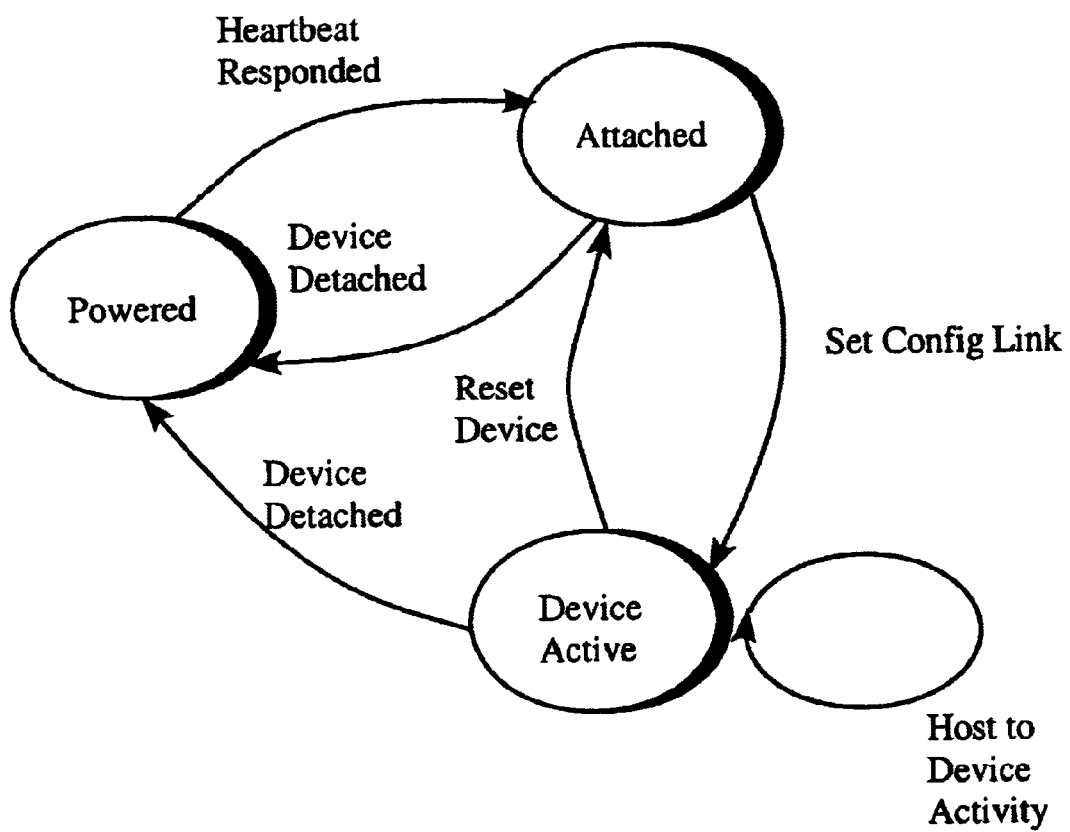
FIG. 34 is a state machine that illustrates ASP device states that are externally visible to the host, in accordance with one embodiment of the present invention.

An ASP device has several possible states. Some of these states are visible to the ASP and the host and others are internal to the ASP device. This section describes ASP device states that are externally visible to the host as shown in FIG. 34. Note: ASP devices perform a reset operation in response to a Reset request from the host. When reset signaling has completed, the ASP device is reset.

TABLE 34

Visible Device States

| Powered | Attached | Active | State |
| --- | --- | --- | --- |
| No | — | — | Device is not powered. Other attributes are not significant. |
| Yes | No | — | Device is not attached to ASP, but is powered. Other attributes are not significant. |
| Yes | Yes | No | Device is attached to ASP and powered, but has not been configured. |

TABLE 34-continued

Visible Device States

| Powered | Attached | Active | State |
|---|---|---|---|
| Yes | Yes | Yes | Device is attached to ASP and powered and has been reset, and configured. Device is now available and can be used by the host. |

An ASP device may be attached or detached from the ASP. ASP devices are, in one embodiment, internal devices and as such are powered by the internal power supply of the enclosure. Like normal IDE devices, ASP devices use the current 4 pin Molex power connector. ASP devices become powered when the enclosure is powered. In another embodiment, the ASP devices can be external and are powered by regular power cables.

Before the ASP device's function may be used, the device must be initialized. From the device's perspective, initialization involves the host sending a reset command and then requesting status from the device and writing control information into the device. Once the host has done this the device is active and can receive and execute commands.

ASP devices may be attached and removed at any time. With the host operational, Heartbeat packets are issued to all ports on a low frequency basis. All active devices respond to this poll with an ACK packet. If no device is connected to the port no response is received by the host indicating no device is attached or an attached device is not powered. Status bits in the host keep track of which port has a device attached or not. Any change of status is reported to the host. When a port, that had no device attached, responds to a heartbeat poll with an ACK this indicates that a device is now attached to this port and powered. The host should attempt to configure this device as described below. When a device is removed from a host port, which is indicated by no response to normal polls and no response to a Heartbeat polls, the host is notified of the removal. The host responds by declaring that port as having no device attached. The host then polls that port with a Heartbeat packet at a low frequency rate.

Once the host has determined that a device is attached, the host needs to set up the link to the device. It does this with a combination of reads and writes to the Link Control Register. Setting the link control registers establishes such things as retry counts, speed of the link to this device and packet size. A complete listing of the items that can be set is shown in the detail of the link control register that is described below. The host then does inquires using ATA commands to determine the type and characteristics of the device attached. The host typically requests configuration information from the ASP device to determine the device's capabilities.

Command and Data transfer can occur after the device has been set up and configured. Commands and data are transferred between the host and the device using OUTDATA0/1 and INSTART packets to the appropriate device registers.

ASP Device Link Status and Control Register

In preferred embodiments, all ASP devices contain a Link Control and Status register which set the link parameters. Detailed below in Table 35 are the Link Control and Status Registers bits and their function. Reading and writing of this register set is always done with a packet of 16 bytes using OUTDATA for control and INSTART for Status.

TABLE 35

Link Control Data Format

| Byte | Name | R/W | Meaning |
|---|---|---|---|
| Byte 0 | Bit 0 = 1: Link OK<br>Bit 0 = 0: Link Not OK | R only | Link Status is OK to the device interface<br>Link Status to the device is not OK<br>Set to one on reset, but not Reset Link |
|  | Bit 1: Current Data SEQ Bit (RCV) | R/W = 0 | Last OUTDATA0/1 sequence bit received. See NOTE 1 below |
|  | Bit 2: Current Date SEQ Bit (TRAN) | R/W = 0 | Last DATA0/1 sequence bit transmitted. See NOTE 1 below. |
|  | Bit 3 = 0: Node not configured<br>Bit 3 = 1: Node Configured | R/W = 0 | Indicates whether node has been configured by the host. Once configured Bit 3 = 1. If node receives a Reset (but not Reset Link) PT, the node becomes NOT CONFIGURED. |
|  | Bit 4: Device Fault | R Only | Device indicated some fault conditions exist. Cleared on read, set to zero on Reset. |
|  | Bit 5: Header and CRC error counts supported | R Only | Indicates whether header error counts are supported. |
|  | Bit 6: CRC Error Threshold | R/W = 0 | CRC Error overflow |
|  | Bit 7: Header Error Threshold | R/W = 0 | Header Error overflow |
| Byte 1 | Packet Size/Link Speed Capability | R only | Read only register which indicates the maximum speed the link can operate at and the maximum packet size the link can operate at for this device |
| Byte 2 | Packet Size and Link Speed | R/W | Sets Packet Size and Link Speed of the device. Default Packet Size = 128 bytes Default Link Speed = 320 Mbps |
| Byte 3 | Link Retry Count & Repeat Count | R/W | Link Retry Count, Default = 3. Repeat Count. Default = 4. |
| Byte 4/5 | CRC Error Count (Mod 64K) | R/W = 0 | Accumulated CRC error count, sets error bit on overrun. |

TABLE 35-continued

Link Control Data Format

| Byte | Name | R/W | Meaning |
|---|---|---|---|
| Byte 6/7 | Header Error Count (Mod 64K) | R/W = 0 | Accumulated header error count, sets error bit on overrun |
| Byte 8–15 | Reserved | R/W = 0 | |

Byte 0 contains a number of error and control bits as detailed below.

Bit 0—Link Status

If the link status bit is 1 the link status is OK. If the link status is zero there is some problem with the link. This bit is read only and is set to one on power up if the device diagnostic passes. This bit is set to one on a link reset or total reset if the device diagnostic passes.

Bit 1—Current Data SEO bit (RCV)

This bit represents the last current OUTDATA0/1 sequence bit accepted. Current Data SEQ bit (RCV) and current Data SEQ bit (TRAN) are set to zero if the link receives a RESET or RESET LINK packet. This bit being writable allows the host to resync the link without sending a reset. This allows all link and device status to be maintained and recover from out of order situations.

Bit 2—Current Data SEQ bit (TRAN)

This bit represents the last DATA0/1 sequence bit transmitted. Current Data SEQ bit (RCV) and current Data SEQ bit (TRAN) are set to zero if the link receives a RESET or RESET LINK packet. This bit being writable allows the host to resync the link without sending a reset. This allows all link and device status to be maintained and recover from out of order situations.

Bit 3—Node Configured

Indicates whether the node has been configured by the host. Once configured Bit 3=1. Configuration occurs when the host reads the link status and writes the control status. If the node receives a Reset Device or Reset Device and Link (but not Reset Device) packet type, the node becomes not configured i.e. Bit 3=0. On power up the bit is set to zero.

Bit 4—Device Fault

This bit indicates some fault condition exist on the device. It is up to the vendor to decide what constitutes a device fault. The bit is cleared on a reset and also cleared on a read of this register.

Bit 5—Header and CRC Header and Error Counts Supported

Indicates whether header error counts and CRC error counting is supported by the device. Bit is read only and Bit=1 indicates that the error counts are supported.

Bit 6—CRC Error Threshold

Indicates that the CRC error threshold has been exceeded. This bit is set by the hardware when the CRC error count exceeds the threshold and can only be written to a zero by the host. The bit is cleared on reset link, and reset device and link, but not reset device.

Bit 7—Header Error Threshold

Indicates that the Header error threshold has been exceeded. Header errors occur anytime one of the header fields contains an error which is indicated by the packet type complement four bits not being correct. This bit is set by the hardware when the Header error count exceeds the threshold and can only be written to a zero by the host. The bit is cleared on reset link, and reset device and link, but not reset device.

Byte 1 is a read only byte which indicates the maximum packet size and maximum link speed of this device. Bits 0:3 specify the maximum link speed that this device can operate at. Bits 4:7 specify the maximum packet size supported by this device. All bits are read only and fixed. The tables 36–37 below gives the speed and packet size values.

TABLE 36

Link Speeds

| Bits 0:3 | Link Speed |
|---|---|
| 0 | 320 Mbps |
| 1 | 640 Mbps |
| 2 | 960 Mbps |
| 3–15 | Reserved |

TABLE 37

Packet Sizes

| Bits 4:7 | Packet Size |
|---|---|
| 0 | 64 Bytes |
| 1 | 128 Bytes |
| 2 | 264 Bytes |
| 3 | 512 Bytes |
| 4 | 1024 Bytes |
| 5 | 2048 Bytes |
| 6–15 | Reserved |

Byte 2 is a read/write register that is used by the host to set the link speed and packet size for this device. The host would set the speed and packet size for optimum operation of the device and system after first reading byte 1 to find out what packet size and speed the device supports. On power up or link reset the speed and packet size are set to the lowest values (64 byte packets and about 320 Mbps). The values are identical to the Byte 1 register values and the tables are repeated below.

Byte 3 is a read/write register that is used by the host to set the Link Retry Counter and the Repeat Counter for this device. The Link Retry Counter byte is used to set the number of times the device will retry a data transmission on a device to host transaction. Bits 0:3 indicate the number of times to a maximum value of 15. On reset the default value is set to 3. The register is Read/Write and is set to a value of 3 on a link or total reset (but not a device reset).

Bits 4:7 of this register set the Repeat Counter. This is the number of times the host will request successive data packets after an INSTART is sent to the device. The register is Read/Write and is set to a value of 4 on a link or total reset (but not a device reset). This is shown in Table 38.

TABLE 38

Retry Value and Repeat Count

| Bits | Meaning |
| --- | --- |
| 0:3 | Retry Value (Default = 3) |
| 4:7 | Repeat Count (Default = 4) |

The CRC Error count, as shown in Table 39, is a two byte field (modulo 64) which accumulates the number of times the link receives a packet with a CRC error (data packets only). Overflow of this register sets the CRC error bit (Bit 6 of Byte 0). This register is read only and a write to this register will reset the register to zero. The register is reset to zero on a link reset or total reset (but not a device reset).

TABLE 39

CRC Error Count

| Byte | Meaning |
| --- | --- |
| Byte 4 | Least Significant Byte |
| Byte 5 | Most Significant Byte |

The Header Error count, as shown in Table 40, is a two byte field (modulo 64) which accumulates the number of times the link receives a packet with a Header field error (Packet type, Data Type or Byte Count). Overflow of this register sets the Header error bit (Bit 7 of Byte 0). This register is read only and a write to this register will reset the register to zero. The register is reset to zero on a link reset or total reset (but not a device reset).

TABLE 40

Header Error Count

| Byte | Meaning |
| --- | --- |
| Byte 6 | Least Significant Byte |
| Byte 7 | Most Significant Byte |

Bytes 8 through 16 are reserved for future expansion. These bits will read as zero when the link status is returned to the host and are not writable.

Data to and from the device is of 3 different types. There is Link Control and Status, as described above, which is accessed by the host using DataType 0. All devices must have a Link Control and Status register as defined above, and these are the bytes written or read when access to the device is done with DataType field equal to zero. Bits in this register control the operation of the link itself but not the device parameters and thus all ASP devices have an identical Link Control and Status Register.

Access to the device is done with read and write requests from the host with DataType 1. When the device receives a request for data with DataType=1, the host is requesting status information from the host. When the device receives data from the host with DataType=1 the host is sending device command information to the device. The format of the device command and status information is dependent on the device itself and the command and status information is identical to what would be requested or sent of a current ATA/ATAPI device.

Access to the device data is done with read and writes requests from the host with DataType=2. The device receiving a read request with DataType=2 is being asked to send data requested from a previous command. The device receiving data packets from the host with DataType=2 is being requested to write data to the media based on a previous command. The data being sent or received in each case has been preconditioned by the prior receipt of a command phase.

Figure 35:
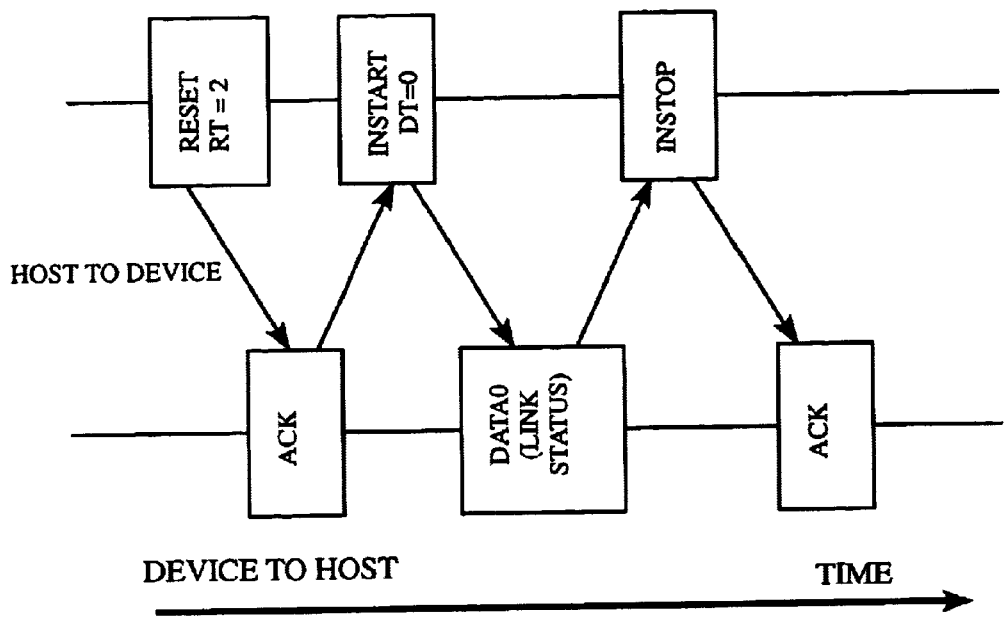
FIG. 35 illustrates Link Control Status Access, in accordance with one embodiment of the present invention.

Link control and status access is now discussed with reference to FIG. 35. After a total reset or power up the device would normally be requested to provide link status information to the host. The host would send an INSTART packet requesting data type zero and the device would respond with the contents of the Link Status Register as defined above. The host would then decide what speed and packet size to utilize with this device and send back control information to the link with the parameters the host has decided to use for this device. This is done with an OUTDATA0/1 poll and the device would write the contents into its Link Control Register.

Figure 36:
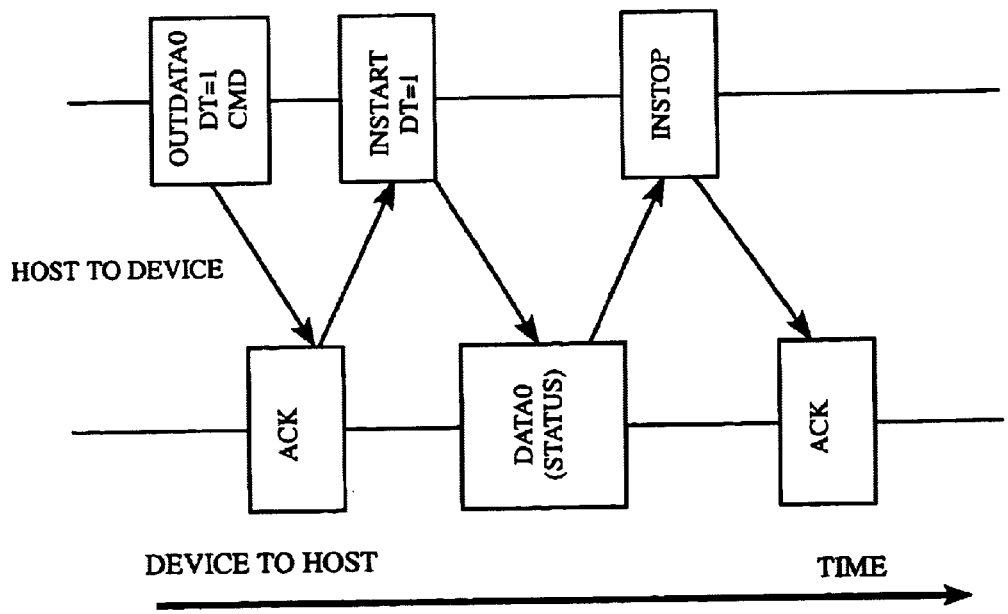
FIG. 36 illustrates Device Command and Status Access, in accordance with one embodiment of the present invention.

FIG. 36 should be referenced in regard to device command and status access. Thus, once the link has been set up device commands and status information may be exchanged between the device and the host. The host issues, in one embodiment, commands identical to ATA or ATAPI commands which are encapsulated into a packet and transferred to the device as an OUTDATA0/1 packet with the DataType field set equal to 1. Device status is returned from the device by the host end polling with an INSTART poll with DataType set equal to 1. The device returns status based on the command it was previously asked to execute using DATA0/1 packets.

ATA/ATAPI commands that require a data transfer phase are done using OUTDATA0/1 and DATA0/1 packets from the host and device respectively. If a read data command has been sent to the device by the host (using an OUTDATA0/1 packet with DT=1), the host interface would then poll the device with INSTART polls with DataType=2, requesting the data from the command. Once the device was able to supply the data it would respond with DATA0/1 packets containing the data. The host interface knows the amount of data expected and when the byte count for the command is complete (not the packet byte count) request the status information from the device. A complete sequence of command, data, status is shown FIGS. 37 and 38 below and compared with the current IDE flow.

Figure 37:
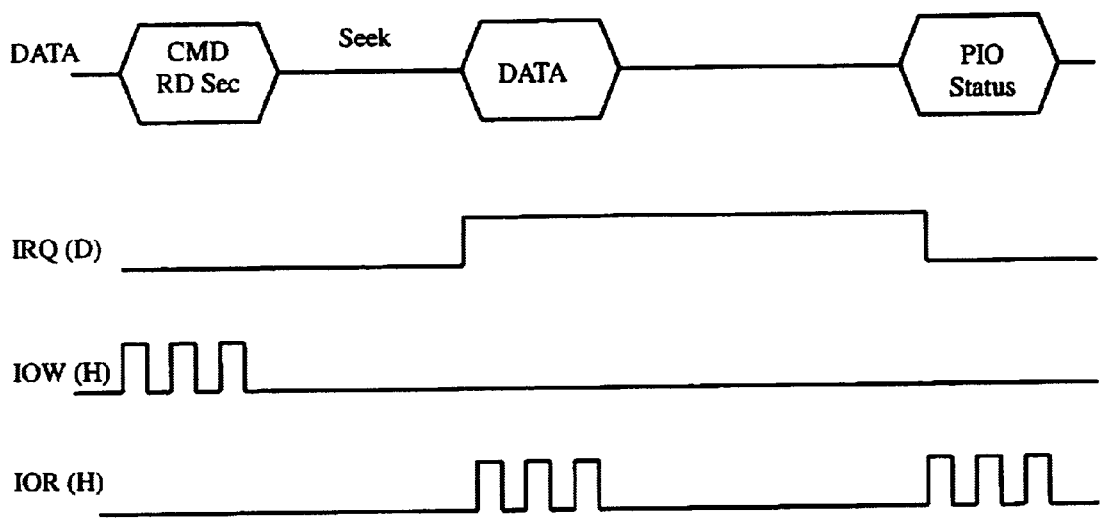
FIGS. 37 and 38 illustrate IDE Command And Data Sequence (PIO) and IDE Command And Data Sequence (DMA), respectively, in accordance with one embodiment of the present invention.
Figure 38:
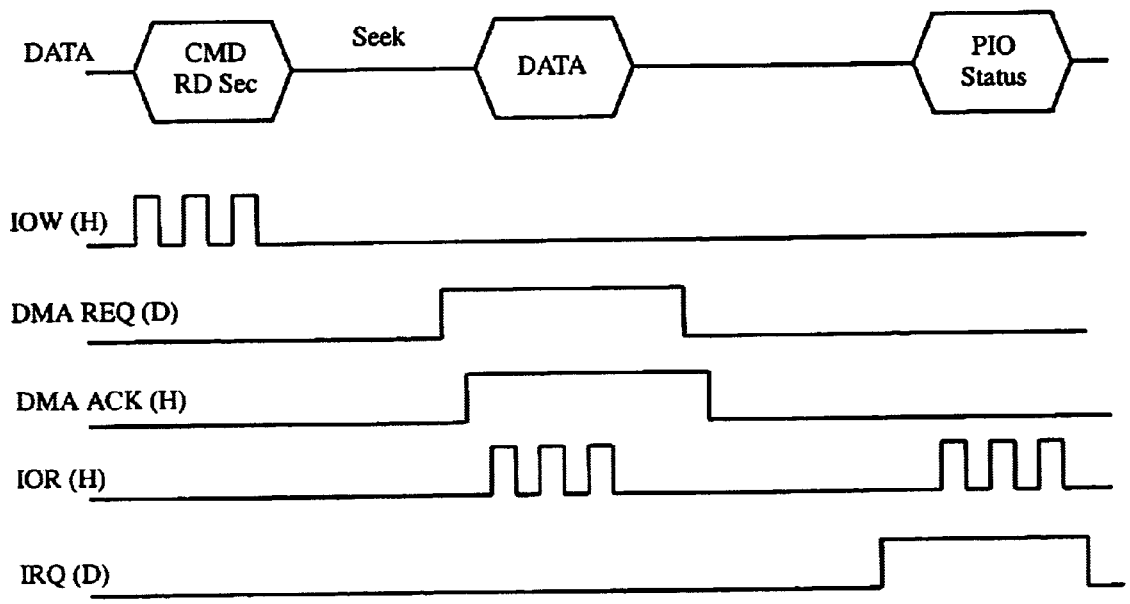

As shown in FIG. 37, IDE interface signals are used in a PIO read command. The host clocks the command information to the device using the IOW signal with the command information on the data bus. Once the device has found the data it asserts IRQ and the host then reads the data from the device data register by clocking the IOR signal. The host reads the status information by clocking IOR again. The timing diagram of FIG. 38 shows the same sequence assuming the interface uses DMA for the data transfer. Note that ASP is a DMA interface for both the command and data phases of a sequence.

Figure 39:
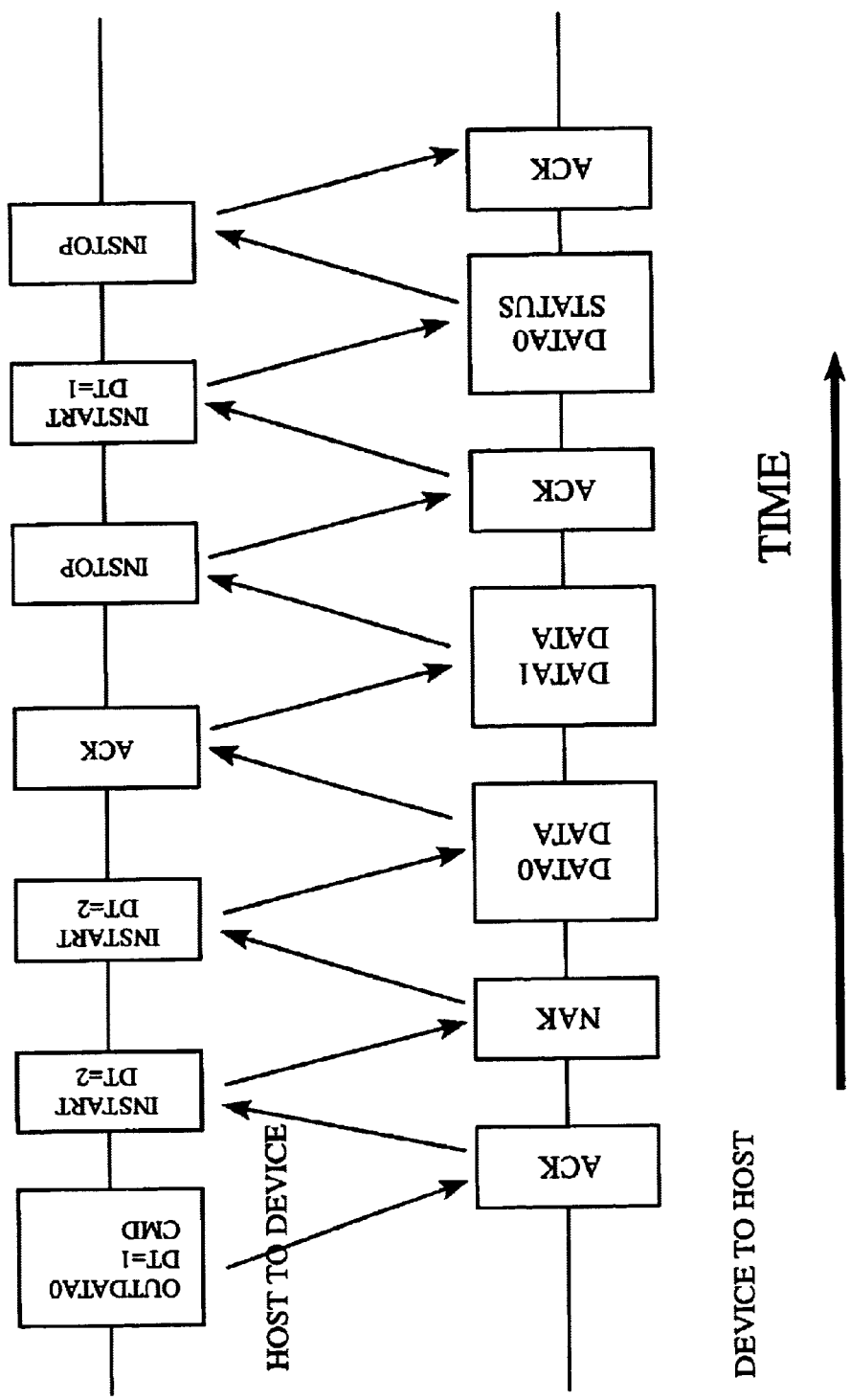
FIG. 39 illustrates an exemplary ASP Command And Data Sequence, in accordance with one embodiment of the present invention.

In the ASP case, as shown in FIG. 39, the host controller issues an OUTDATA with the command information which is indicated by the use of datatype 1. The device then seeks for the data. The host controller polls for the data using INSTART polls with data type 2. If the device does not have the data (it is still seeking) it returns NAK's to these polls. Once the data is found the device returns data in packets of the agreed size using DATA packet types. The host ends the exchange with an INSTOP packet which is an implied ACK and tells the device not to return any more data on this exchange. The host then polls for the status information on this command with an INSTART packet with datatype 1.

The device then returns the status with a DATA packet. This host ends the exchange with an INSTOP which is acknowledgment of the DATA packet and tells the device that no more data is to be sent on this poll.

The ASP protocol implements a serial transport mechanism and the commands and status that are passed are the normal ATA/ATAPI commands that are currently used with the parallel version of ATA/ATAPI. ATA/ATAPI commands are sent across the ASP bus by the transport mechanism and it is up to the device to execute these commands in a similar manner to what is done today. The code used to execute these commands should remain identical for all devices. The user should consult the current version of the X3T10 document on AT Attachement-3 Interface for a complete listing of the commands and responses that the device uses.

Detailed in this section are all the possible responses by the device to packets received from the host. The ASP bus uses a master slave relationship between the host and the device. In one embodiment, the device only responds when it receives a packet from the host. Thus, there are no unsolicited responses from the device. The ASP protocol is very compact and the device can only receive 6 different packet types from the host. Each of these has a very well defined response which requires very little state information to be kept. The six different packet types are RESET, HEARTBEAT, INSTART, INSTOP, OUTDATA0/1 and ACK. The host never sends either ALERT or NAK to the device, and the DATA0/1 packet is only sent by the device to the host.

All packets are preceded by one or more SYNC characters to allow the device receiver to byte align the incoming packet. The normal idle condition for the device receiver is looking for a packet from the host. The device receiver does this by looking for a SYNC character. The first non-SYNC character after a SYNC is detected is the start of the packet and is the packet type. When a response is required from the device the line is turned around to the host and the transmission initiated. The turnaround time is 2 byte times to allow the line to settle and to allow the host to enable its receiver. Detailed below are the responses to each of these 6 different packet types. FIGS. 44A through 44H show the flow diagrams for a complete device implementation showing the responses to these 6 different packet types.

If the device receives a valid reset packet (packet type field and reset type field check are good) the device responds with an ACK and then initiates the reset action required. The reason to respond with the ACK before completing the reset action is that for device resets the time required may exceed the time allowed to respond to the packet. The host can check the status of the device by reading the link status or device status to assure that the reset has been done successfully. If either the reset packet or reset type are not valid, the device ignores the packet, times out the maximum length packet and starts looking for a SYNC character again.

In one embodiment, the following reset types shown in Table 41 are used.

TABLE 41

| Reset Type | Reset Function |
|---|---|
| Reset Types | |
| 0 | Link |
| 1 | Sequence bit |
| 2 | Link and device hard reset |

TABLE 41-continued

| Reset Type | Reset Function |
|---|---|
| Reset Types | |
| 3 | Link and device soft reset |
| 4–15 | Reserved |

For device hard and soft resets, the host software must set up a data structure in system memory to request device reset status, and the host controller chip must first generate a RESET packet to the specified device. Upon receipt of a RESET packet, the device must respond with an ACK packet. Then, the host controller polls for device reset status. The device may respond with NAK packets while it is still performing the reset operation.

The HEARTBEAT packet is sent by the host at a very low frequency rate to determine if a device has detached from a port or if a port which previously had no device attached, now has a device attached. The normal response to a HEARTBEAT poll will be an ACK, indicating that the device is attached and powered. The HEARTBEAT packet will normally be sent by the host at a frequency of about 0.5 to 1.0 seconds. This will be sufficient to detect devices being attached or disconnected, or other changes that might occur. If there is no device on the port no response is sent and the host interrupts this non-response as the port having no device present or the device is inoperative or not powered.

The HEARTBEAT packet can also be used to provide support for removable media devices. A device must respond to the HEARTBEAT packet with an ACK packet if the device is ready and there is no change in media status since the last status read. The device must respond with an ALERT packet to report that there has been a change in media status. When the host controller receives this ALERT packet, it must generate an AEN (Asynchronous Event Notification) interrupt to the host. The host software then sets up a data structure to request the status from the device. The host controller issues an INSTART packet with data type being status. The device returns the status in a DATA packet.

OUTDATA0/1 packets are used by the host to transfer data to the device. The data could be Link Control, Device Command or Control, or device data as indicated by the DataType field in the packet. The device decodes all header fields for correctness and if any of the header fields (Packet type, DataType, Byte Count) are not correct the device ignores the packet. The device will time out the maximum length packet and start looking for a SYNC character again.

If all the header fields check the device will receive the number of characters indicated by the byte count field and check the CRC. The device determines the end of packet by the byte count. If the CRC does not check the device ignores the packet, times out the maximum length packet and starts looking for a SYNC character again.

If the CRC does check, the device verifies the sequence count to determine if correct. If correct, the device accepts the data, updates its receive sequence count and enables its transmitter and sends an ACK. If the sequence count is not correct the device still enables its transmitter and sends an ACK, but does not update its received sequence count and ignores the data since this data has already been received. If the CRC is correct and the device cannot accept the data (perhaps due to buffer not being available), the device enables the transmitter and sends a NAK. This tells the host to try again later.

If the CRC is correct and there is some device problem that requires host intervention the device enables its transmitter and sends an ALERT. This tells the host to do an inquiry of the device or link status to determine what problem or change has occurred.

INSTART packets are used by the host to request data or status from the device. The data could be Link Status, Device Status, or device data as indicated by the DataType field in the packet. The device decodes all header fields for correctness and if any of the header fields (Packet type, DataType) are not correct the device ignores the packet. The device will time out the maximum length packet and start looking for a SYNC character again. If all header fields are correct and the device has data ready to send, the device will enable its transmitter and send a DATA0/1 packet with the requested data. Once the data is sent the device will enable its receiver and start looking for a SYNC character.

If all header fields are correct but the device does not have the data to send, the device will enable its transmitter and send a NAK. This tells the host to try the request again at a latter time. Once the packet is sent the device will enable its receiver and start looking for a SYNC character. If all header fields are correct but a device problem exist the device will enable its transmitter and send an ALERT. This tells the host that some problem exist with the device or some asynchronous event has occurred and the host should inquire by examining the device and link status registers. Once the packet is sent the device will enable its receiver and start looking for a SYNC character.

INSTOP packets are sent by the host to stop the flow of data from the device. After an INSTART packet the device continues to send DATA0/1 packets as long as the host continues to acknowledge the packets with ACK'S. When the host wishes to stop the device from sending data the host issues an INSTOP packet which is an implied ACK to the previous DATA0/1 packet sent by the device and a request that it send no more packets.

After the device has sent a DATA0/1 packet it expects either an ACK or INSTOP command. The device decodes the header field for correctness and if not correct the device ignores the packet. The device had previously started a transmit timer equal to one packet time and expects to receive either the INSTOP or ACK to its previous data. If the packet is not correctly received and the timer expires the device enables its transmitter and re-sends the previous data, then enables its receiver and start looking for SYNC. This action is repeated the number of times indicated in the RETRY COUNT of the LINK STATUS register. If the number of retries is exceeded the device sets the error flags and enables its receiver and starts looking for SYNC again.

If the header field is correct it enables its transmitter and sends and ACK packet to the host. This acknowledges to the host that the device understands that no more data will be sent. Once the ACK packet is sent the device will enable its receiver and start looking for a SYNC character waiting for the next poll.

ACK packets are sent by the host only in response to the host successfully receiving a DATA0/1 packet from the device. When the device receives an ACK packet, the host is indicating the previous DATA0/1 was correct and the device should increment its transmit sequence and send the next DATA0/1 packet. If the device has no more data ready to send it responds with a NAK packet, or if there is a problem the device responds with an ALERT.

Even though the error rate of the ASP links are very low error the protocol allows the device and host to recover and retry failed packets without host intervention. This is advantageous since at the high serial rates used, even with a low error rate, random bit errors could effect throughput if the host had to resolve all errors via interrupts. The fact that these errors can be recovered without going back to the host will increase the overall throughput of the bus.

The action taken to recover from these errors depends on what kind of transactions are being conducted between the host and the device. These transactions can be divided into two types. The first is where the host maintains control of the bus and the device is just responding to it. The second is the case where the host gives control of the bus to the device for the purpose of the device providing some data to the host.

The host controlled transactions are shown in Table 42 below along with the allowed responses from the device.

TABLE 42

Host Controlled Transactions

| Host Sends | Device Response |
| --- | --- |
| OUTDATA0/1 | ACK, NAK, ALERT |
| INSTOP | ACK, ALERT |
| RESET | ACK, ALERT |
| HEARTBEAT | ACK, ALERT |

In the above situations the host is still in control of the link. If no response or a response with errors occurs the host (after a suitable time-out) will retry the message up to the number of times that the retry counter value is set. If the host receives no response, then this is caused by either the host sent packet not being received by the device or the device returned packet not being received by the host. In either case, the host can after some suitable period of time retry the packet, since the device will have enabled its receiver after one packet time whether it received a packet and returned a failed response or received a bad packet or received no packet at all.

An exemplary sequence is shown below:

Case 1: Device Receives No Packet or Bad Packet (Header or CRC Errors).
A. Host sends Packet, disables transmitter and enables receiver and waits one packet time.
B. Device receives nothing or Packet with Bad Header.
C. Device waits for maximum length packet if Bad Header and re-enables receiver to search for SYNC.
D. Host's one packet timer expires.
E. Host enables its transmitter, and resends Packet and increments Retry Count.

Case 2: Device Receives Good Packet but Host Receives No Packet or Bad Packet.
A. Host sends Packet, disables transmitter and enables receiver and waits one packet time.
B. Device receives Packet, disables receiver, enables transmitter and sends response.
C. Device disables transmitter enables receiver, and searches for SYNC.
D. Host's one packet timer expires with no valid response, and disables receiver.
E. Host enables its transmitter, and resends Packet and increments Retry Count.

In each of the above cases after the host has exhausted the number of retries per the retry count an error flag is set and the failure reported to the host software. Also the sequence is such that there is no case where each device should be trying to transmit at the same time. Note that the device should also be designed to default to having its receiver enabled and searching for SYNC. This could be done with some form of long watchdog timer in the device.

There are two situations where the host turns over control of the link to the device for the purpose of the device sending a packet of data to the host. These only occur when the device is returning a data packet to the host. Listed in the table below are the types of packets the host sends to turn over control to the device and the type of packets the device would send to the host. These two situations are the only ones where the device has control of the ASP bus and is required to recover from transmission errors. Again the ability of the bus to recover from link errors is shown and the requirements of what the device has to do to effect this recover is shown below in Table 43.

TABLE 43

Device Controlled Transactions

| Host Sends | Device Response |
|---|---|
| INSTART | DATA0/1, NAK, ALERT |
| ACK | DATA0/1, NAK, ALERT |

In the above situations the host has turned over control of the link to the device. It is the device's responsibility to try and recover from link transmission errors up to the level of the retry count value. After the device responds with a packet it expects to get some form of acknowledgment from the host. If the packet is not received from the host the device needs to resend the packet. The difference is this case is the host timer needs to be long enough for the device to retry the transmission the number of times given by the retry counter. After that time both the host and device abort and the host reports to the software and the device sets error flags and waits to receive a packet. The detailed sequence is shown below.

Case 1: Host Receives no Packet or Bad Packet (Header or CRC Errors).
A. Host sends Packet, disables transmitter and enables receiver, sets timer to Retry Count times maximum packet time.
B. Device sends response starts one packet time timer and enables receiver.
C. After one packet time host has received a bad packet or no packet and continues to wait for response.
D. Device's one packet timer expires and device enables transmitter and resends packet and increments retry count.
E. Above sequence is repeated up to the level of the retry count.
F. Host timer expires and host sets error flags and reports error to software.
G. Device having tried number of times given by retry count, sets error flags and enables receiver.
H. Host is now in control of link and software will try to access device to effect error recovery.

Case 2: Host Receives Good Packet but Device Receives no Packet or Bad Packet Response.
A. Host sends Packet, disables transmitter and enables receiver, sets timer to Retry Count times maximum packet time.
B. Device sends response, starts one packet time timer and enables receiver.
C. Host having received packet, enables transmitter and sends response then enables receiver.
D. Device receives bad packet or no packet, and when packet timer expires enables transmitter and resends previous packet and increments retry counter.
E. Host's receives same data packet as before, discards packet and enables transmitter and resends response.
F. Device again receives bad packet or no packet, and when packet timer expires enables transmitter and resends packet and increments retry counter.
G. Above sequence is repeated up to the level of the retry count.
H. Host timer expires and host sets error flags and reports error to software.
I. Device having tried number of times given by retry count, sets error flags and enables receiver.
J. Host is now in control of link and software will try to access device to effect error recovery.

In each of the above cases after the device has exhausted the number of retries per the retry count an error flag is set in the device and the device enables its receiver and waits for a packet from the host. The host, having the longer timer (Retry count times maximum length packet), expire knows that the device has already tried the packet the number of time indicated by the retry count and sets error flags and reports to the host that a transmission has failed. The sequence is such that there is no case where each device should be trying to transmit at the same time. Note that the device should be designed to default to have its receiver enabled and searching for SYNC. This could be done with some form of long watchdog timer in the device.

ASP Host Controller Interface

This section describes a Host Controller Interface (HCI) for an ASP Host Controller. The HCI description covers the hardware/software interface between the Host Controller Software Driver and the Host Controller Hardware. It describes the register-level hardware interface to the ASP Host Controller. Hardware developers may take advantage of the standard software drivers written to be compatible with this ASP Host Controller Interface by conforming to the register-level interface and memory data structure described in this document.

The ASP HCI consists of two parts—Host Controller Driver (HCD) and Host Controller (HC). The HCD software is responsible for issuing commands to ASP devices and obtaining status from these devices. The Host Controller moves data between system memory and ASP devices by processing data structures in system memory and generating transactions to these devices. The Host Controller implementation is, in a preferred embodiment, a PCI device that exploits ASP's high bandwidth. PCI's bus master capability in the Host Controller permits high performance data transfers to and from system memory.

In a preferred embodiment, features of HCI include:
Ease of Use. The Host Controller Interface is a simple interface, making Host Controller hardware implementation and Host Controller Driver software development easy.
ATA/ATAPI Command Compatibility. The HCI adapts the simple and widely-used ATA/ATAPI command set into its data structures.
Bootability. A BIOS expansion ROM is supported to allow the attached devices to be bootable.
Memory Address Spaces. Both 32-bit and 64-bit memory address spaces are defined. A Host Controller device may support either the 32-bit or 64-bit memory address space.
Increased System Performance. The Host Controller uses PCI's bus master capability to maximize performance in data transfers and minimize the impact on the system bus. It supports overlapping commands to different devices.
Low CPU Utilization. This HCI only requires the HCD software to setup a command data structure in system, write to the Host Controller with a pointer to this structure, wait for a command completion interrupt, and read interrupt status. No CPU intervention is required for command execution and data transfers. This frees the CPU up for other tasks.

Overview of the ASP Host Controller

Figure 40:
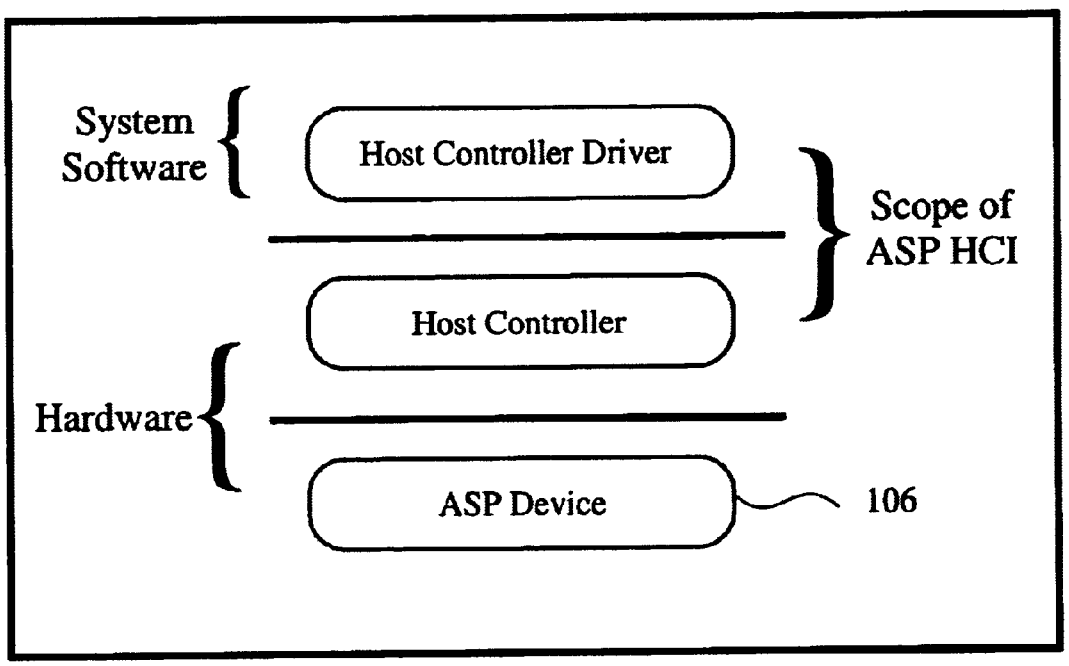
FIG. 40 illustrates an ASP system block diagram wherein the host and the device are divided into distinct hardware and software layers, in accordance with one embodiment of the present invention.

The basic flow and interrelationships of the ASP communications model are shown in FIG. 40. The host and the device 106 are divided into the distinct hardware and software layers. The host communicates to the devices through the Host Controller Interface. All communications between the host and device ultimately occur on the physical ASP wires.

The ASP bus interface handles interactions for the electrical and protocol layers as described above. From the interconnect point-of-view, a similar ASP bus interface is provided by both the ASP device and the host. On the host, however, the ASP bus interface has additional responsibilities due to the unique role of the host on the ASP and is implemented as the host controller. The host controller also provides four attachment points, or ports, for connecting up to four ASP devices to the host.

The ASP system uses the host controller to manage data transfers between the host and the ASP devices. The interface between the ASP system and the host controller is dependent on the hardware definition of the host controller. The ASP system, in concert with the host controller, performs the translation between the host's view of data transfers and the ASP transactions appearing on the interconnect.

The Host Controller Driver (HCD) provides the operating system with mechanisms for detecting the attachment and removal and initialization of ASP devices, command generation, data transfers, and status retrieval. The interface between the Host Controller Driver and the operating system is not defined by this specification and is operating system dependent.

Figure 41:
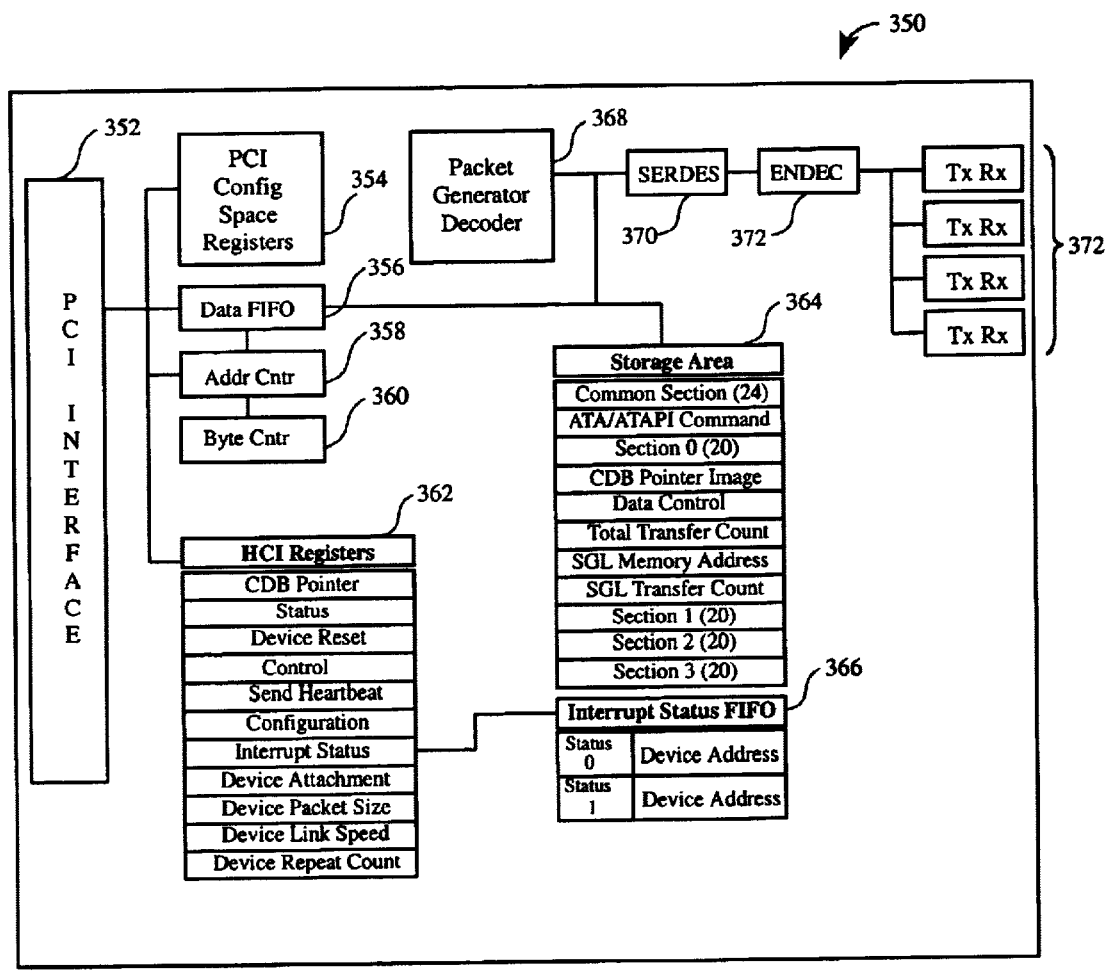
FIG. 41 illustrates a host controller block diagram of ASP, in accordance with one embodiment of the present invention.

FIG. 41 is a block diagram 350 for the Host Controller. The PCI interface 352 includes the logic to generate PCI-compliant signals. The PCI configuration space registers 354 provide information about the host controller and its requirements. The DMA engine consists of a data FIFO 356, an address counter 358, a transfer byte counter 360, and direction control. The Host Controller Interface (HCI) registers 362 allow software to configure the host controller for operations, initialize devices, and send commands to devices. The Packet Generator/Decoder 368 contains a polling engine that generates poll packets in round robin fashion or with priority, and sends or receives data packets to or from device. The serializer/deserializer (SERDES) 370 converts parallel data to serial data and vice versa. The encoder/decoder (ENDEC) 372 converts bit streams to encoded data and strobe signals and vice versa. The transceivers (TxRx) 372 are responsible for transmitting and receiving encoded signals onto or from the cable. The Storage Area 364 is on-chip memory to store pertinent information. It is divided into five sections. The common section (24 bytes) is used to stored ATA/ATAPI command and status, and is shared by all devices. Once the command is sent to the device, or the status is returned to the system, the content in this section is discard. The other four sections are used on a per device basis. Information in these section is kept for the entire duration of the command execution. The Interrupt Status FIFO 366 allows all devices to post interrupt status and interrupt the host.

Figure 42:
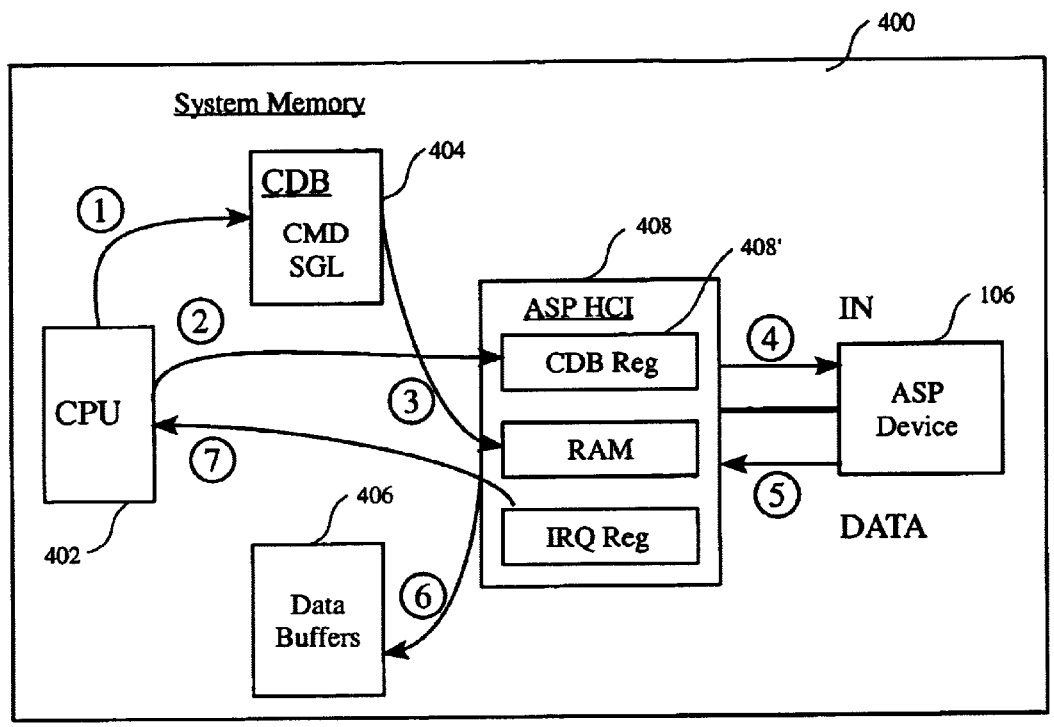
FIG. 42 illustrates a command execution flow diagram, in accordance with one embodiment of the present invention.

FIG. 42 shows a command execution flow 400 of the present invention which involves the following operations:
1. The CPU 402 sets up a Command Descriptor Block (CDB) 404 with an ATA/ATAPI command and a scatter/gather list in system memory.
2. The CPU 402 writes the address of this CDB to the CDB Pointer Register of the ASP HCI 408.
3. The host controller sets the DMA controller to transfer the CDB to internal memory.
4. The host controller 408 sends the command to the device and sends IN packets to poll the device 106 for data.
5. The device responds with data packets.
6. The host controller sets up the DMA controller to transfer the data to the data buffers 406 pointed to by the scatter/gather list.
7. The host controller 408 sets up the interrupt status and interrupts the CPU 402.

Host Controller Interface Data Structures

The HCI data structures include a command descriptor, a data transfer descriptor, and a scatter/gather list. The command descriptor consists of an ATA and ATAPI command. The data transfer descriptor specifies the device address, and data transfer direction and count. The scatter/gather list specifies a list of physical memory addresses and transfer counts for data transfers. In a preferred embodiment, the Host Controller data structure should be in one contiguous block of double-word aligned physical memory. The Host Controller is given a pointer to this data structure to start a command execution. The following Tables 44 and 45 illustrate a format of the Host Command Descriptor Block (CDB).

TABLE 44

Host Command Descriptor Block for 32-bit Addressing

| Offset | Length | Description | Type |
|---|---|---|---|
| 0 | 8 | ATA Command/ATA Status | Command |
| 8 | 16 | ATAPI Command | Descriptor |
| 24 | 4 | Data Control | Data Transfer |
| 28 | 4 | Total Transfer Count | Descriptor |
| 32 | 4 | Segment 0 Physical Memory Address | Scatter/Gather |
| 36 | 4 | Segment 0 Transfer Count | List |
| 40 | 4 | Segment 1 Physical Memory Address | |
| 44 | 4 | Segment 1 Transfer Count | |
| ... | | | |

TABLE 45

Host Command Descriptor Block for 32-bit Addressing

| Offset | Length | Description | Type |
|---|---|---|---|
| 0 | 8 | ATA Command/ATA Status | Command |
| 8 | 16 | ATAPI Command | Descriptor |
| 24 | 4 | Data Control | Data Transfer |
| 28 | 4 | Total Transfer Count | Descriptor |
| 32 | 8 | Segment 0 Physical Memory Address | Scatter/Gather |
| 40 | 4 | Segment 0 Transfer Count | List |
| 44 | 8 | Segment 1 Physical Memory Address | |
| 52 | 4 | Segment 1 Transfer Count | |
| ... | | | |

The host CDB should be in one contiguous block of double-word aligned physical memory. The Host Controller is given a pointer to this data structure to start a command execution. The command descriptor consists of an ATA command and an ATAPI command if the attached device is an ATAPI device, and an ATA status returned by the device when the command is completed.

An 8-byte ATA Command is prepared by the host in this field, and sent to the addressed device by the Host Controller using an OUTDATA0/1 packet. At command completion, an 8-byte ATA Status is returned by the device, and placed into this field by the DMA controller. Each byte in this field corresponds to the same byte in the ATA registers. The host should use the ATA Read/Write DMA commands for reading and writing to devices, and set the DMA bit in the Features field for an ATAPI Packet command. DMA data transfer commands, PIO data transfer commands, and non-data commands should be supported. For PIO data transfer commands, the DMA controller performs the data transfers. Preferably, the host should use LBA in place of CHS whenever possible.

TABLE 46

Current ATA/ATAPI Registers Definition

| Offset | Command (Write) | Status (Read) |
|---|---|---|
| 0 | Data[15:0] | Data[15:0] |
| 1 | Features | Error |
| 2 | ATA: Sector Count<br>ATAPI: Interrupt Reason | ATA: Sector Count<br>ATAPI: Interrupt Reason |
| 3 | Sector Number/LBA[7:0] | Sector Number/LBA[7:0] |
| 4 | ATA: Cyl.lo/LBA[15:8]<br>ATAPI: Byte Count[7:0] | ATA: Cyl.lo/LBA[15:8]<br>ATAPI: Byte Count[7:0] |
| 5 | ATA: Cyl.hi/LBA[23:16]<br>ATAPI: Byte Count[15:8] | ATA: Cyl.hi/LBA[23:16]<br>ATAPI: Byte Count[15:8] |
| 6 | Device & Head/LBA[27:24] | Device & Head/LBA[27:24] |
| 7 | Command | Status |

TABLE 47

ASP HCI ATA/ATAPI Command Descriptor Definition

| Offset | Command (Write) | Status (Read) |
|---|---|---|
| 0 | Not Used | Not Used |
| 1 | Features | Error |
| 2 | ATA: Sector Count | ATA: Sector Count<br>ATAPI: Interrupt Reason |
| 3 | LBA[7:0] | LBA[7:0] |
| 4 | ATA: LBA[15:8]<br>ATAPI: Byte Count[7:0] | ATA: LBA[15:8]<br>ATAPI: Byte Count[7:0] |
| 5 | ATA: LBA[23:16]<br>ATAPI: Byte Count[15:8] | ATA: LBA[23:16]<br>ATAPI: Byte Count[15:8] |
| 6 | Device 0/LBA[27:24] | Device 0/LBA[27:24] |
| 7 | Command | Status |

Notes
No PIO
No CHS
No Dev1

The register at offset 0 was used for PIO data transfers. Since data transfers are in a preferred embodiment performed by the DMA controller, the field at offset 0 is not used. One bit in the register at offset 6 was used to address one of the two devices. Since device addressing is done using the Device Address field, the device bit at offset 6 should be set to 0.

A 16-byte field is allocated for an ATAPI command. Both 12- and 16-byte commands should be supported. From the ATAPI Identify Device command, the host can determine 12- or 16-byte commands are supported by the ATAPI device. Thus, the ATAPI commands are SCSI-like commands. This field is optional, and is only used for ATAPI devices. If the ATA Command field indicates that an ATAPI packet command (Aoh) is being issued, this field contains a valid ATAPI command. When a check condition occurs, a separate Request Sense command should be issued by the host with the appropriate buffer address for sense data.

TABLE 48

ATA Commands Supported

| Command Name | Data Transfer Type | Op Code |
|---|---|---|
| ATAPI Packet Command | varies with command | A0h |
| ATAPI Identify Device | PIO Data In | A1h |
| ATAPI Soft Reset | Non-Data | 08h |
| Check Power Mode | Non-Data | E5h |
| Execute Diagnostic | Non-Data | 90h |
| Identify Device | PIO Data In | ECh |
| Idle Immediate | Non-Data | E1h |
| Initialize Device Parameters | Non-Data | 91h |
| Nop | Non-Data | 00h |
| Read Buffer | PIO Data In | E4h |
| Read DMA with Retry | DMA Data In | C8h |
| Read DMA without Retry | DMA Data In | C9h |
| Read Verify Sectors with Retry | Non-Data | 40h |
| Read Verify Sectors without Retry | Non-Data | 41h |
| Set Features | Non-Data | EFh |
| Sleep | Non-Data | E6h |
| Standby Immediate | Non-Data | E0h |
| Write Buffer | PIO Data Out | E8h |
| Write DMA with Retry | DMA Data Out | CAh |
| Write DMA without Retry | DMA Data Out | CBh |
| Vendor Specific | Vendor Specific | — |

Some ATA commands were defined to use PIO for data transfers. For these commands, the data transfer mechanism between the host controller and the device will be the ASP, and the data transfer between the system memory and the host controller will be performed by the DMA controller. For more information, reference can be made to the ANSI X3T13 Information Technology—AT Attachment Standard. This standard is hereby incorporated by reference.

The data transfer descriptor consists of two fields, Data Control and Total Transfer Count. The Data Control field is specified by the host software.

TABLE 49

Data Control (4 bytes)

| Offset | 7 | 6 | 5 | 4 | 3 | 2 | 1 | 0 |
|---|---|---|---|---|---|---|---|---|
| 0 | Reserved | | | | | | Device Address [1:0] | |
| 1 | Reserved | | Data Type | | | | Transfer Direction | Data Transfer |
| 2 | Reserved | | | | | | | |
| 3 | Reserved | | | | | | | |

TABLE 50

Field Definitions for Data Control

| Field Name | Value | Description |
|---|---|---|
| Device Address [1:0] | 0–3 | The 2-bit Device Address field specifies the device that will execute the command and perform the data transfer, and this field can address up to 4 devices. |
| Data Transfer | 0 | The command involves no data transfer. |
| | 1 | The command involves data transfer. |
| Transfer Direction | 0 | Data transfer direction is from host to device. |
| | 1 | Data transfer direction is from device to host. |
| Data Type | 0 | Link control data |
| | 1 | Reserved |
| | 2 | Device data |
| | 3–15 | Reserved |

The Device Address field indicates to the host controller which port to use for subsequent transactions. The Data Transfer bit indicates to the host controller whether it has to send data polls (INSTART or OUTDATA) for the command. The Transfer Direction bit indicates to the host controller whether to use INSTART packets for data in transfers or OUTDATA packets for data out transfers. The Data Type field is used by the device to determine the type of data requested by the host.

TABLE 51

| Total Transfer Count (4 bytes) | | | |
|---|---|---|---|
| Byte 3 | Byte 2 | Byte 1 | Byte 0 |
| Total Transfer Count | | | |

The Total Transfer Count is used by the host interface chip to calculate the total number of data packets to send or receive from a device during data transfer. The calculation uses the maximum packet size value that has been negotiated per device.

TABLE 52

| Scatter/Gather Entry for 32-bit Addressing (8 bytes) | | | |
|---|---|---|---|
| Byte 3 | Byte 2 | Byte 1 | Byte 0 |
| EOT | Physical Memory Address Reserved | Transfer Count [15:1] | 0 |

TABLE 53

| Scatter/Gather Entry for 64-bit Addressing (12 bytes) | | | |
|---|---|---|---|
| Byte 3 | Byte 2 | Byte 1 | Byte 0 |
| | Physical Memory Address [31:00] | | |
| | Physical Memory Address [63:32] | | |
| EOT | Reserved | Transfer Count [15:1] | 0 |

The scatter/gather list specifies the physical memory addresses and sizes of the data buffers in system memory, and may contain any number of entries. The EOT bit indicates the end of this list. However, a maximum of 16 segment entries is recommended. Physical memory addresses can be byte-aligned. The maximum transfer count is 64K, and the count should be an even number, and zero indicates 64K. EOT=End of table.

Host Controller Interface Registers

The Host Controller contains a set of on-chip registers which are mapped into a non-cacheable portion of the system memory addressable space. These registers are used by the Host Controller Driver for communications between the CPU and the Host Controller and to control the various operations of the ASP. The base address of this set of registers is determined by a PCI configuration register.

The following notation is used to describe register access attributes. The read and write accesses are defined in the perspective of the host software.

| | |
|---|---|
| RO | Read-Only. If a register is read-only, writes have no effect. |
| WO | Write-Only. If a register is write-only, reads have no effect. |
| R/W | Read/Write. A register with this attribute can be read and written. |

-continued

| | |
|---|---|
| | Note that individual bits in some read/write registers may be read-only. |
| WC | Write Clear. A register with this attribute can only be written and cannot be read. A write of a 1 sets and then clears the corresponding bit and a write of a 0 has no effect. |

Reserved fields should contain 0s, and may be used in a future embodiments.

TABLE 54

| Host Controller Interface Registers | | | |
|---|---|---|---|
| Offset | Length | Access | Description |
| 00h | 8 | R/W | CDB Pointer Register |
| 08h | 4 | RO | Status Register |
| 08h | 2 | WC | Device Reset Register |
| 0Ah | 1 | WC | Control Register |
| 0Bh | 1 | WC | Send Heartbeat Register |
| 0Ch | 4 | R/W | Configuration Register |
| 10h | 2 | RO | Interrupt Status Register |
| 12h | 2 | RO | Device Attachment Register |
| 14h | 4 | R/W | Device Packet Size Register |
| 18h | 4 | R/W | Device Link Speed Register |
| 1Ch | 4 | R/W | Device Repeat Count Register |

TABLE 55

| CDB Pointer Register (8 bytes) (Read/Write) | | | |
|---|---|---|---|
| Byte 3 | Byte 2 | Byte 1 | Byte 0 |
| CDB Physical Memory Address [31:00] | | | |
| CDB Physical Memory Address [63:32]/Reserved | | | |

Figure 43:
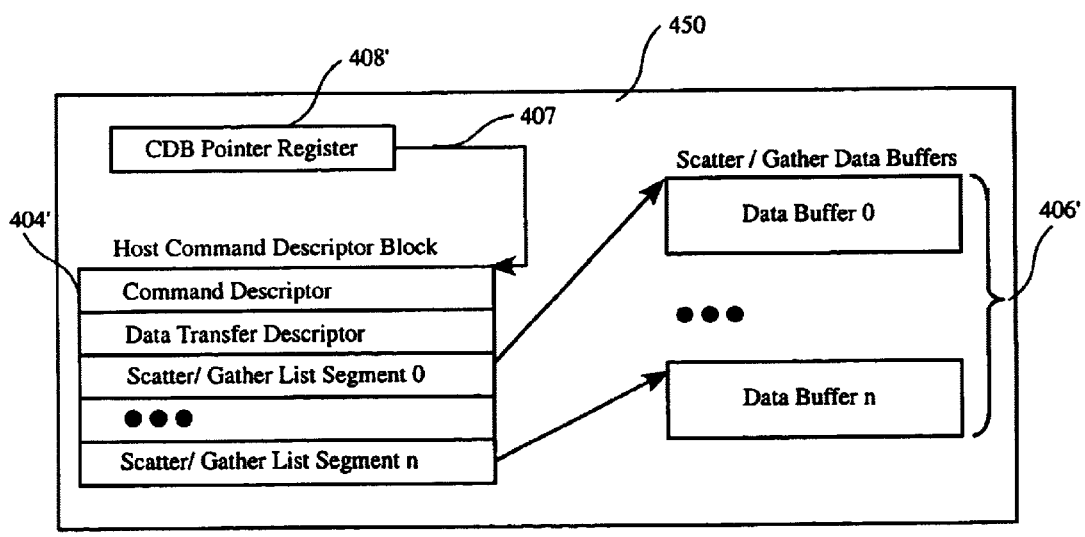
FIG. 43 illustrates an exemplary implementation of the CDB Pointer Register, in accordance with one embodiment of the present invention.
Figure 44A:
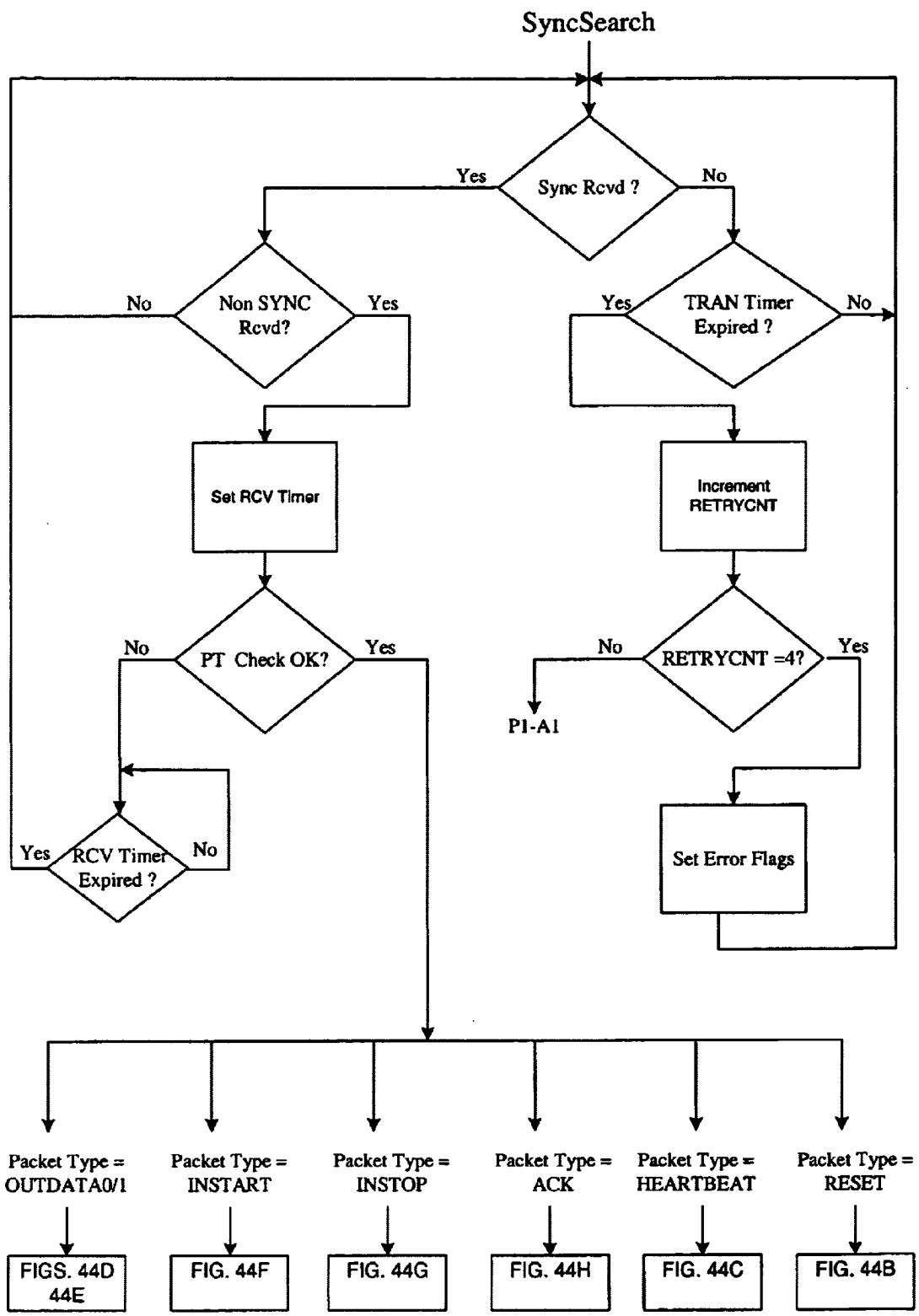
FIGS. 44A–44H illustrate flowchart diagrams beginning with a SyncSearch and extending to OUTDATA0/1, INSTART, INSTOP, ACK, HEARTBEAT, and RESET after receiving an OK PT check, in accordance with one embodiment of the present invention.
Figure 44B:
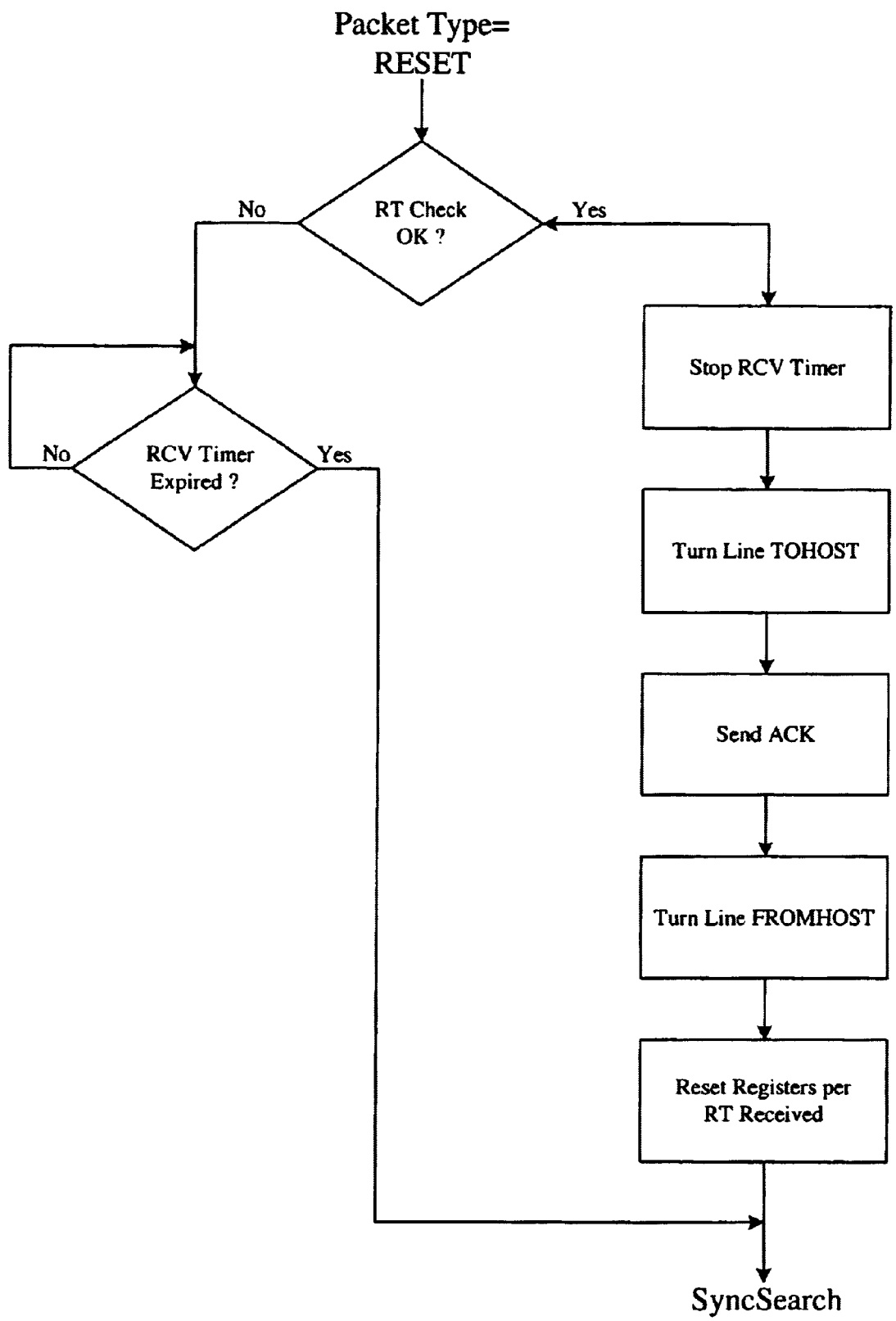
Figure 44C:
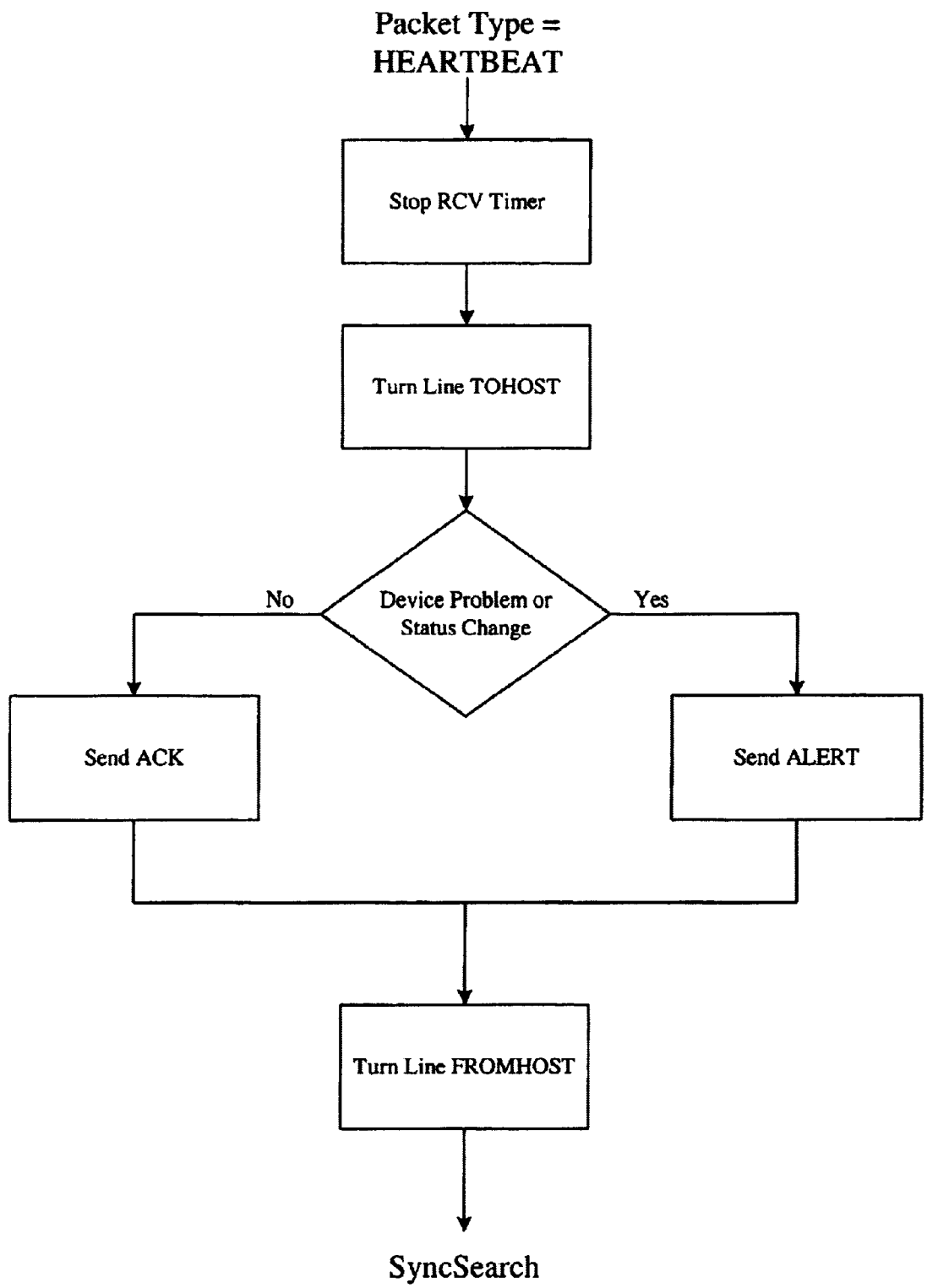
Figure 44D:
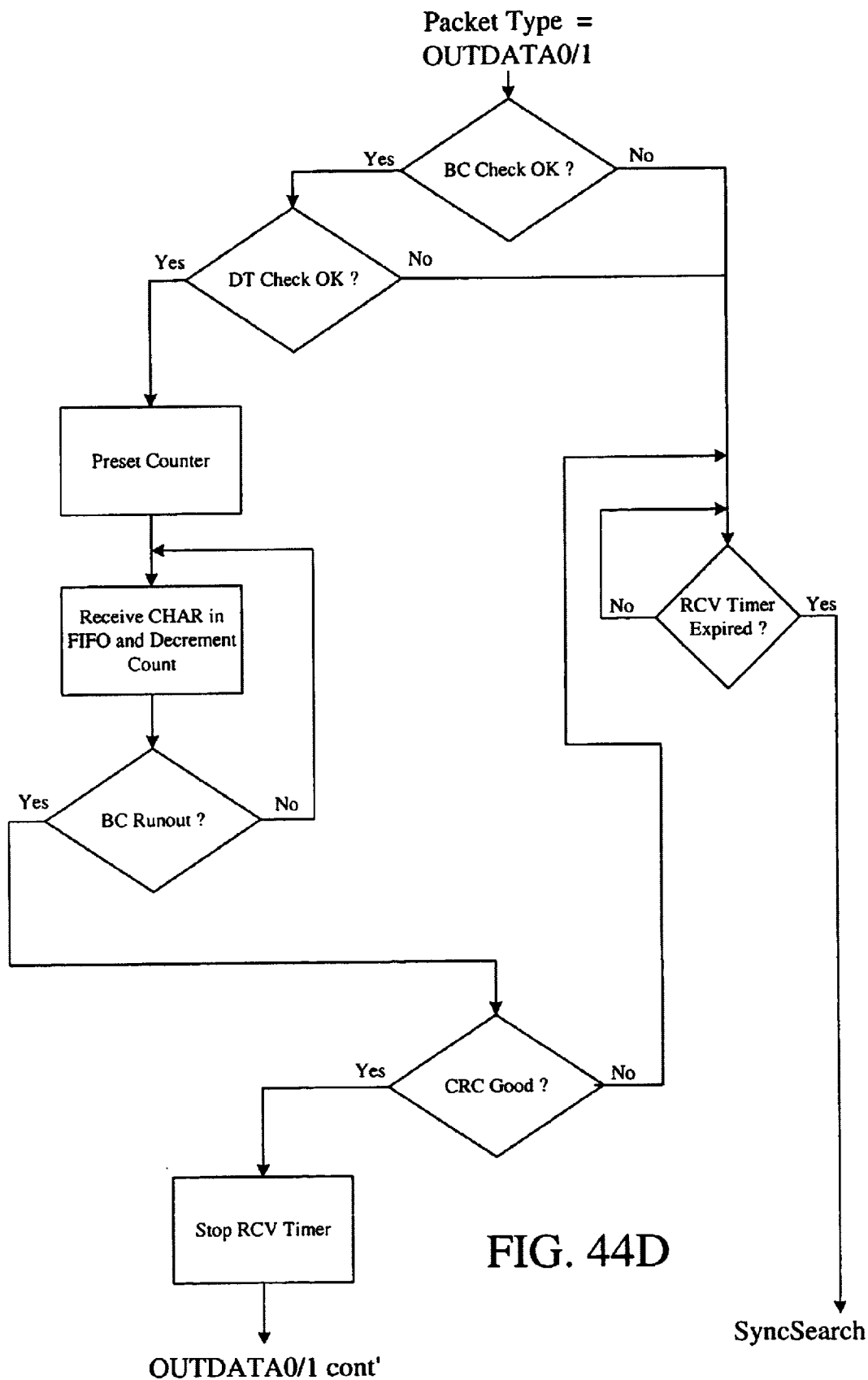
Figure 44E:
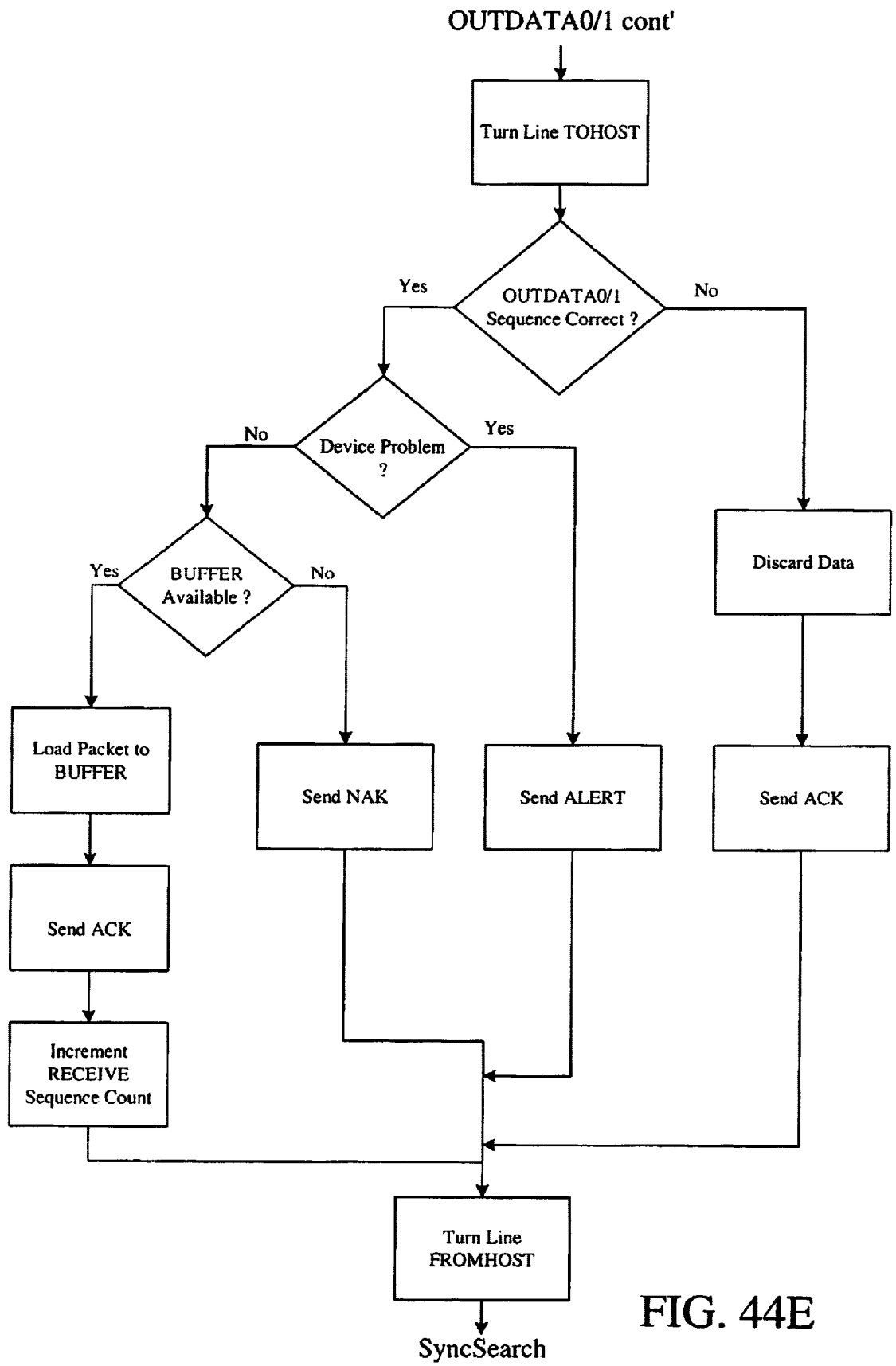
Figure 44F:
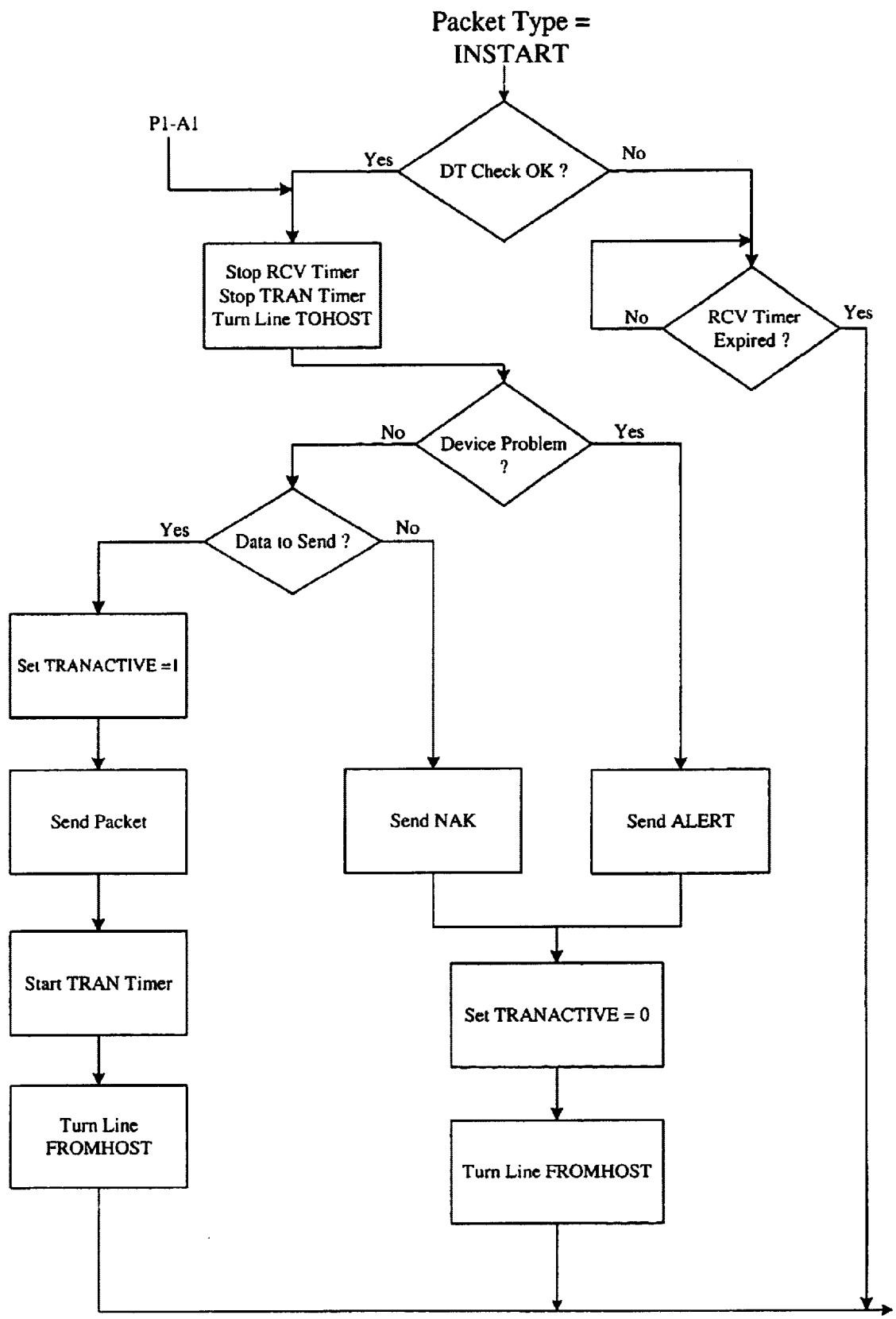
Figure 44G:
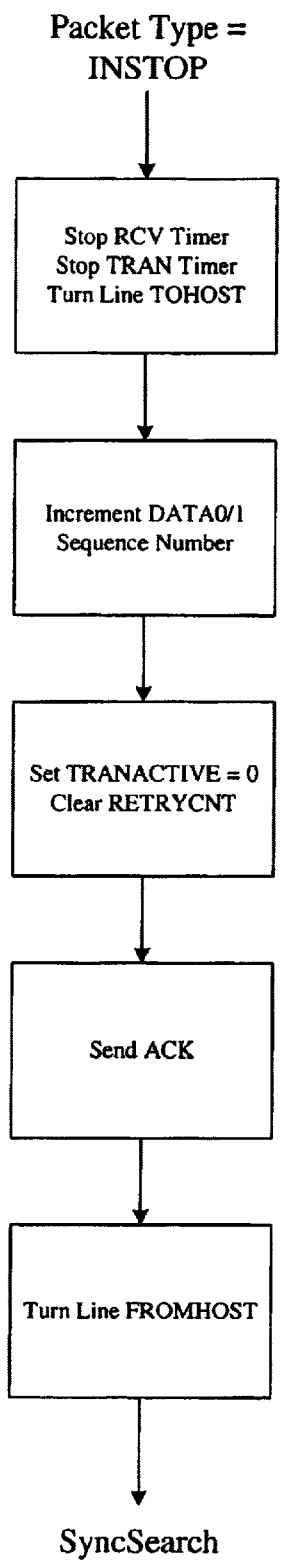
Figure 44H:
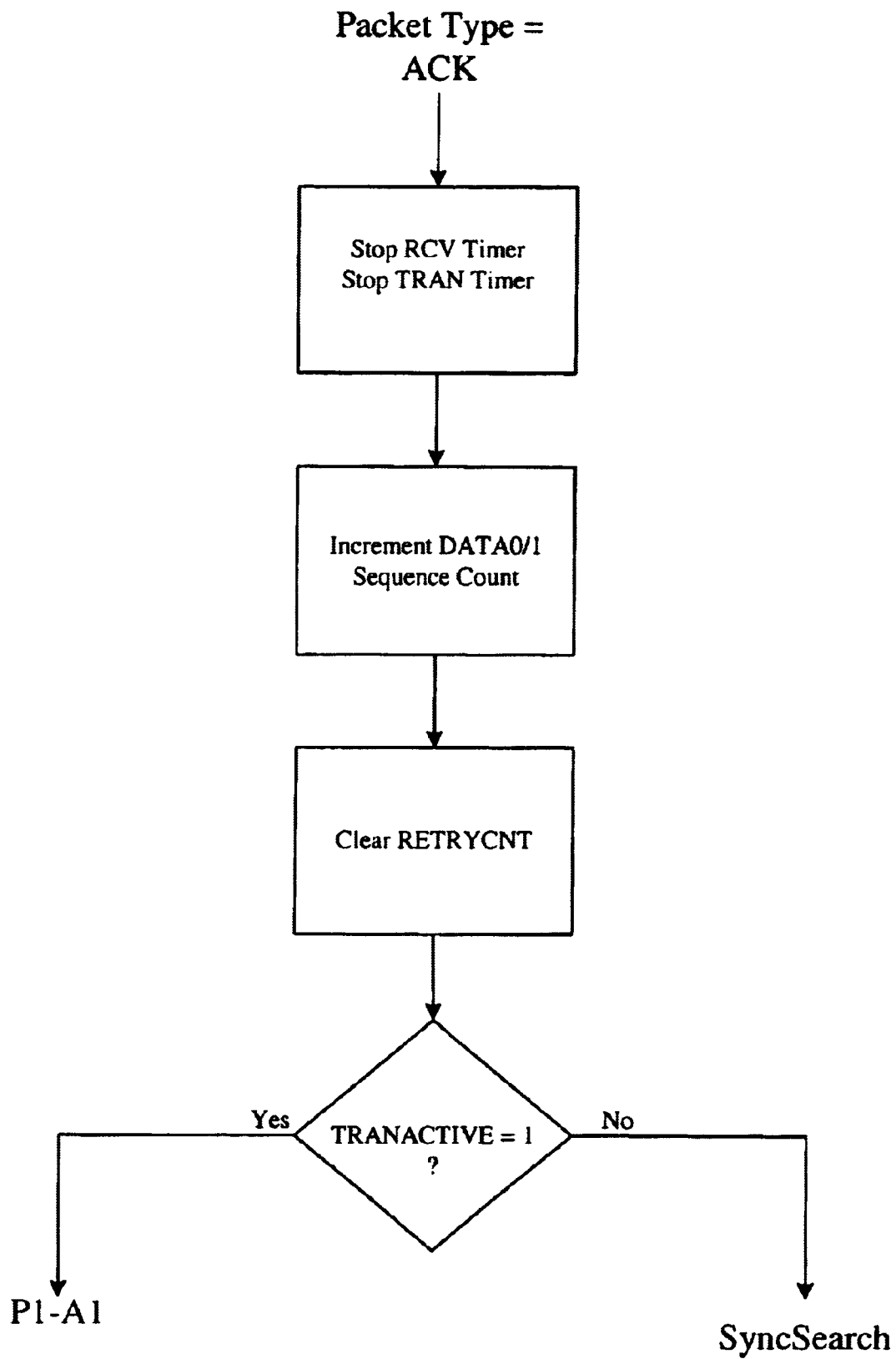

With reference to FIG. 43, the CDB register 408 can be accessed as a 32-bit double word or a 64-bit word if 64-bit extension is supported. The upper 32-bit word is reserved if 64-bit extension is not supported. This is a pointer 407 to the host Command Descriptor Block 404' in system memory. This register provides write access to the command FIFO buffer 406'. The host must first read the Status Register to determine if the FIFO is full or not available by examining the Command FIFO Busy bit. Only one command can be issued to a device at a time. Issuing more than one command to a device causes the current command to be aborted. The action of writing to this register causes the command to be started.

TABLE 56

| Status Register (4 bytes) (Read-Only) | | | | | | | | |
|---|---|---|---|---|---|---|---|---|
| Offset | 7 | 6 | 5 | 4 | 3 | 2 | 1 | 0 |
| 0 | Reserved | | | | | DMA In Progress | IRQ Pending | CMD FIFO Busy |
| 1 | | | | | Reserved | | | |
| 2 | Host Link Speed | | | | Host FIFO Size | | | |
| 3 | Overlap Commands | | | | Bridge Support | | Host Ports | |

TABLE 57

Field Definitions for Status Register

| Field Name | Value | Description |
|---|---|---|
| Command FIFO Busy | 0 | Indicates that the command FIFO is available. |
|  | 1 | Indicates that the command FIFO is full, or not available. |
| IRQ Pending | 0 | Indicates that no interrupts are pending. |
|  | 1 | Indicates that interrupts are pending. The software can read the Interrupt Status Register to determine the cause of interrupts. |
| DMA In Progress | 0 | Indicates that no DMA data transfer is occurring. |
|  | 1 | Indicates that the DMA controller is transferring data. |
| Host FIFO Size | Table | Maximum FIFO size in the host controller. |
| Host Link Speed | Table | Maximum link speed of the host controller. |
| Host Ports | 0–7 | Maximum port (device) address the host controller can support. |
| Bridge Support | 0 | The host controller cannot support bridge devices |
|  | 1 | The host controller can support bridge devices |
| Overlap Commands | 0–15 | Number of overlap commands the host controller can support. 0 = No overlap commands, or only 1 device is supported 1 = 1 overlap command allowed, or 2 devices are supported. etc. |

The host FIFO is used for speed matching between the PCI bus (132MB/s) and the link (40–50MB/s). In one embodiment, the FIFO size is made equal to the maximum packet size. In another embodiment, the Set Max Packet Size command is used to limit the packet size, so that a smaller FIFO can be used. Or, an optimum FIFO size may be calculated based on PCI transfer rate, PCI latency timer, link transfer rate, and packet size, so that overruns and not occur.

TABLE 58

FIFO Sizes

| Value | FIFO Size |
|---|---|
| 0 | 64 bytes |
| 1 | 128 bytes |
| 2 | 256 bytes |
| 3 | 512 bytes |
| 4 | 1024 bytes |
| 5 | 2048 bytes |
| 6–15 | Reserved |

TABLE 59

Link Speeds

| Value | Link Speed |
|---|---|
| 0 | 320 Mbits/s |
| 1 | 640 Mbits/s |
| 2–15 | Reserved |

TABLE 60

Device Reset Register (2 bytes) (Write Clear)

| Offset | 7 | 6 | 5 | 4 | 3 | 2 | 1 | 0 |
|---|---|---|---|---|---|---|---|---|
| 0 | Reserved | | | | Device Reset [3:0] | | | |
| 1 | Reserved | | | | Reset Type | | | |

This register can only be accessed as a 16-bit word. All bits in this register are self-clearing.

TABLE 61

Field Definitions for Device Reset Register

| Field Name | Value | Description |
|---|---|---|
| Device Reset | Bit Significant | Resets the corresponding device with the specified Reset Type. Only one bit should be set at a time. |
| Reset Type | 0 | Link Reset. |
|  | 1 | Device Reset. |
|  | 2 | Link and Device Reset |
|  | 3 | Sequence Bit Reset. |
|  | 4–15 | Reserved |

TABLE 62

Control Register (1 bytes) (Write Clear)

| Offset | 7 | 6 | 5 | 4 | 3 | 2 | 1 | 0 |
|---|---|---|---|---|---|---|---|---|
| 0 | Reserved | | | | | Flush DMA FIFO | Abort DMA | Host Controller Reset |

All bits in this register are self-clearing.

TABLE 63

Field Definitions for Control Register

| Field Name | Value | Description |
|---|---|---|
| Host Controller Reset | 1 | This bit resets the host controller chip. |
| Abort DMA | 1 | This bit stops all DMA transfers. |
| Flush DMA FIFO | 1 | This bit flushes the DMA FIFO. |

TABLE 64

Send Heartbeat Register (1 byte) (Write Clear)

| Offset | 7 | 6 | 5 | 4 | 3 | 2 | 1 | 0 |
|---|---|---|---|---|---|---|---|---|
| 0 | Reserved | | | | Send Heartbeat [3:0] | | | |

All bits in this register are self-clearing.

TABLE 65

| Field Definitions for Send Heartbeat Register | | |
|---|---|---|
| Field Name | Value | Description |
| Send Heartbeat | Bit Significant | Sends a heartbeat to the corresponding device. Only one bit should be set at a time. |

TABLE 66

Configuration Register (4 bytes) (Read/Write)

| Offset | 7 | 6 | 5 | 4 | 3 | 2 | 1 | 0 |
|---|---|---|---|---|---|---|---|---|
| 0 | Reserved | | | | | Link Retry Enable | Heartbeat Enable | Global IRQ Enable |
| 1 | Reserved | | | | | Link Retry Count | | |
| 2 | Reserved | Aborted CDB IRQ Enable | DMA Under-run IRQ Enable | DMA Overrun IRQ Enable | Retransmission IRQ Enable | Link Error IRQ Enable | Device Attach IRQ Enable | Completed CDB IRQ Enable |
| 3 | Heartbeat Period | | | | | | | |

This register can be accessed as a 32-bit double word, 16-bit word, or a byte. This register allows the host software to control the assertion of IRQs globally and individually with a mask of each interrupt source.

TABLE 67

| Field Definitions for Configuration Register | | |
|---|---|---|
| Field Name | Value | Description |
| Global IRQ Enable | 0 | Disables the assertion of PCI IRQ, but does not affect the IRQ Pending bit in the Status Register. |
| | 1 | Enables the assertion of PCI IRQ. |
| Heartbeat Enable | 0 | Disables the generation of a HEARTBEAT packet to all devices. |
| | 1 | Enables the generation of a HEARTBEAT packet to each device at the period specified in the Heartbeat Period field. |
| Link Retry Enable | 0 | Disables link retries after a link error is detected. |
| | 1 | Enables link retries for the number of times specified in the Link Retry Count field after a link error is detected. |
| Link Retry Count | 0–15 | Number of times to retry after a link error is detected. |
| Completed CDB IRQ Enable | 0 | Does not generate an interrupt after a CDB is completed. |
| | 1 | Generates an interrupt after a CDB is completed. |
| Device Attach IRQ Enable | 0 | Does not generate an interrupt when the Device Attachment Register changes. |
| | 1 | Generates an interrupt when the Device Attachment Register changes. |
| Link Error IRQ Enable | 0 | Does not generate an interrupt after a link error is detected. |
| | 1 | Generates an interrupt after a link error is detected. |
| Retransmission IRQ Enable | 0 | Does not generate an interrupt after a link retransmission occurred. |
| | 1 | Generates an interrupt after a link retransmission occurred. |
| DMA Overrun IRQ Enable | 0 | Does not generate an interrupt after a DMA overrun is detected. |
| | 1 | Generates an interrupt after a DMA overrun is detected. |
| DMA Underrun IRQ Enable | 0 | Does not generate an interrupt after a DMA underrun is detected. |
| | 1 | Generates an interrupt after a DMA underrun is detected. |
| Aborted CDB IRQ Enable | 0 | Does not generate an interrupt after a CDB is aborted by the device. |
| | 1 | Generates an interrupt after a CDB is aborted by the device. |
| Heartbeat Period | 0–255 | Specifies a time period that is a multiple of 125 ms for generating HEARTBEAT packets. |

Link errors include packet header errors, packet length errors, CRC errors, encoding errors, and time-out errors. When a link error is detected, the host controller retries the transaction up to the number of times specified in the Link Retry Count.

TABLE 68

Interrupt Status Register (2 bytes) (Read-Only)

| Offset | 7 | 6 | 5 | 4 | 3 | 2 | 1 | 0 |
|---|---|---|---|---|---|---|---|---|
| 0 | Reserved | Aborted CDB IRQ | DMA Under-run IRQ | DMA Overrun IRQ | Retransmission IRQ | Link Error IRQ | Device Attach IRQ | Completed CDB IRQ |
| 1 | | | Reserved | | | | Device Address [1:0] | |

TABLE 69

Field Definitions for Interrupt Status Register

| Field Name | Value | Description |
|---|---|---|
| Completed CDB IRQ | 1 | A CDB is completed by a device whose address is specified in the Device Address field. The host software can examine the CDB for this device to obtain its completion status. |
| Device Attach IRQ | 1 | There is a change in the Device Attachment Register. The host software can examine the Device Attachment Register to determine the devices that have been attached or removed. |
| Link Error IRQ | 1 | A link error occurred during the command execution. |
| Retransmission IRQ | 1 | Retransmission was required to complete the command. |
| DMA Overrun IRQ | 1 | A DMA overrun error occurred during DMA data transfers. |
| DMA Underrun IRQ | 1 | A DMA underrun error occurred during DMA data transfers. |
| Aborted CDB IRQ | 1 | A CDB was aborted by the device (ALERT was received). |
| Device Address | 0–3 | Contains the address of the device that completed the CDB when Completed CDB IRQ is set. |

This register can only be accessed as a 16-bit word. Reading this register clears the corresponding interrupt. The IRQ Pending bit in the Status Register is clear and the PCI IRQ is deasserted when all interrupt statuses have been read.

TABLE 70

Device Attachment Register (2 bytes) (Read-Only)

| Offset | 7 | 6 | 5 | 4 | 3 | 2 | 1 | 0 |
|---|---|---|---|---|---|---|---|---|
| 0 | Reserved | | | | Devices Attached | | | |
| 1 | Reserved | | | | | | | |

TABLE 71

Field Definitions for Device Attachment Register

| Field Name | Value | Description |
|---|---|---|
| Devices Attached | Bit Significant | When a bit in this field is set, it indicates that a device is attached the port. When a bit in this field is clear, it indicates that a device is not attached to or is removed from the port. This field is updated at each heartbeat. An interrupt is generated and the Device Attach IRQ is set in the Interrupt Status Register when a bit in the Devices Attached field changes. |

This register can be accessed as a 16-bit word or a byte.

TABLE 72

Device Packet Size Register (4 bytes) (Read/Write)

| Offset | 7 | 6 | 5 | 4 | 3 | 2 | 1 | 0 |
|---|---|---|---|---|---|---|---|---|
| 0 | Device 1 Packet Size | | | | Device 0 Packet Size | | | |
| 1 | Device 3 Packet Size | | | | Device 2 Packet Size | | | |
| 2 | Reserved | | | | | | | |
| 3 | Reserved | | | | | | | |

This register can be accessed as a 32-bit double word, 16-bit word, or a byte. The Device Packet Size field specifies the packet size to be used for each device, and allows the host controller to use different packet sizes in Table for different devices.

TABLE 73

Device Link Speed Register (4 bytes) (Read/Write)

| Offset | 7 | 6 | 5 | 4 | 3 | 2 | 1 | 0 |
|---|---|---|---|---|---|---|---|---|
| 0 | Device 1 Link Speed | | | | Device 0 Link Speed | | | |
| 1 | Device 3 Link Speed | | | | Device 2 Link Speed | | | |
| 2 | Reserved | | | | | | | |
| 3 | Reserved | | | | | | | |

This register can be accessed as a 32-bit double word, 16-bit word, or a byte. The Device Link Speed field specifies the link speed to be used for each device, and allows the host controller to use different link speeds in Table for different devices.

TABLE 74

Device Repeat Count Register (4 bytes) (Read/Write)

| Offset | 7 | 6 | 5 | 4 | 3 | 2 | 1 | 0 |
|---|---|---|---|---|---|---|---|---|
| 0 | Device 1 Repeat Count | | | | Device 0 Repeat Count | | | |
| 1 | Device 3 Repeat Count | | | | Device 2 Repeat Count | | | |
| 2 | Reserved | | | | | | | |
| 3 | Reserved | | | | | | | |

This register can be accessed as a 32-bit double word, 16-bit word, or a byte. The Device Repeat Count field specifies the number of times the host controller responds to device data-in packets with an ACK packet instead of an INSTOP packet. The ACK packet is used an implied INSTART packet. The repeat count can vary from 0 to 15.

PCI Configuration Space Registers

This section describes the configuration space registers necessary for an ASP Host Controller to interface with other system components in a PCI-based PC host. In such a system, the registers described here are accessed for set-up during PCI initialization. The HCI registers that are described herein are directly memory-mapped into the main memory of the PC host system.

TABLE 75

PCI Configuration Space Registers

| Offset | Bits [31:24] | Bits [23:16] | Bits [15:8] | Bits [7:0] |
|---|---|---|---|---|
| 00h | Device ID | | Vendor ID | |
| 04h | Status | | Command | |
| 08h | Base Class | Sub Class | Programming Interface | Revision ID |
| 0Ch | Reserved | Header Type | Latency Timer | Cache Line Size |
| 10h | Memory Space Base Address [31:04] | | | |
| 14h | Memory Space Base Address [63:32]/Reserved | | | |
| 18h–2Fh | Reserved | | | |
| 30h | Expansion ROM Base Address | | | |
| 34h | Reserved | | | |
| 3Ch | Max Latency | Min Grant | IRQ Pin | IRQ Line |

TABLE 76

Field Definitions for Configuration Space Registers

| Field Name | Value | Description |
|---|---|---|
| Vendor ID | Vendor-Specific | This field identifies the manufacturer of the host controller device. For example, the Vendor ID for Adaptec is 9004h. |
| Device ID | Vendor-Specific | This field identifies the particular device. This identifier is allocated by the vendor. |
| Command | Design-Specific | Refer to PCI Specification, revision 2.1, for definitions. |
| Status | Design-Specific | Refer to PCI Specification, revision 2.1, for definitions. |
| Revision ID | Vendor-Specific | This field specifies a device revision identifier. Its value is chosen by the vendor. |
| Programming Interface | 00h | ASP Host Controller Interface. |
| Sub-Class | FFh | ASP. (not yet defined) |
| Base Class | 0Ch | Serial bus controller.. |
| Cache Line Size | Design-Specific | Refer to PCI Specification, revision 2.1, for definitions. |
| Latency Timer | Design-Specific | Refer to PCI Specification, revision 2.1, for definitions. |
| Header Type | 00h | This field identifies the layout of second part beginning at offset 10h of the configuration space. |
| Memory Base Address | Design-Specific | For 32-bit addressing, the value is FFFF F000 h. For 64-bit addressing, the value is FFFF FFFF FFFF F040 h Memory Space Indicator (bit 0) is set to 0. Type (bits 2 and 1) is set to 00b for 32-bit addressing, and 10b for 64-bit addressing. Prefetchable (bit 3) is set to 0. |
| Expansion ROM Base Address | Optional | This field is used by add-in devices with an expansion ROM. Refer to PCI Specification, revision 2.1, for definitions. |
| Interrupt Line | 0–15 | This field is specified by the host software with interrupt routing information. |
| Interrupt Pin | 01h | INTA# is used by the host controller device. |
| Min_Gnt | Design-Specific | Refer to PCI Specification, revision 2.1, for definitions. |
| Max_Lat | Design-Specific | Refer to PCI Specification, revision 2.1, for definitions. |

Polling Algorithms

The Host Controller uses two types of polling, active polling and passive polling, during its operation. Polling provides a communication mechanism between the host and the ASP devices. In regard to active polling, the Host Controller uses a round robin polling algorithm for active devices. Fairness for bus utilization is guaranteed. Active devices are those ASP devices that are attached to the host controller and have commands outstanding. It generates INSTART or ACK (implied IN) packet to poll the devices that have data in commands outstanding. It generates OUTDATA0 or OUTDATA1 to poll the devices that have data out commands outstanding. These poll packets are generated constantly by the host controller.

The Host Controller generates passive polls to inactive devices. Inactive devices are those ASP devices that have no commands outstanding or are not attached to the host controller. The host controller generates HEARTBEAT polls, passively, at a relatively slow rate specified by the host software in the Heartbeat Period field of the Configuration Register. Passive polling allows the host controller to determine whether an attached device has been removed or a not-connected device has been attached, and to generate an interrupt to notify the host software of the change. After the host software recognizes that a new device is attached to the host controller, it must configure the device and the host controller for proper operation. It must retrieve the link data from the device, and setup the Device Packet Size, Device Link Speed, and Device Repeat Count Registers with appropriate values.

Power-on Initialization

The Host Controller Driver must initialize the host controller and all the attached devices before normal operations can begin. The following is a typical power-on initialization sequence.
1. The Host Controller Driver sets the Host Controller Reset bit in the Control Register.
2. The Host Controller Driver sets the Send Heartbeat bit in the Send Heartbeat Register for each device, and Host Controller sends a Heartbeat packet to each device. If a device is connected, it responds with an ACK packet; otherwise, a time out will occur.
3. The Host Controller Driver reads the Device Attachment Register to determine which devices are attached.
4. The Host Controller Driver sets the Global IRQ Enable and IRQ mask bits in the Configuration Register.
5. The Host Controller Driver prepares a CDB structure in system memory to get Link data from the device.

| System Memory Address = 00070000h | | |
|---|---|---|
| 0 | ATA Command | 00 00 00 00 00 00 00 00 |
| 8 | ATAPI Command | 00 00 00 00 00 00 00 00 |
|  |  | 00 00 00 00 00 00 00 00 |
| 24 | Data Control | Set Device Address = 0 |
|  |  | Set Link Data Type |
|  |  | Set Transfer Direction to IN |
|  |  | Set Data Transfer bit |
| 28 | Total Data Transfer Count | 00000010h |
| 32 | Segment 0 Address | 00080000h |
| 36 | Segment 0 Transfer Count | 80000010h |

6. The Host Controller Driver writes the CDB address 00070000h to the CDB Pointer Register.
7. Host Controller fetches the CDB from system memory to internal memory.
8. Host Controller sends a poll to Device 0 to retrieve Link Data using an INSTART packet.
9. Device 0 responds with 16 bytes of Link Data.
10. Host Controller acknowledges the receipt of the data by sending an INSTOP packet, and Device 0 acknowledges the end of the IN sequence with an ACK packet.
11. Host Controller sets up the DMA controller to transfer 16 bytes of Link Data to system memory at address 00080000h.
12. Host Controller sets the Completed CDB bit and puts the Device Address into Interrupt Status Register.
13. Host Controller sets the IRQ Pending bit in Status Register, and asserts the PCI IRQ.
14. The Host Controller Driver receives the IRQ, reads the Interrupt Status Register.
15. The Host Controller Driver determines the interrupting device and cause.
16. The Host Controller Driver gets the device Packet Size from the Link Data, compares it with the Host Packet Size in the Status Register, and puts the smaller value into the Device Packet Size Register.
17. The Host Controller Driver gets the device Link Speed from the Link Data, compares it with the Host Link Speed in the Status Register, and puts the smaller value into the Device Link Speed Register.
18. The Host Controller Driver gets the device Repeat Count from the Link Data, and puts the value into the Device Repeat Count Register.
19. The Host Controller Driver writes to Configuration Register with Global IRQ Enable, IRQ masks, Heartbeat Enable, Link Retry Enable, a Link Retry Count, and Heartbeat Period.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A host controller for enabling communication between a host computer and a device over a serial link, comprising:
a bus interface circuit connected to a system bus of the host computer;
host controller registers to enable code configuration of the host controller for operation, initialize the device, and send commands to the device;
a packet generator/decoder circuit for polling and for sending and receiving packets to or from the device, wherein the polling controls a data flow and prevents buffers from being underrun and overrun; and a serializer/deserializer for converting parallel data containing ATA/ATAPI commands received from the bus interface circuit and to be sent over the serial link to the device into serial data and converting serial data received from the serial link to parallel data to be sent to the bus interface circuit and to the host computer.

2. A host controller for enabling communication between a host computer and a device over a serial link as recited in claim 1, further comprising:

an encoder/decoder for converting bit streams of serial data received from the serializer/deserializer into encoded data, and decoding data received from the serial link into bit streams of serial data.

3. A host controller for enabling communication between a host computer and a device over a serial link as recited in claim 2, further comprising:

a set of transceivers being coupled to the encoder/decoder, one of the transceivers being configured to communicate with the device over the serial link.

4. A host controller for enabling communication between a host computer and a device over a serial link as recited in claim 3, further comprising:

storage area for storing communication parameters, including,
ATA/ATAPI commands and status for the device and for other devices connected to selected ones of the set of transceivers; and
interrupt status FIFOs that are in communication with an interrupt status of the host controller registers.

5. A host controller for enabling communication between a host computer and a device over a serial link as recited in claim 1, wherein the host controller is in communication with a host controller driver of the host computer.

6. A host controller for enabling communication between a host computer and a device over a serial link as recited in claim 1, further comprising:

a BIOS expansion ROM to enable the device to be a bootable device.

7. A host controller for enabling communication between a host computer and a device over a serial link as recited in claim 1, wherein a host controller driver (HCD) provides an operating system of the host computer with capabilities for detecting an attachment, a removal, and an initialization of the device, the HCD is also configured to perform command generation, data transfers, and status retrieval.

8. A host controller for enabling communication between a host computer and a device over a serial link as recited in claim 1, wherein the bus interface circuit is a PCI bus interface.

9. A host controller for enabling communication between a host computer and a device over a serial link as recited in claim 1, wherein the device is a block oriented device capable of attaining link speeds of one of 320 Mbps, 640 Mbps, and 960 Mbps.

10. A host controller chip integrated into a host adapter, the host controller chip being configured to enable communication between a host computer that has the host adapter connected thereto and a peripheral device, comprising:

a serial cable being configured to interconnect the host adapter to the peripheral device, the serial cable including,
a first differential pair for data;
a second differential pair for strobe; and
a pair for ground;

a PCI bus interface circuit for connecting the host adapter to the host computer;

host controller registers integrated into the host controller chip to enable configuration of the host adapter for operation, initialize the peripheral device, and enable command transmission to the peripheral device over the serial cable;

a packet generator/decoder circuit integrated into the host controller chip for polling the peripheral device and for sending and receiving packets to and from the peripheral device, wherein the polling controls a data flow and prevents buffers from being underrun and overrun; and a serializer/deserializer circuit integrated into the host controller chip for converting parallel data containing ATA/ATAPI commands received from the PCI bus interface circuit and to be sent over the serial cable to the peripheral device into serial data and converting serial data received from the serial cable into parallel data to be sent to the PCI bus interface circuit and to the host computer.

11. A host controller chip integrated into a host adapter as recited in claim 10, wherein the peripheral device is a block oriented device.

12. A host controller chip integrated into a host adapter as recited in claim 11, wherein the block oriented device is one of a hard disk drive, a floppy disk drive, a tape drive, a CD-ROM drive, and an optical disk drive.

13. A host controller chip integrated into a host adapter as recited in claim 10, wherein the host controller chip is interfaced with an IDE controller chip.

14. A host controller chip integrated into a host adapter as recited in claim 10, wherein the host controller chip includes IDE circuitry.

15. A host controller chip integrated into a host adapter as recited in claim 10, wherein the packet is defined by packet types consisting of:

an OUTDATA0/1 packet type;
an INSTART packet type;
an INSTOP packet type;
an ACK packet type;
a HEARTBEAT packet type; and
a RESET packet type.

16. A host controller chip integrated into a host adapter as recited in claim 10, further comprising:

an encoder/decoder circuit being integrated into the controller chip for converting bit streams of serial data received from the serializer/deserializer into encoded data and strobe signals to be communicated over the serial cable, and decoding data and strobe signals received from the serial cable into bit streams of serial data.

17. A host controller chip integrated into a host adapter as recited in claim 10, further comprising:

a set of transceivers being integrated into the host controller chip, the set of transceivers being coupled to the encoder/decoder, and one of the transceivers being configured to communicate with the peripheral device over the serial cable.

18. A host controller chip integrated into a host adapter as recited in claim 17, further comprising:

a storage area integrated into the host controller chip for storing communication parameters, including,
ATA/ATAPI commands and status for the peripheral device and for other peripheral devices connected to selected ones of the set of transceivers; and interrupt status FIFO buffers that are in communication with an interrupt status of the host controller registers.

19. A host controller chip integrated into a host adapter as recited in claim 10, wherein the host controller chip is in communication with a host controller driver (HCD) of the host computer.

20. A host controller chip integrated into a host adapter as recited in claim 19, wherein the host controller driver (HCD) provides an operating system of the host computer with capabilities for detecting an attachment, a removal, and an initialization of the peripheral device, and the HCD is also configured to control command generation, data transfers, and status retrieval.

21. A host controller chip integrated into a host adapter as recited in claim 10, further comprising:

a BIOS expansion ROM integrated into the host controller chip to enable the peripheral device or other peripheral devices connected to the host adapter to be bootable devices.

22. A host controller chip integrated into a host adapter as recited in claim 10, wherein the peripheral device is capable of attaining link speeds of one of 320 Mbps, 640 Mbps, and 960 Mbps.

23. A system for executing data transfers between a host computer and a peripheral device over a serial link, comprising:

a CPU for setting up a command descriptor block (CDB) with an ATA/ATAPI command and a scatter/gather list in a system memory;

a pointer register resident in a host controller chip, the CPU being configured to write an address of the CDB into the pointer register;

a DMA controller for instructing a transfer of the CDB to RAM memory of the host controller chip;

the host controller chip being configured to send the CDB to a peripheral device over a serial physical cable, the host controller chip further being configured to poll the peripheral device for data packets;

the device being configured to respond to the poll by sending data packets to the RAM of the host controller chip;

a data buffer being configured to receive the data packets at the direction of the DMA controller, the data buffer being pointed to the scatter/gather list in the system memory; and the host controller chip being configured to set up an interrupt status to interrupt the CPU indicative of the receipt of the data packets from the peripheral device.

* * * * *